United States Patent [19]
Gorshe et al.

[11] Patent Number: 5,878,039
[45] Date of Patent: Mar. 2, 1999

[54] BUS RATE ADAPTATION AND TIME SLOT ASSIGNMENT CIRCUIT FOR A SONET MULTIPLEX SYSTEM

[75] Inventors: Steven S. Gorshe, Beaverton; Robert W. Brooks, Jr., Aloha, both of Oreg.

[73] Assignee: NEC America, Inc., Melville, N.Y.

[21] Appl. No.: 637,413

[22] Filed: Apr. 24, 1996

[51] Int. Cl.[6] ............................. H04J 3/22; H04Q 11/04
[52] U.S. Cl. ..................... 370/376; 370/465; 370/544
[58] Field of Search ..................... 370/357, 360, 370/375, 376, 386, 388, 389, 395, 412, 465, 516, 535, 536, 537, 538, 539, 540, 541, 542, 544, 545, 914; 375/363, 371, 372, 373

[56] References Cited

U.S. PATENT DOCUMENTS

| | | | |
|---|---|---|---|
| 4,592,048 | 5/1986 | Beckner et al. | 370/522 |
| 4,596,010 | 6/1986 | Beckner et al. | 370/354 |
| 4,700,226 | 10/1987 | Acampora | 358/136 |
| 4,827,473 | 5/1989 | Tsuzuki et al. | 370/413 |
| 4,949,339 | 8/1990 | Shimada et al. | 370/545 |
| 5,062,105 | 10/1991 | McKnight et al. | 370/538 |
| 5,267,236 | 11/1993 | Stephenson, Jr. | 370/545 |
| 5,311,511 | 5/1994 | Reilly et al. | 370/545 |
| 5,430,485 | 7/1995 | Lankford et al. | 348/423 |
| 5,612,956 | 3/1997 | Walker et al. | 370/545 |

*Primary Examiner*—Alpus H. Hsu
*Attorney, Agent, or Firm*—Sughrue, Mion, Zinn Macpeak & Seas, PLLC

[57] ABSTRACT

An interface device is provided which may be used to perform rate adaptation and time slot assignment, in either the transmit or receive directions, in a multiplexing unit for interfacing a high rate optical carrier line to a plurality of lower rate information carrier lines. The high rate optical carrier line may be a SONET or SDH carrier line. The interface device according to the present invention may be operationally configured to provide data rate adaptation and time slot assignment between an optical carrier line operating at an OC-12 rate with lower rate lines operating according to OC-3, OC-1, DS-3, or DS-1 protocols, or even virtual channels. A plurality of identical interface devices may be cascaded together and used to perform interface support for various channels operating at various rates, merely by manipulating the operational configuration of the individual interface devices in the cascade.

25 Claims, 45 Drawing Sheets

BUS RATE ADAPTATION AND TIME SLOT ASSIGNMENT CIRCUIT FOR A SONET MULTIPLEX SYSTEM

BACKGROUND OF THE INVENTION

1. Field of the Invention

The present invention relates generally to the art of telecommunication and the multiplexing of digital information. More specifically, the present invention relates to a SONET multiplexed system having the capability of interfacing digital communication lines operating at different data rates.

2. The Background Art

The SONET (Synchronous Optical NETwork) communication hierarchy has been specified by the American National Standards Institute (ANSI) as a standard for a high-speed digital hierarchy for optical fiber. The SONET standard is described in detail in ANSI T1.105 and T1.106, and in Bellcore Technical Recommendations TR-TSY-000253, which are incorporated by reference into this application.

The international realization of the SONET communication hierarchy is the Synchronous Digital Hierarchy (SDH) standard promulgated by the ITU-T (the successor organization to the CCITT) via Recommendations G.707–709. The salient difference between SONET and SDH is that the basic SDH rate, known as Synchronous Transport Module level 1 (STM-1), is 155.52 Mbps and the basic SONET rate, known as Optical Carrier level 1 (OC-1), is 51.84 Mbps. The STM-1 rate is equivalent to the rate of Optical Carrier level 3 (OC-3) of SONET. The respective rates of transport according to the SONET and SDH standards are shown in TABLE 1.

TABLE 1

SONET Optical Carrier and SDH Synchronous Transport Module Levels

| Line Rate (Mbps) | SONET Level | SDH Level |
| --- | --- | --- |
| 51.840 | OC-1 | |
| 155.520 | OC-3 | STM-1 |
| 466.560 | OC-9 | |
| 622.080 | OC-12 | STM-4 |
| 933.120 | OC-18 | |
| 1244.160 | OC-24 | STM-8 |
| 1866.240 | OC-36 | STM-12 |
| 2488.320 | OC-48 | STM-16 |

Previously there have been disclosed devices for interfacing digital communication lines operating at different rates. The patents to Huizinga et al. (U.S. Pat. No. 4,416,007) and Wurst (U.S. Pat. No. 4,606,021) are directed to "conference call" mechanisms where digitized voice data is summed with other similar signals, and the resulting signal is placed in an appropriate, selected time slot on a Pulse Code Modulated (PCM) highway which operates at a fixed data transfer rate. The patents to Hartmann et al. (U.S. Pat. No. 4,510,596) and Urui et al. (U.S. Pat. No. 4,636,253) are directed to methods of supporting rapid time slot re-assignment in PBX systems that internally carry voice and data services over a PCM highway operating at a fixed data transfer rate. These four patents have in common various interface devices or data ports which support various services, but all eventually interface to the PCM highway at a fixed data transfer rate.

The patent to Narasimhan (U.S. Pat. No. 4,771,418) is directed to an integrated circuit which supports the basic rate integrated services digital network (ISDN) S-type subscriber interface into a Private Automatic Branch Exchange (PABX).

Conventional interfaces for PCM highways as exemplified by the above-referenced patents suffer from being expensive and unreliable, and are therefore disadvantageous. A conventional approach is to develop a different integrated circuit to handle each required interface configuration. Accordingly, the cost for development of conventional interface systems, and the cost of maintaining them is high. Each time a new interface configuration is required, a new circuit must be developed to implement the new interface. Each different interface circuit developed requires its own distinct parts inventory and troubleshooting and maintenance processes.

Conventional interfaces which use a time shared bussing architecture are also disadvantageous in that they must operate the tributary units at a fixed data rate equal to the highest data rate of the PCM highway. Operating at such a high data rate uses a great deal of power. Higher power consumption means higher heat generated, necessitating extreme ventilation measures. This too is also a problem.

BRIEF SUMMARY OF THE INVENTION

Accordingly, it is a general object of the present invention to provide in a multiplex system in which a given card slot can be used by tributary units with different payload data rates. In the case of a SONET multiplex system, these tributary units may be DS1, DS3, OC-1, OC-3, or OC-12 units, which use PCM data rates of 1.544, 44.736, 51.84, 155.52, and 622.08 Mbit/s, respectively. In order to allow these units to use the same card slots, some type of rate conversion is required in the TSI unit so that the PCM signals from all tributary units can be combined together for time slot interchange (TSI) and multiplexing. The present invention performs these rate adaptation functions, in addition to performing other functions, such as a time slot assignment (TSA) function, on the data received from multiple PCM buses.

Another object of the present invention is to keep the clock rate of each bus low, by using a PCM bus rate that is appropriate to the bandwidth required by small groups of tributary units. As a result, significant savings in power consumption are achieved, which allows systems to work with convection cooling rather than expensive forced air fans.

A further object of the present invention is to provide a simplified TSA only version of the TSI unit with no additional TSI switch matrix ICs, by implementing the TSA function within these rate adaptation integrated circuits (ICs).

An even further object is to enable the use of only a single IC which can greatly reduce the number of buses required, by implementing the IC so that they can be connected together in a cascade configuration. This cascade configuration may be thought of as being like a "pipeline" which gathers data up from the buses of various rates for feeding into the PCM highway, and in the opposite data flow direction, distributes the data from the PCM highway out to the various buses.

A TSI architecture may carry independent receive paths into or up to the TSI switch matrix in order to support path protection switching. Thus, the programmable rate conversion device must also support independent receive paths. In addition, independent transmit paths for the tributary interfaces are required to support a Unidirectional Path Switching Ring (UPSR).

The TSI architecture requires a rate conversion device that supports a single receive path and a single transmit path. The functions of this rate conversion device easily fit into relatively small and inexpensive packaging. However, more than one TSI architecture that supports independent paths in both receive and transmit directions require the support of the rate conversion device. In order to keep the rate conversion device package size and cost at a reasonable level, the transmit and receive paths should now be separated. In addition, the TSA functionality of this device must now be capable of TSA at the STS-1 (or OC-1) level. To adequately support the new requirements for this device, a universal rate and direction interface device has been developed. This new device supports two independent paths, configurable as either receive or transmit, that can be interconnected in a cascade or can be operated in a stand-alone mode.

The above and other objects of the present invention are accomplished by providing an interface device having two 20 bit wide input ports (a low and high byte plus a mark and parity bit each), two 18 bit output ports (a low and high byte plus a mark or parity bit each), and two 18 bit bidirectional ports (a low and high byte plus a mark bit each). Parity calculation and generation circuits are included at the input and output ports, and each internal path passes through a 12 byte first in, random out (FIRO) data swapping buffer which performs the STS-1 level TSA and data rate conversion functions. The device also includes additional 2:1 and 4:1 selector steering circuits which will support line protection switching and the cascade function.

The present invention has many advantages over the conventional data rate interface systems because it results in lower system power consumption, which contributes to lower system cost and higher system reliability. It also has the advantage of being embodied as a single IC (having perhaps 4000–7000 gates) which performs all interface functions between the PCM buses and the TSI switch matrix circuits. This results in lower overall interface system development and end product costs by using a plurality of single, adaptable, multi-function ICs, compared to implementing the functions in multiple special-function ICs. This also lowers the complexity and cost of a parts inventory. A further advantage is that it allows development of a very low-cost, TSA-only version of the TSI unit.

DETAILED DESCRIPTION OF A PREFERRED EMBODIMENT OF THE INVENTION

In order to realize a rate adaptation system, a plurality of interfacing devices (or bus rate adapters) according to the present invention are connected to one another in a cascaded fashion. Each separate device may be embodied in a single integrated circuit package. The combination of cascaded devices provides a system whereby digital communication lines multiplexed according to the SONET standard operating at a nominal payload data rate are operatively interfaced with other SONET lines operating at different payload data rates, and are operatively interfaced with digital communication lines multiplexed according to other digital standards which operate at different payload data rates.

Simultaneously with performing rate adaptation, the present invention makes time slot assignments within data payloads. The basic structure for a rate adaptation and time slot assignment circuit according to the present invention includes 1) an input port for accepting data at a first payload data rate; 2) a time slot assignment buffer having an input connected to said input port and having a buffer output; and 3) an output port for outputting data received from said buffer output at a second payload data rate.

Throughout this description, STS-N and OC-N notations are used interchangeably. It is understood that the present invention may be implemented for the international SDH standard as well as the SONET standard. However, to prevent confusion, only SONET terminology is used for the purpose of describing the exemplary embodiments.

Figure 1A:
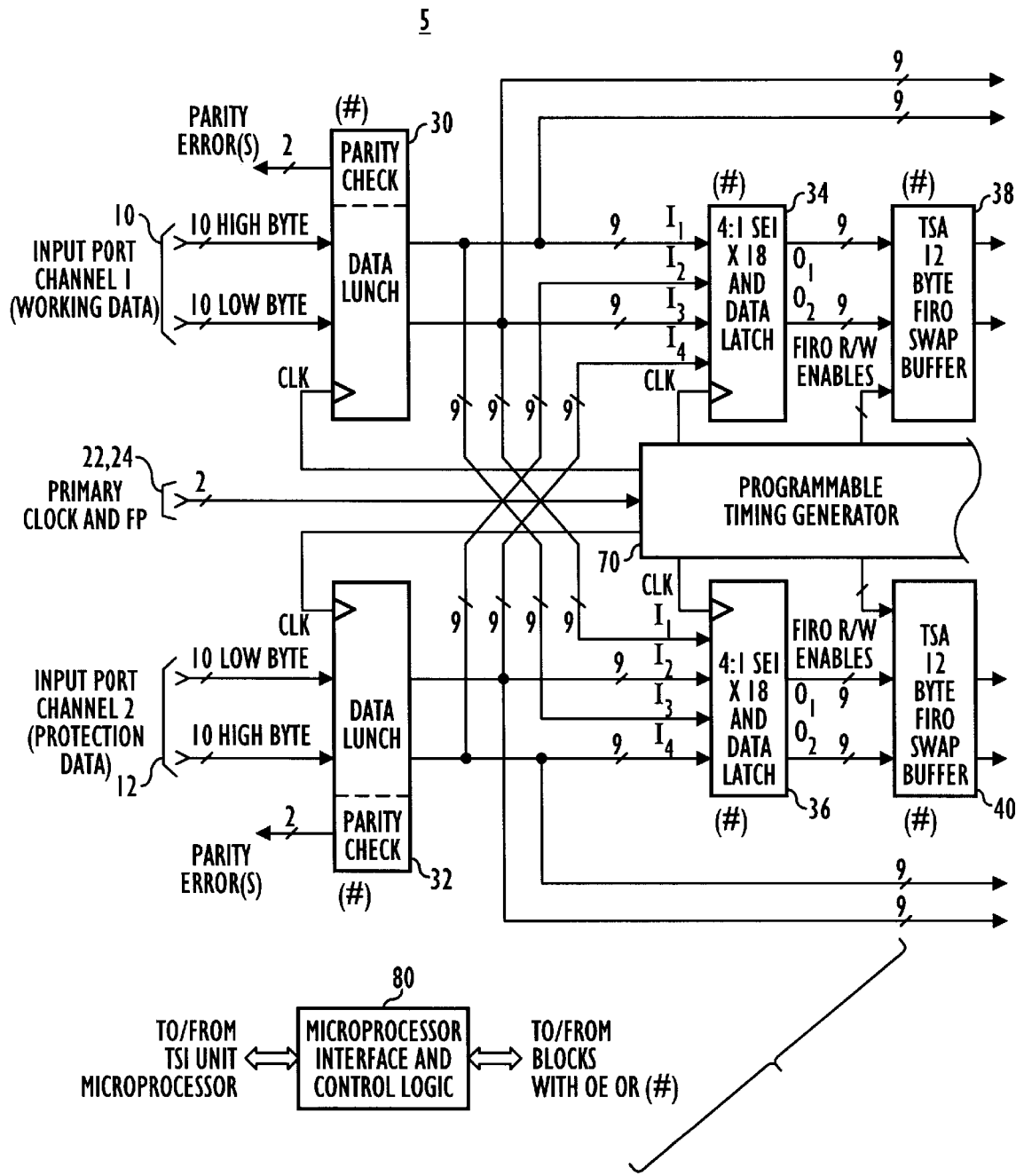
FIGS. 1A and 1B show an interfacing device according to a preferred embodiment of the present invention.
Figure 1B:
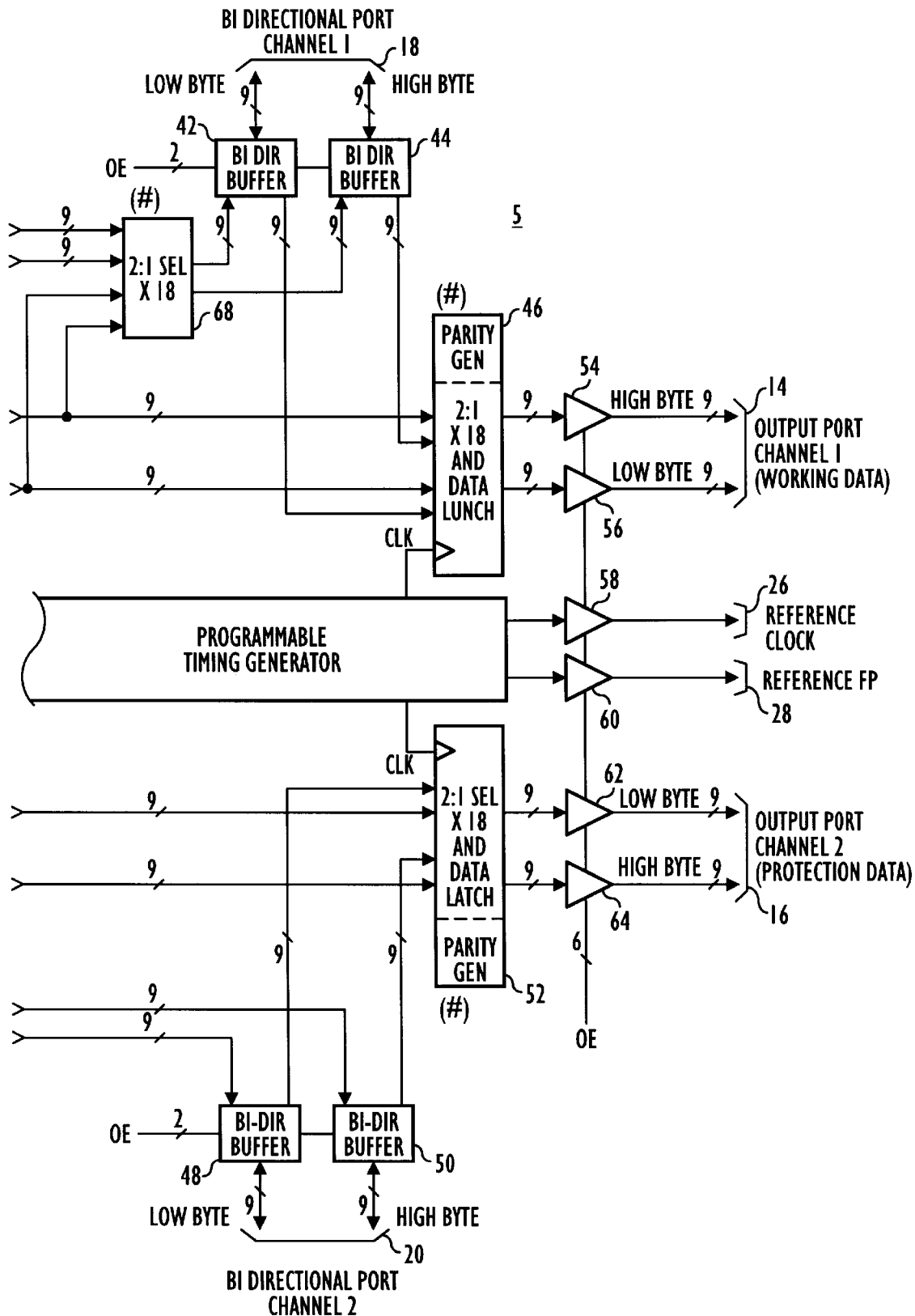

A. The Structure of the Apparatus According to a Preferred Embodiment of the Present Invention An interfacing device 5 according to a preferred embodiment of the present invention is illustrated in FIGS. 1A and 1B. The interfacing device 5 performs the basic functions essential to carrying out the objectives of the present invention.

From an input/output, data flow perspective, the interface device has a pair of input ports 10, 12, a pair of output ports 14, 16, and a pair of bi-directional ports 18, 20. The timing and synchronization aspects of the interface device are handled through the primary clock input 22, the primary frame pulse input 24, the reference clock output 26, and the reference frame pulse output 28.

When the interface device is implemented in a receive path (that is, data flows in from the tributary units and out to the TSI unit), data from tributary units flows into one or both of the input ports 10, 12. Data may also flow into the interface device through one or both of the bi-directional ports 18, 20 from neighboring interface devices with which it is cascaded. All data latched into the device by the input port data latches 30, 32 is made available to the TSA portions of the device. Together, the 4:1 selection data latch 34 and the 4:1 selection data latch 36 function to route any of the 9-bit wide input data rails (i.e., a data rail being a set of parallel data lines) to the TSA's. The FIRO swap buffers 38, 40 perform time slot assignment (TSA) functions on the data which is presented to them by the latches 34, 36. The 2:1 selection data latches 46, 52 route data from the TSA part of the interface device and/or from the bi-directional data ports 18, 20 to the output ports 14, 16. The 2:1 selector circuit 68 may be used to route data from the TSA FIRO swap buffer 38 to a cascaded interface device via the channel 1 bi-directional port 18.

When the interface device is implemented in a transmit path (that is, data flow in from the TSI unit and out to the tributary units), data from the TSI unit flows into one or both of the input ports 10, 12. All data latched into the device by the input port data latches 30, 32 is made available to the TSA portions of the device. As with receive path operation, the 4:1 selection data latches 34 and 36 function to route any of the 9-bit wide input data rails to the TSA FIRO swap buffers 38, 40, which perform time slot assignment (TSA) functions on the data which is presented to them by the latches 34, 36. The 2:1 selection data latches 46, 52 route data from the TSA part of the interface device to the output ports 14, 16. The data input to the interface device via the channel 1 input port data latch 30 may be routed out to a cascaded interface device via the channel 1 bi-directional port 18, and the data input to the interface device via the channel 2 input port data latch 32 may be routed out to another cascaded interface device via the channel 2 bi-directional port 20. If used at all during transmit path operations, the 2:1 selector circuit 68 is used to route data from the input port data latch 30 to the bi-directional buffers 42 and 44.

A.1. The Input Port Data Latches

Bytes of data flowing into the interface unit are input immediately into the input port data latches 30, 32 which receive data through their respective input ports 10 (channel 1) and 12 (channel 2), and which produce first latch outputs corresponding to the data at the inputs upon receiving a CLK pulse. In this exemplary embodiment, the input port data latches 30, 32 each handle 20 bits of data in parallel as a 10-bit high byte and a 10-bit low byte (each 10-bit byte containing 8 bits of data, a mark bit, and a parity bit). These latches also each contain a parity check circuit which provides indications at the Parity Error outputs that parity errors have occurred.

The input port data latches 30, 32 consist of D-type latches (or flip-flops) in addition to two byte wide parity calculation circuits. Parity errors are passed to the microprocessor interface for alarm reporting and summation. The parity calculation can be masked by software provisioning in support of the transmit configuration. These blocks are clocked by a 38.88 MHz clock in transmit path configuration, and at the selected tributary interface rate (6.48, 19.44, or 38.88 MHz) in receive path configuration.

A.2. The 4:1 Selection Data Latches

The outputs of each of the input port data latches 30, 32 are made available as inputs to each one of a pair of selection data latches 34, 36. The latches 34 and 36 produce outputs which are selected from the first latch outputs on a 4:1 basis. The 4:1 selector data latches 34, 36 include of a series of 4:1 selector circuits followed by D-type latches (or flip-flops) which can select between four independent groups of data rails (both high and low data bytes of the channel 1 and channel 2 data). That is to say, either of the output bytes ($O_1$ or $O_2$) may be selected from any of the four input bytes ($I_1$, $I_2$, $I_3$, or $I_4$).

In the receive data path configuration, the 4:1 selector latches 34, 36 can be used to perform byte level dynamic and static input data channel selection (the former in the DS1 case and the latter in the double OC-3 case) and channel-wide line protection switching (in the Linear Add/Drop Multiplexing (ADM) mode) between the two data input channels. In the transmit data path configuration, this same block can be used to perform byte level static transmit data channel selection (in support of the double OC-3 case) as well as channel wide distribution of data from a single data input channel into the two independent transmit path processing circuits in distributing output data for 1+1 transmission configurations.

A.3. The First-In-Random-Out Swap Buffers

The outputs of each 4:1 selection data latch (34 and 36) are input to a swap buffer (38 and 40, respectively). The swap buffers 38, 40 are of the "first-in-random-out" (FIRO) type, and each FIRO buffer holds 24 bytes of data in two sets of 12 byte storage buffers which are alternately written to according to the write enable control input signals. The outputs from the swap buffers 38, 40 are produced by reading bytes of data in a selected order from the storage bytes of the swap buffer. The order of selection of the contents of the storage bytes to be read out as the output of the FIRO swap buffers 38, 40 is determined by the read enable control input lines. The number of read enable control lines is eight in the case of the 12 byte FIRO buffer. Optionally, a larger or smaller buffer may be substituted in the device which would require more or fewer read enable control lines from the timing generator 70.

Each FIRO swap buffer is capable of performing STS-1 level time slot assignment in either the receive data path configuration (from interface unit into the TSI switching matrix) or the transmit data path configuration (from TSI matrix toward the interface units). A data swapping buffer is required because the STS-12 signal is transported in two parallel bytes per clock cycle; six clock cycles are required to transfer all 12 STS-1 bytes as a group. For instance, all 12 A1 bytes must remain together as a 12 byte group (followed by 12 A2 bytes as a group, etc.), even after the order of the bytes has been rearranged by the TSA function, in order to maintain the SONET frame alignment across all 12 STS-1 bytes.

A.4. The Bi-Directional Buffers

The interface unit 5 has two pairs of bi-directional buffers 42, 44 and 48, 50 which communicate with the two bi-directional ports 18 (channel 1) and 20 (channel 2). Each 9-bit wide bi-directional buffer 42, 44, 48, 50 may be enabled to function as an input port or as an output port for a byte of data.

The bi-directional buffers 42, 44 for bi-directional port channel 1 (18) are eligible to receive as bi-directional buffer inputs 1) signals from the outputs of input port data latch 30, or 2) signals from the swap buffer 38 outputs. The signal chosen for input to the buffers 42, 44 is selected by the 2:1 selector circuit 68 which receives a selection control signal from the interface and control logic circuit 80. The 2:1 selector circuit 68 includes a series of 2:1 selector circuits which select between two independent groups of data rails. In contrast, the bi-directional buffers 48, 50 for bi-directional port channel 2 (20) receive as bi-directional buffer inputs only signals from the outputs of the input port data latch 32.

Each of the bi-directional buffers 42, 44, 48, 50 may be enabled to pass their respective inputs out of the interface unit 5 as output signals to other interface units. Alternatively, each of the bi-directional buffers 42, 44, 48, 50 may be enabled to pass exterior signals from other interface units into the interface unit 5 for routing to their respective 2:1 selection data latch 46, 52. As a further alternative, any or all of the bi-directional buffers 42, 44, 48, 50 may be disabled so as to pass no data whatsoever.

A.5. The 2:1 Selection Data Latches & Output Port Drivers

To direct data bytes to the output ports, the interface unit has two selection data latches 46, 52. The latches 46, 52 are, for example, 2:1 selection data latches, each receiving inputs from the swap buffer 38, 40 outputs and the inbound outputs of the bi-directional buffers 42, 44, 48, 50. The outputs of the selection data latches 46, 52 are chosen from their respective inputs; either the swap buffer outputs or the bi-directional buffer outputs. The 2:1 selector data latches 46, 52 include a series of 2:1 selector circuits followed by D-type latches (or flip-flops) which can select between two independent groups of data rails, plus parity generation circuits.

The selector data latches 46, 52 enable the cascading of several interface units when supporting the receive configuration, each device is capable of grooming the contents of the receive data as it passes through this latch. When the end of the cascade chain is reached, the entire received data contents can be transferred toward the TSI switching matrix without requiring the use of a time shared bus architecture (thereby saving considerable I/O power consumption). The control of the selection of which data to pass through these latches 46, 52 (from the interface unit input port or the bidirectional port) is contained in registers in the microprocessor interface 80. Two byte wide parity generator circuits are included in the final output block and can be provisioned to output the parity value(s) of the current byte(s) being output on the additional output port pin(s) (there are 9 pins per data rail×2 data rails) when the device is supporting the transmit configuration. These blocks are clocked by a 38.88 MHz clock in receive path configuration, and at the selected tributary interface rate (6.48, 19.44, or 38.88 MHz) in transmit path configuration.

The outputs of the selection data latches 46, 52 are coupled to the output ports 14, 16 by output port drivers 54, 56, 62, 64. These drivers receive their output enable commands from the interface and control logic circuit 80.

A.6. The Programmable Timing Generator

The coordination of timing of operation of the latches and the swap buffers are handled by a programmable timing generator 70. The timing generator 70 receives a Primary Clock as an input, receives a Primary Framing Pulse as an input, produces a reference clock (REF_CLK) as an output (derived from the Primary Clock), and produces a reference framing pulse (REF_FP) as an output (derived from the Primary Framing Pulse). The Primary Clock and Framing Pulse are generated externally to the device from some stratum level traceable clock source in compliance with SONET standards requirements. The Primary Clock and Frame Pulse are distributed to each device for proper operation regardless of its use as either receive or transmit path configuration. If a particular tributary group is unequipped, then the corresponding interface reference clock, frame pulse, and data outputs may be disabled, reducing I/O power consumption.

The timing generator 70 also produces the read enable signals and the write enable signals for controlling the operation of the FIRO swap buffers 38, 40. This functional block must also generate timing and control signals in response to software provisioning that will operate the two 12 byte FIRO TSA swapping buffers in order to support both receive and transmit configurations.

The timing generator 70 also generates clock signals (CLK) for synchronizing the operation of the input port data latches 30, 32, the 4:1 selection data latches 34, 36, and 2:1 selection data latches 46, 52.

A.6.a. Functions Performed by the Timing Generator When Operating in a Receive Path Configuration In addition to the functions mentioned above, the timing generator 70 functions to output one of five selectable phases of reference frame pulse when supporting the receive path configuration, each phase separated by one 38.88 MHz clock period. The tributary "A" group interface device outputs the initial phase of reference frame pulse, the "B" group interface outputs a second phase of frame pulse (delayed by one 38.88 MHz clock period), the "C" group interface outputs a third phase of reference frame pulse (delayed by yet another 38.88 MHz clock period), and so on until the dedicated DS1 tributary group is reached at the end of the cascade, which outputs the fifth and final phase of frame pulse. This allows the cascading of interface devices, which in turn eliminates the need for a power wasting time shared bussing architecture to pass data to the tributary side port of the TSI switching matrix. The device interface to the primary OC-N outputs the phase of frame pulse equivalent to the dedicated DS1 tributary group frame phase (the fifth phase) due to the fact that the primary OC-N interface device is not cascaded with another interface device. In this way, the data paths from the various interfaces arrive at the STS Path Overhead (POH) Termination and PPM function blocks with identical SONET frame alignments (all data paths will exhibit the same amount of delay with respect to the Primary FP at the STS POH termination point).

A.6.b. Functions Performed by the Timing Generator When Operating in a Transmit Path Configuration In this configuration, the timing generator 70 will synchronize with the incoming Primary Frame Pulse and output a single output Reference Frame Pulse (REF-FP). For tributary side support, the STS-12 signal output from the TSI switching matrix is cascaded through a series of interface devices, each device extracting the portion of the STS-12 signal that has been selected for output to the tributary group supported by each particular interface device. In the tributary side transmit path, the first interface device in the cascade accepts two independent STS-12 bandwidth data channels on the two input ports and writes the data into the two identical FIRO buffers, and then outputs the remaining STS-12 data on the bidirectional ports for further downstream cascade processing. Once data has been extracted (dropped) from the output data stream, the dead byte time slots now contained in the output data can coincide with an associated disabling of the output drivers. Only the valid data time slots being transferred down the cascade need to consume output power. The output REF-FP provides frame synchronization to the tributary group for outgoing signal processing (TOH insertion, payload demapping, etc.). To support the primary OC-N interfaces, the interfacing device operates as a stand alone circuit element, and the cascade function is not used.

A.6.c. Timing of Signals for an Interface Unit

Figure 34:
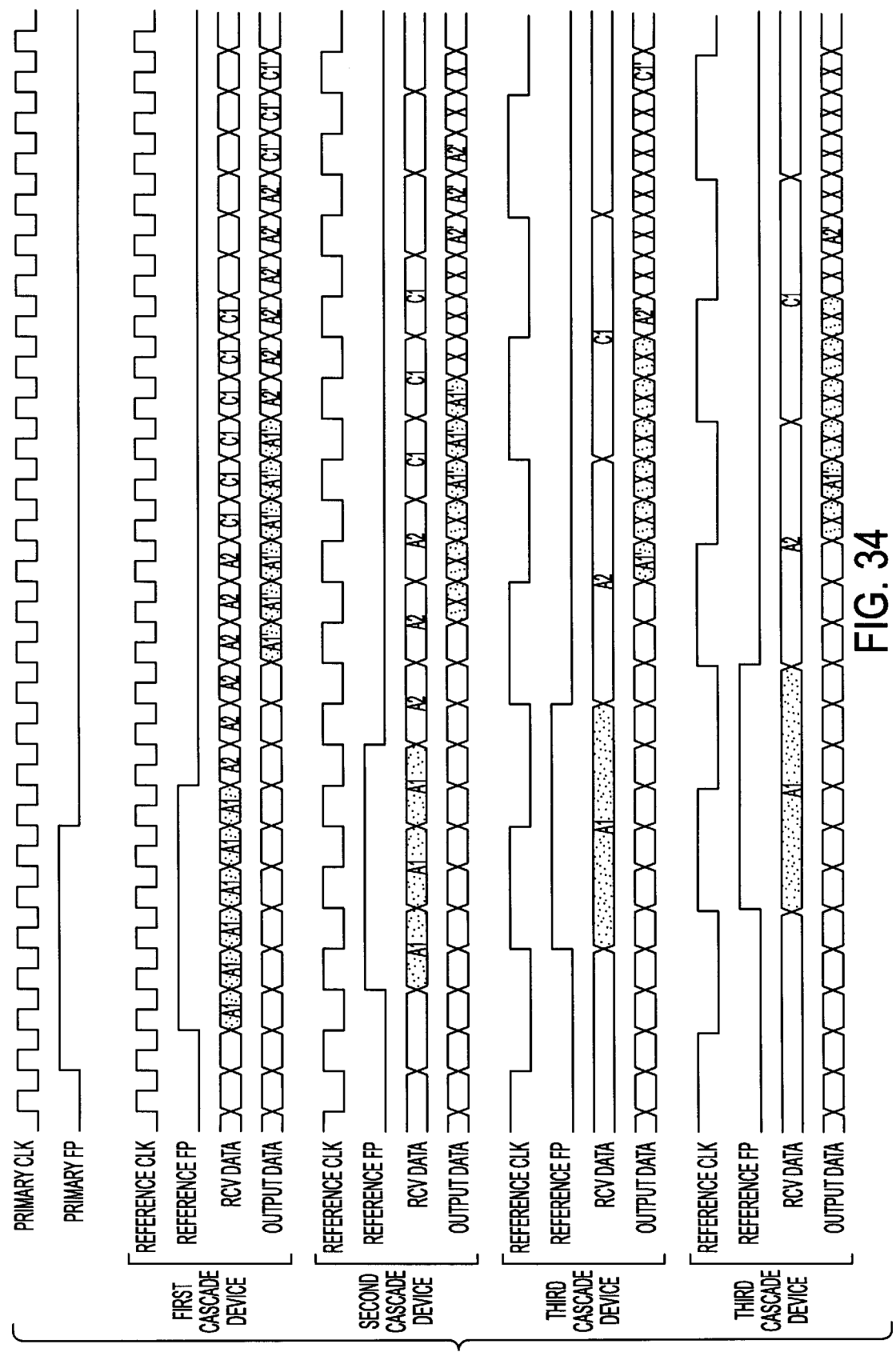
FIG. 34 shows a timing diagram of signals for interfacing circuits (or bus rate adapters) according to the present invention which are cascaded together, in the receive direction.
Figure 35:
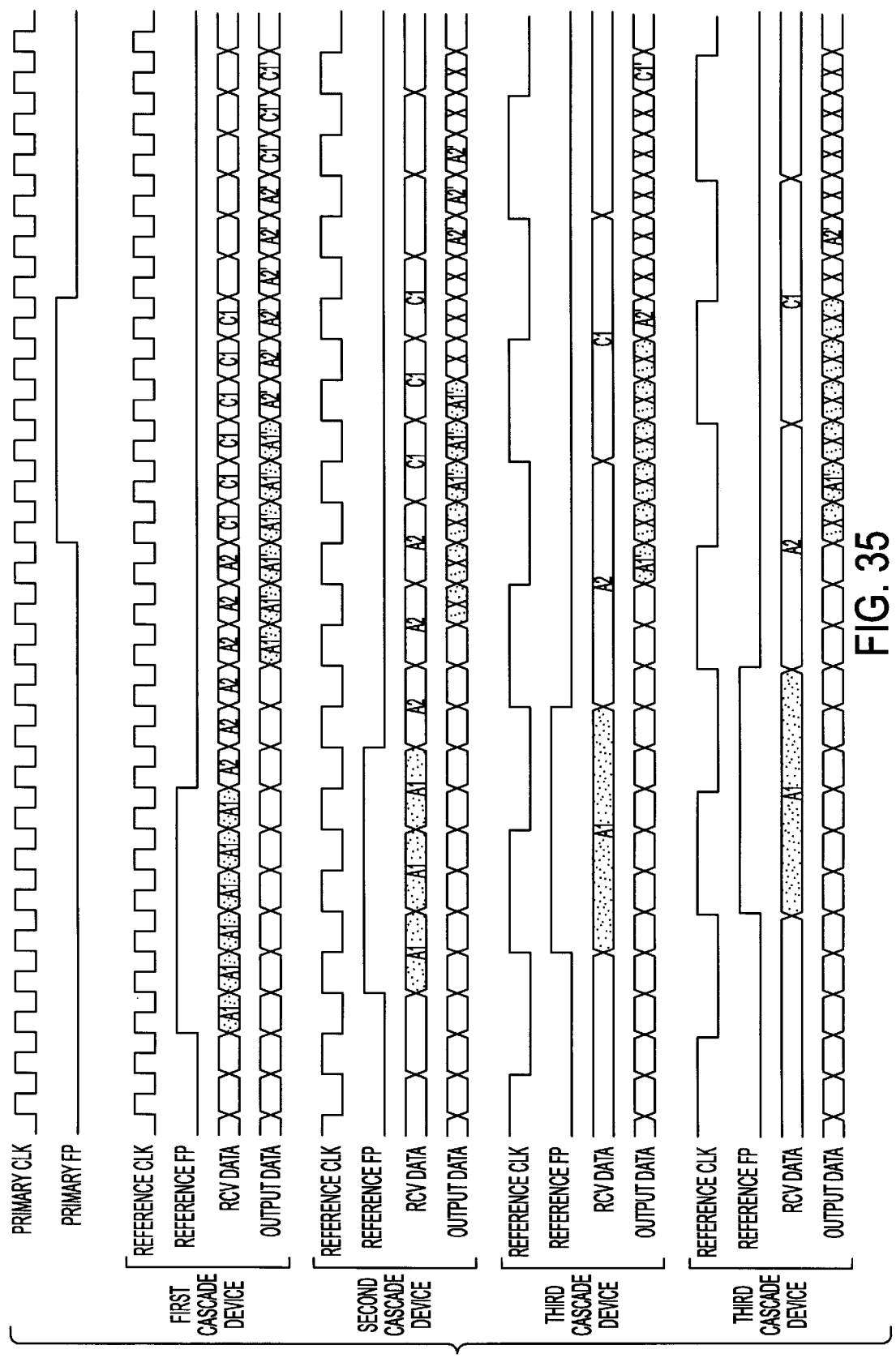
FIG. 35 shows a timing diagram, according to an alternate embodiment, of signals for interfacing circuits (or bus rate adapters) according to the present invention which are cascaded together, in the receive direction.
Figure 36:
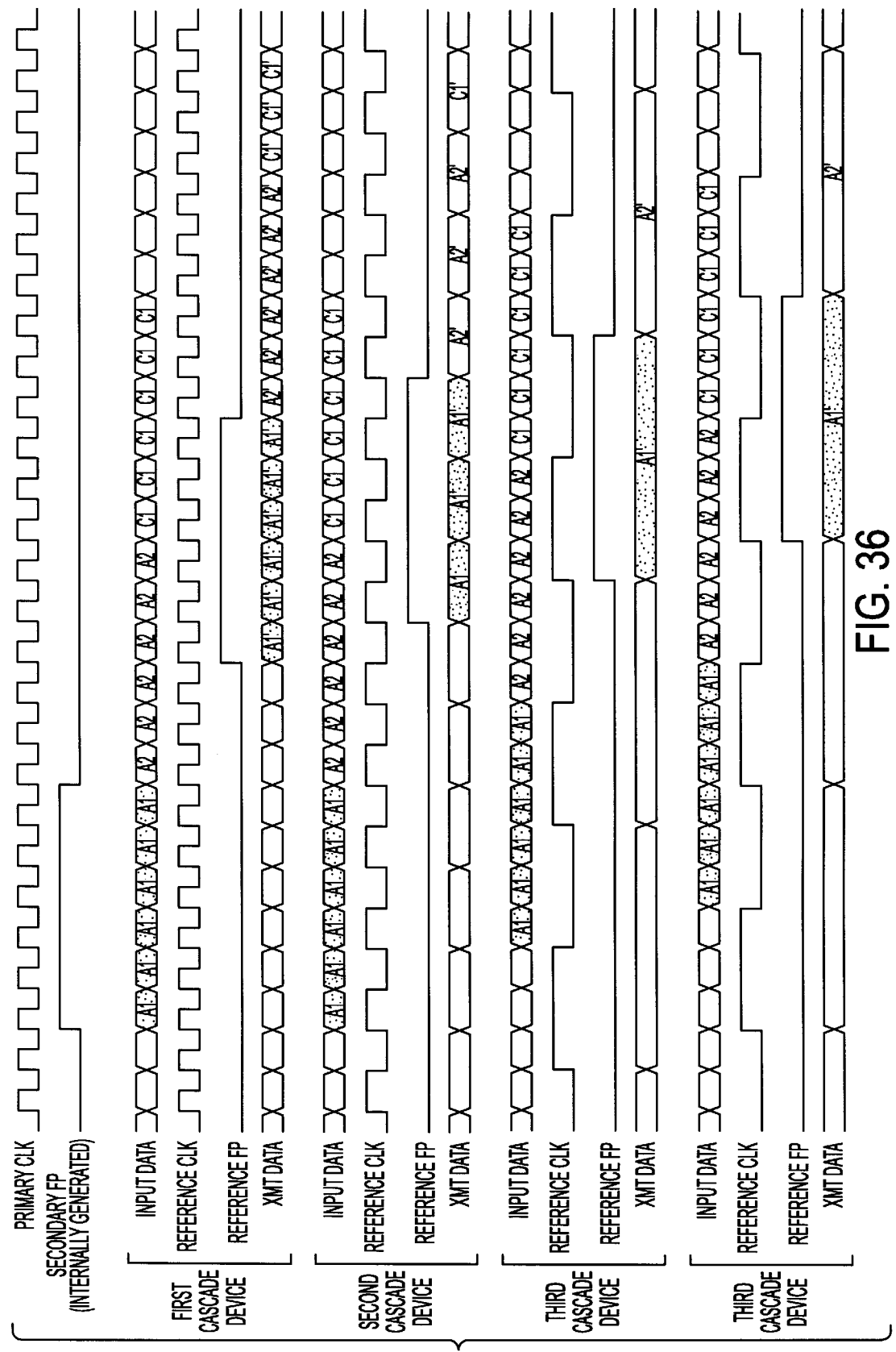
FIG. 36 shows a timing diagram of signals for interfacing circuits (or bus rate adapters) according to the present invention which are cascaded together, in the transmit direction.

The three timing diagrams shown in FIGS. 34, 35 and 36 show in detail how an interface device according to the present invention operates, and more specifically, how it operates together with other such interface devices in a cascade. FIGS. 34 and 35 show timing relationships for the receive direction functions and FIG. 36 shows timing relationships for the transmit direction functions. In each case, the timing diagrams shown are merely examples of how the devices can be operated, and are provided to assist in the understanding of the basic operational features of the invention.

In each of FIGS. 34–36, the first two signal traces represent the Primary Clock (CLK) and Frame Pulse (FP). These two signals are the master timing control signals for all the interface devices manipulating the SONET PCM data on the TSI system. All relative timing relationships for subsequent operational events are derived from these two signals.

It is important to note that the presence of these two signals is required at all times for the continued proper operation of the TSI system. Several system-wide protection schemes are employed just to guarantee the presence and quality of these two signals at all times and many critical alarm set points are monitored to rapidly inform the system controlling software of any problems regarding these two signals so that corrective actions to remedy the alarm conditions can be taken as quickly as possible.

The other sixteen signal traces shown in each of FIGS. 34–36 are separated into four groups of four signals each. Each group represents the signals impinging upon or emanating from a single device. The timing diagram in FIG. 34 shows an example of four devices connected in cascade. In the general case, the cascade could be as small as two or as large as twelve. The interface device can also operate in a stand alone mode without any other devices connected to it in a cascade. The preferred embodiment for using the interface devices in a TSI system calls for having four devices connected in cascade.

The salient features to notice in the timing diagrams are highlighted by the gray shaded data bits and their relative alignment to the respective Reference CLK and FP. The A1, A2, and C1 designations shown for some of the data bits correspond to the SONET standard notation for the first row Transport Overhead bytes (TOH) in the SONET frame format described in ANSI T1.105.

The OC-12 rate of 622.08 MHz is the primary interface rate for the preferred SONET system configuration, therefore, there are 12 basic frame aligned 51.84 MHz SONET frames multiplexed into a single OC-12 SONET frame, one byte from each basic SONET frame, resulting in groups of 12 of each SONET byte appearing in sequence. For example, the A1 byte of each basic SONET frame will appear in the OC-12 frame as a group of 12 A1 bytes, followed by a group of 12 A2 bytes, followed by a group of 12 C1 bytes, etc. Dividing the 622.08 MHz serial data rate by 16 yields the primary rate of 38.88 MHz. Each 38.88 MHz primary clock period is capable of transferring two bytes (16 bits) of SONET data; six clock periods are required to transfer a group of 12 bytes of SONET data, hence the logical grouping of 96 bit fields, or 6 double byte wide buffers (a low and a high byte) for the TSA function of the 12 byte FIRO bank swapping buffer. Note also that the Reference FP signal is asserted high only for the six clock periods that are aligned with the 12 A1 bytes to mark the OC-12 frame boundary.

Receive Direction Cascade Timing Diagrams

The following explanation is with reference to FIG. 34. The second trace from the top of the diagram is the Primary Frame Pulse. The received SONET A1 TOH bytes (coming from the tributary units) in the RCV Data signal must always coincide with the high level assertion of the Reference FP signal. Also, the high level assertion of the Reference FP signal must also coincide with the high level assertion of the respective Reference CLK signal. This alignment between the Reference CLK and Reference FP will also properly align the incoming data bits to the Primary CLK signal which will operate the various latches and data storage buffers in the 12 byte FIRO internally to the interface device.

The incoming data bits are aligned relative in a predetermined fashion to the Reference FP because the high level assertion of the Reference FP "marks" the beginning of each incoming SONET frame boundary. All subsequent manipulations of the SONET payload data bits (especially the FIRO functions) are dependent on the accurate marking of the SONET frame boundaries. Each subsequent interface device in the cascade has its respective Reference CLK and Reference FP outputs delayed by one Primary CLK period, with respect to those of the preceding device. This deliberate positioning of the Reference CLK and Reference FP with respect to the Primary FP is programmable by system software. Therefore, each interface device in the cascade responds only to a unique address by system software in order to correctly provision the proper timing relationships required to support the whole cascade.

The one clock period of delay between each interface device in the cascade is required due to the placement of a data latch between the bidirectional port and the output port of each device. A one bit (i.e., one clock period) delay is encountered by traversing a given interface device in a cascade configuration in this direction, therefore, the reference timing of each device must be delayed by one Primary CLK period with respect to the previous device in the cascade to ensure that the SONET data will still have all data elements in their proper respective byte locations at the end of the cascade.

The timing diagram example of FIG. 34 shows the devices running their respective tributary interfaces at the three supported rates, 38.88 MHz, 19.44 MHz, and 6.48 MHz and showing their respective data bits coinciding with their respective reference clock rates. The basic operational mode of each device is controlled by software provisioning. The first cascade device shows 38.88 MHz operation, the second cascade device shows 19.44 MHz operation, and the third and last cascade devices each show 6.48 MHz operation.

Some of the Output Data bits in the timing diagram example are labeled with the symbol "X". This is to indicate that the Output Data bit in that position is not carrying any valid data from that particular device. Valid data may have already been assigned into the "X" marked bit time slot by a previous device in the cascade. The timing diagram of FIG. 34 shows an example of this in the Output Data bit streams of the group of the last three cascaded devices. The second cascade device shows A1' bit assignments in the last three bit time slots highlighted in gray, the third cascade device shows the A1' bit assignment in the first bit highlighted time slot, and the last cascade device shows the A1' bit assignment to the second highlighted time slot.

It is noted that the timing diagrams show only one bit position for the data, however, there are in reality sixteen parallel data bits in the PCM bus (a low byte and a high byte). In all, twelve byte time slots are available for assignment before the bandwidth of the 16 bit wide data bus is exhausted. In addition, there are two redundant PCM buses, one carries a "working" data bit stream, the other carries a "protection" data bit stream which is an identical copy of the working data bit stream which can be selected (switched over to) in case the working data bit stream fails for some reason.

In the timing diagram example, the output data from the last device shows the twelve A1 byte data field delayed from the Primary FP by thirteen Primary CLK periods. This amount of delay must be accommodated by any subsequent data manipulation devices by either designing in a fixed delay offset from the Primary FP into the downstream devices or providing a software programmable delay offset into the downstream devices to accomplish the same purpose. Further, the downstream devices must also "know" the location of the OC-12 frame boundaries for proper data manipulation.

Alternate Receive Direction Cascade Timing Diagram

All the above comments with regard to FIG. 34 apply equally for the timing diagram example shown in FIG. 35, with the exception of the Reference FP alignments for the tributary group interfaces. In the previous case shown in FIG. 34, the Output Data showed thirteen Primary Clock periods of delay with respect to the Primary FP. To compensate for this delay, the Alternate cascade timing diagram scheme has been designed.

FIG. 35 shows the Alternate cascade timing scheme. The Reference FP will be phased with respect to the Primary FP in such a fashion to "lead" the Primary FP by an appropriate amount of clock periods. In the example of four devices in a cascade, the first cascade device will assert a high level Reference FP twelve clock periods prior to the high level assertion of the Primary FP. The other operational considerations of the relative timing between devices are the same as described above with respect to the timing diagram of FIG. 34. However, with the alternative timing scheme of FIG. 35, the Output Data from the last cascade device shows the highlighted twelve A1 byte data group coinciding directly with the high level assertion of the Primary FP. Thus, the alternative receive path timing scheme allows subsequent downstream data manipulation devices to determine the location of the OC-12 frame boundaries without having to accommodate a delay offset from the Primary FP.

Transmit Direction Cascade Timing Diagram

An example of operational timing of the transmit path of cascaded interface devices according to the present invention is shown in FIG. 36. The basic organization for the transmit direction timing diagram example is much the same as in the receive examples. The top two traces represent the Primary CLK and internally generated Secondary Frame Pulse (FP). The other sixteen traces are grouped as four sets of four signals representing four devices operating in a cascade configuration. The Secondary FP is generated from the Primary FP signal which is required by every device regardless of its operational configuration. The Secondary FP signal basically is a re-phased and re-timed version of the Primary FP which represents the accumulated delays of the SONET payload data after it traverses the STS POH, VT Pointer alignment, and the TSI switching matrix and reappears at the input of the interface device in the transmit direction.

In the transmit case, the Input Data is the PCM data output from the TSI switching matrix destined for the tributary units. The transmit device function in the transmit direction is to remove selected data time slots from the PCM data stream and output this data to the tributary unit at the appropriate rate with correct Reference CLK and Reference FP alignment. The timing example shows the first cascade device operating in the 38.88 MHz mode, which would support an OC-12 tributary unit. The second cascade device is shown operating in the 19.44 MHz mode, which would support OC-3 or DS3 tributary units. The third and last cascade devices are each shown operating in the 6.48 MHz mode, which would support DS1 tributary units.

The basic operational mode of each individual interface device in the cascade is controlled by software provisioning. Also, each subsequent cascaded device is software programmable to align the Reference CLK and FP with one Primary CLK time period of delay with respect to the previous cascade device. As explained above with regard to the receive case, this delay is due to the fact that there is a single data latch between the input data port and the bidirectional data port on the device which causes a one clock period delay when traversing the device in a cascade configuration. The high level assertion of the Reference FP coincides with the appearance of the A1' bytes in the outgoing Data signal to indicate to downstream data manipulation circuits the location of the OC-N frame boundaries, where N=12, 3, or 1.

A.7. Microprocessor Interface and Control Logic

Programming of the functions of the various elements of an interface device according to the invention is handled through the Microprocessor Interface and Control Logic block 80 (the control block). The control block 80 contains a set of data registers which are set with a predetermined configuration by a central processor (not shown). The other elements of the interface device are controlled by the contents of the registers in the control block 80 via control lines.

Functional selections controlled by the registers of the control block 80 include: setting clock rates, order of the selection process in the swap buffers, enablement of data buffers and latches, and selection of routings through selection latches.

The common (or central) microprocessor which controls the entirety of interface devices which are being used together sends configuration data to the control blocks of each interface device so as to configure the operational character of an entire interface system. The central microprocessor provides an interface to the human operator and keeps a history log of the operation of the interface system as well as gathering alarm signals from about the system.

Figure 40:
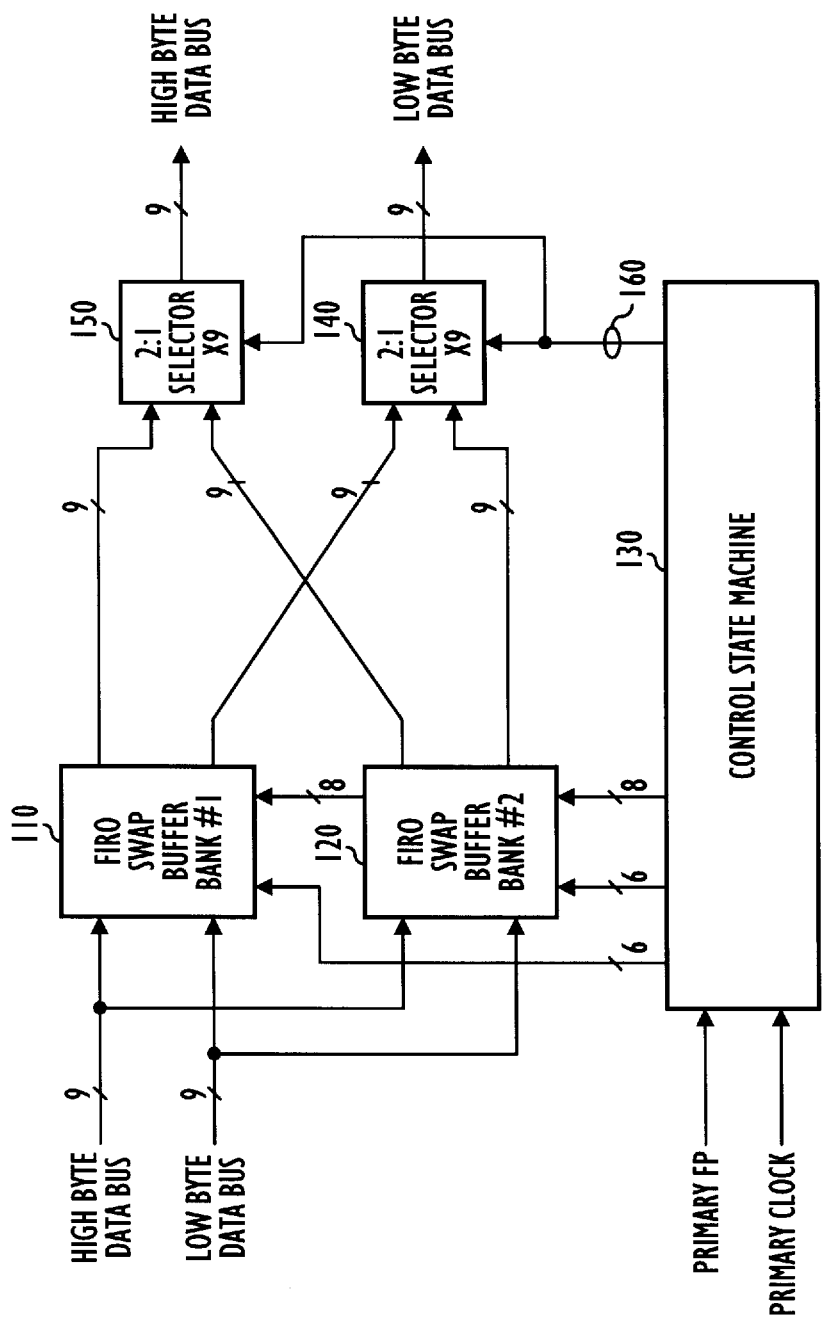
FIG. 40 shows a block diagram of the TSA 12 byte FIRO swap buffer block shown in FIG. 1A.
Figure 41:
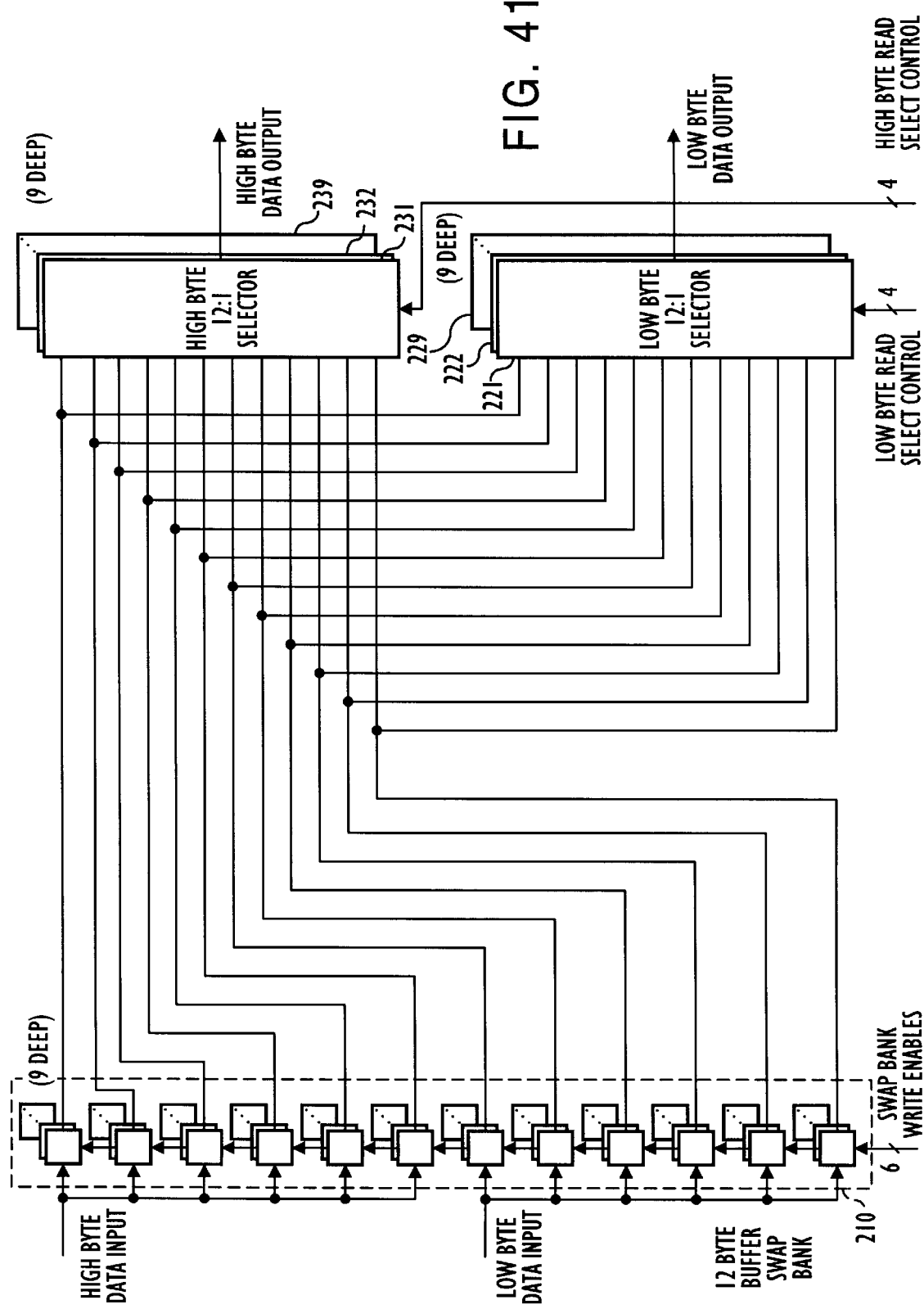
FIG. 41 shows a schematic diagram of a single FIRO swap buffer bank block shown in FIG. 39.
Figure 42:
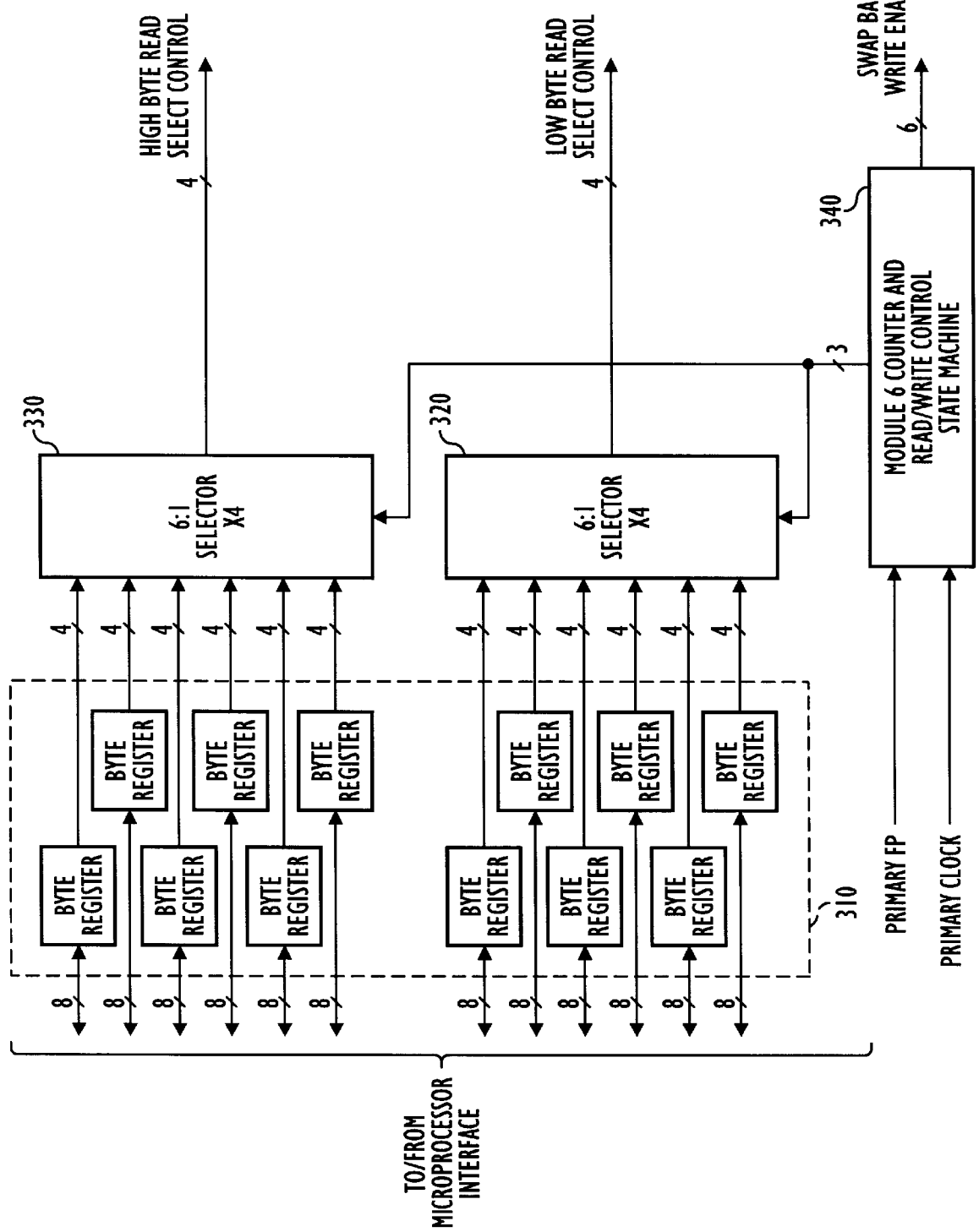
FIG. 42 shows a block diagram of the control circuitry for controlling operation of the FIRO swap buffer.

Software provisioning of the particular data registers for controlling operation of the FIRO swap buffers 38, 40 is now described with respect to FIGS. 40–42.

In order to properly control the functions of the 12 byte FIRO swap buffer, a minimum of six byte wide registers are required. Alternatively, to allow maximum flexibility in the assignment of time slots, twenty-four byte wide registers are used. The basic operational function of the 12 byte swap buffer is further described in Sections B.1 through B.3, but a brief summation is given here to describe the interaction between the swap buffers and the register contents which will control the actions of the swap buffers.

A block diagram representing the internal structures of a single 12 byte FIRO swap buffer is shown in FIG. 40. The data bytes written into the swap buffer are written in a fixed, sequential order into one of the buffer banks 110, 120. That is to say, the first byte is written to the first buffer location, the second byte is written to the second buffer location, and so on, through all the locations in that buffer bank. Once all 12 bytes in one buffer bank have been written to, the buffers banks 110 and 120 "swap" and the writing process proceeds unhindered to the other bank of 12 byte buffers. Once the swap has occurred, the data contained in the first bank of 12 byte buffers is extracted in the order given by the contents of the microprocessor interface register set 310 (shown in FIG. 42) which is part of the control state machine 130. Routing of the extracted data bytes to the high byte data rail or the low byte data rail is controlled by the select signal 160 provided to the nine wide 2:1 selector circuits 140, 150.

Data extraction from the buffers is described with reference to FIG. 41. Each data bit in each byte of data written into the 12 byte swap buffer bank 210 may be considered as a single circuit element when considering extraction of the data. Once loaded, there exist in the 12 byte swap buffer bank 210 twelve least significant bits (LSB's), as well as twelve most significant bits (MSB's), and twelve each of all bits in between. Each of these one hundred and eight bits (12 bytes×9 bits per byte) are stored in bit buffers (a D flip-flop for instance). There are nine bits per byte because a "mark" bit is provided to correspond to each eight bits of data.

Each of these bit storage units is connected to the inputs of two 12:1 selector circuits (for example 221 and 231) which can each select any of 12 bits according to the read select control signals of the 12:1 selector. There are eighteen such identical 12:1 selector circuits 221–239 connected to the one hundred and eight bit storage units in the 12 byte swap buffer 210, with each input line of each 12:1 selector connected to a single bit storage unit. There are nine 12:1 selectors 221–229 to select a low byte and nine 12:1 selectors 231–239 to select a high byte. In order to select one state among 12, at least four read select control lines are required, since four digital signals can actually define sixteen total states ($2^4$=16). Twelve select signal combinations are defined to uniquely identify one of the 12 stored bits, and the remaining four states are used to select fixed bit values (all ones, zeroes, or alternating bit patterns such as 1010, etc.), or alternatively, may remain undefined.

Each clock period of the Primary Clock, two four bit patterns are selected in sequence from the microprocessor interface register set and used to control the four select lines of a pair of the 12:1 selector circuits (one of the pair of four for a single bit of data destined for the low byte rail, the other of the pair for a single bit of data destined for the high byte rail). In six primary clock periods, 12 four bit patterns are selected in a fixed sequence from the register set 310 and the sequence is then repeated to extract the data now written in the other 12 byte bank in the swap buffer. The order of how the output data appears on the swap buffer outputs is therefore determined by the contents of the fixed sequence register set 310 which are read out cyclically in a fixed order by the four wide 6:1 Selectors 320, 330 which are each driven by a modulo 6 counter 340.

If the working and protection data streams are constrained to be manipulated identically, the fixed sequence register set requires six total byte wide registers, each register byte divided into a low nibble and a high nibble (a nibble being four bits wide). Each nibble simultaneously controls the working and protection swap buffers low and high bytes respectively. As shown in FIG. 42, for maximum flexibility, each four bit selector pattern is contained in a byte of the register set 310 which would "waste" four bits of each register byte (the four unassigned bits may be used for some other purpose). Twelve byte wide registers 310 are used to control the working data stream (six for the low bytes and six for the high bytes) and another twelve (not shown) used to independently control the protection data stream for a total of 24 byte wide registers.

In much the same manner, the control of other functional blocks from the microprocessor interface register set is accomplished. The setting for the direction of the bidirectional data ports (input data flow or output data flow) is determined by the value of specific bits contained in a given byte location of the register set. Likewise, the output enable, 4:1 selector, 2:1 selector, and parity check functions are set to the desired configuration by manipulating the value of specific bits in other register locations.

B. Operational Modes

An interfacing device according to the present invention is operable in one of three basic selectable modes of operation. The first mode supports OC-12 payload data rate tributaries. The second mode supports OC-3, OC-1, and DS3 payload data rate tributaries. The third mode supports DS1 payload data rate tributaries. Each of these operational modes requires at least one interfacing device to support the receive data path and at least one other interfacing device to support the transmit data path.

B.1.a. OC-12 Unit Support—Receive Data Path

In this mode of operation, the timing generator 70 operates essentially at the 38.88 MHz rate. The 38.88 MHz Primary Clock is passed through to the REF-CLK output without being divided down. The Frame Pulse (FP) is re-timed and output as REF-FP. The Reference Clock and Frame Pulse are utilized by the OC-12 unit to convert the timing of the incoming SONET line signal to the selected local reference timing. An internal 38.88 MHz clock is also provided to capture the data coming from the OC-12 interface unit(s).

For the OC-12 supporting receive path operation mode, two parallel bytes at the 38.88 Mbps rate (one byte occupies the low byte data rail while the other byte occupies the high byte data rail) are written sequentially into a bank of six pairs of byte wide buffers by write enable signals generated by the Programmable Timing Generator. After the last pair of bytes of a 12 byte group have been written into the sixth buffer location, the incoming data is then diverted and written into a second, identical data buffer bank. After the second data buffer bank has been filled, the incoming data is then swapped back to the first buffer bank and the data writing process continues. This cyclical process proceeds without interruption.

Once the 12 byte group is written and the data swap to the other bank is complete, the bytes are extracted in any desired order (while still maintaining the 12 byte grouping) by read enable signals generated in response to software provisioning controlling a dual 12:1 selector (multiplexing) circuit. The FIRO supporting the data channel connected to the working OC-12 unit must exchange the positions of high and low byte assignments to properly recover the receive data from this unit (Refer to FIG. 22). The swapping of the high and low byte positions is required due to the hard wired data path connections in the backplane and the different types of interface modules that must interface in different ways to the backplane data buses. The capability to broadcast one or more selected bytes into other time slots is also supported in this functional block.

Examples of how an interface device may be configured to function in support of the receive path for the OC-12 level are illustrated generally in FIGS. 2, 3, 6, 8, and 9 which show Examples 1, 2, 5, 7, and 8, respectively. These figures show generalized data flow diagrams for supporting different OC-N levels. The device may be configured to operate in support of a particular level depending upon programming.

Figure 2:
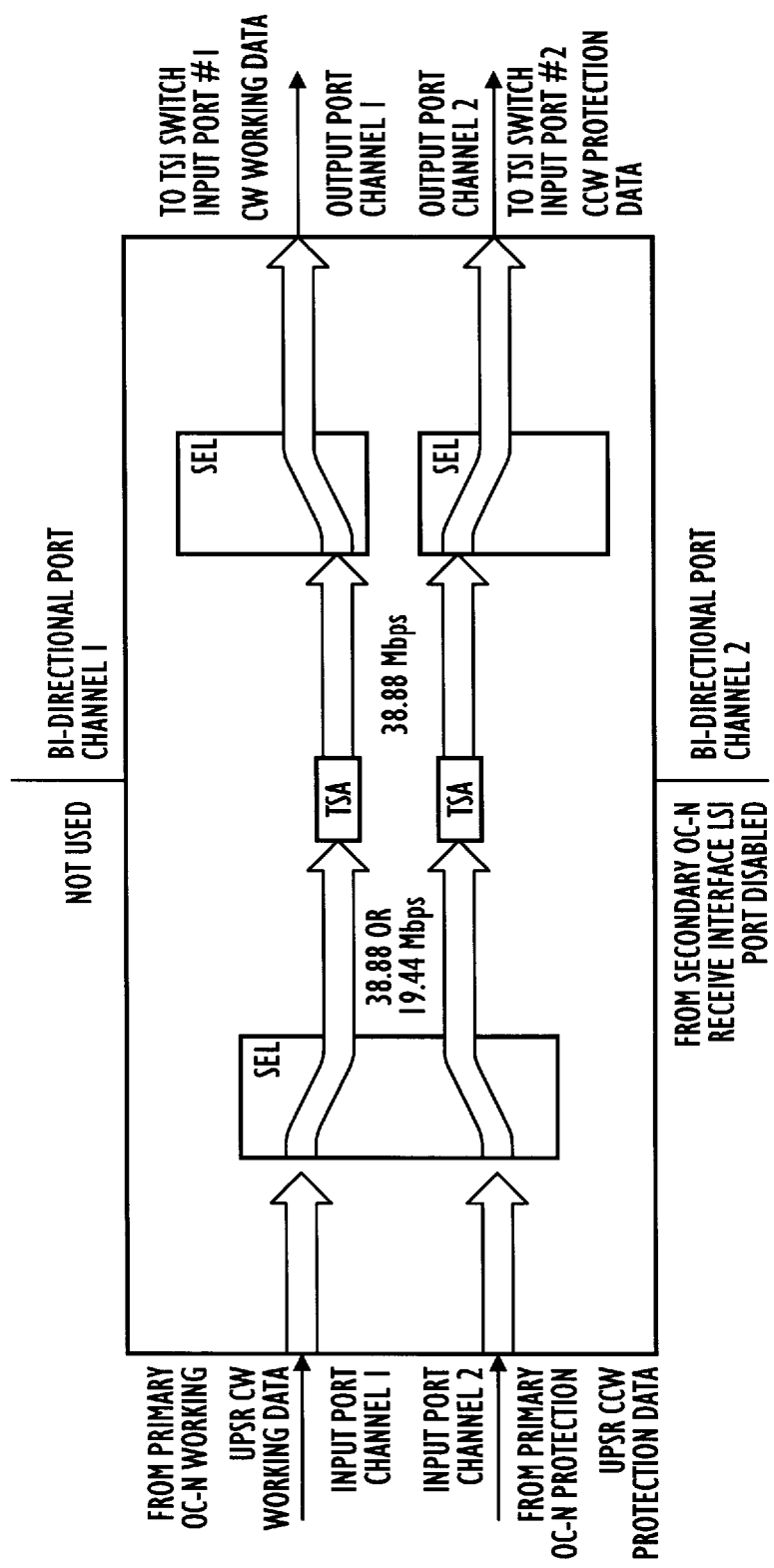
FIG. 2 shows a signal flow diagram of an interfacing circuit operating according to a configuration which supports the receive path for a primary OC-N data payload, including support of interfacing for Uni-Directional Path Switched Ring (UPSR) and two fiber BLSR receive modes.
Figure 3:
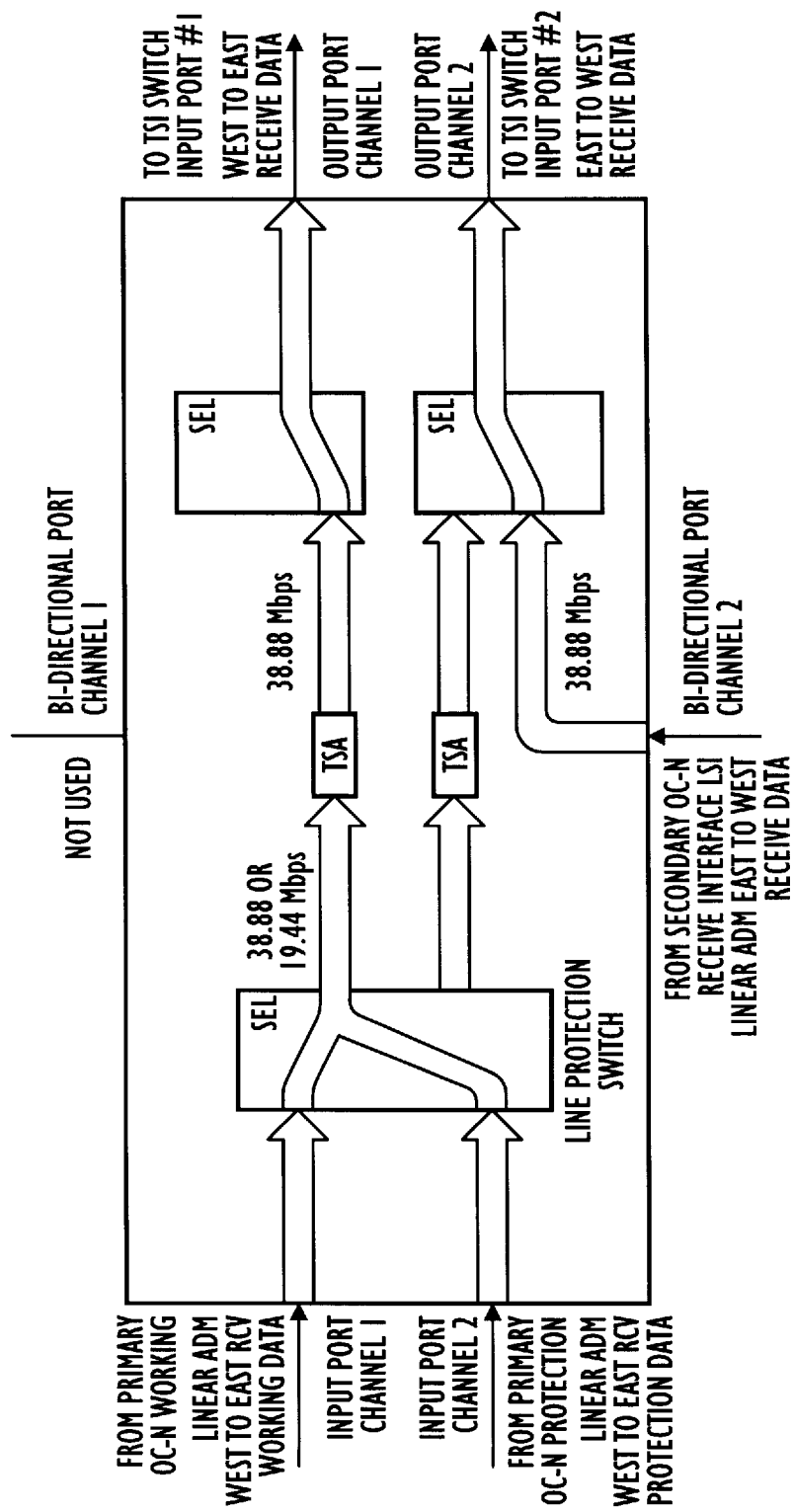
FIG. 3 shows a signal flow diagram of an interfacing circuit operating according to a configuration which supports the receive path for a linear Add/Drop Multiplexing (ADM) data payload at a primary OC-N rate.
Figure 6:
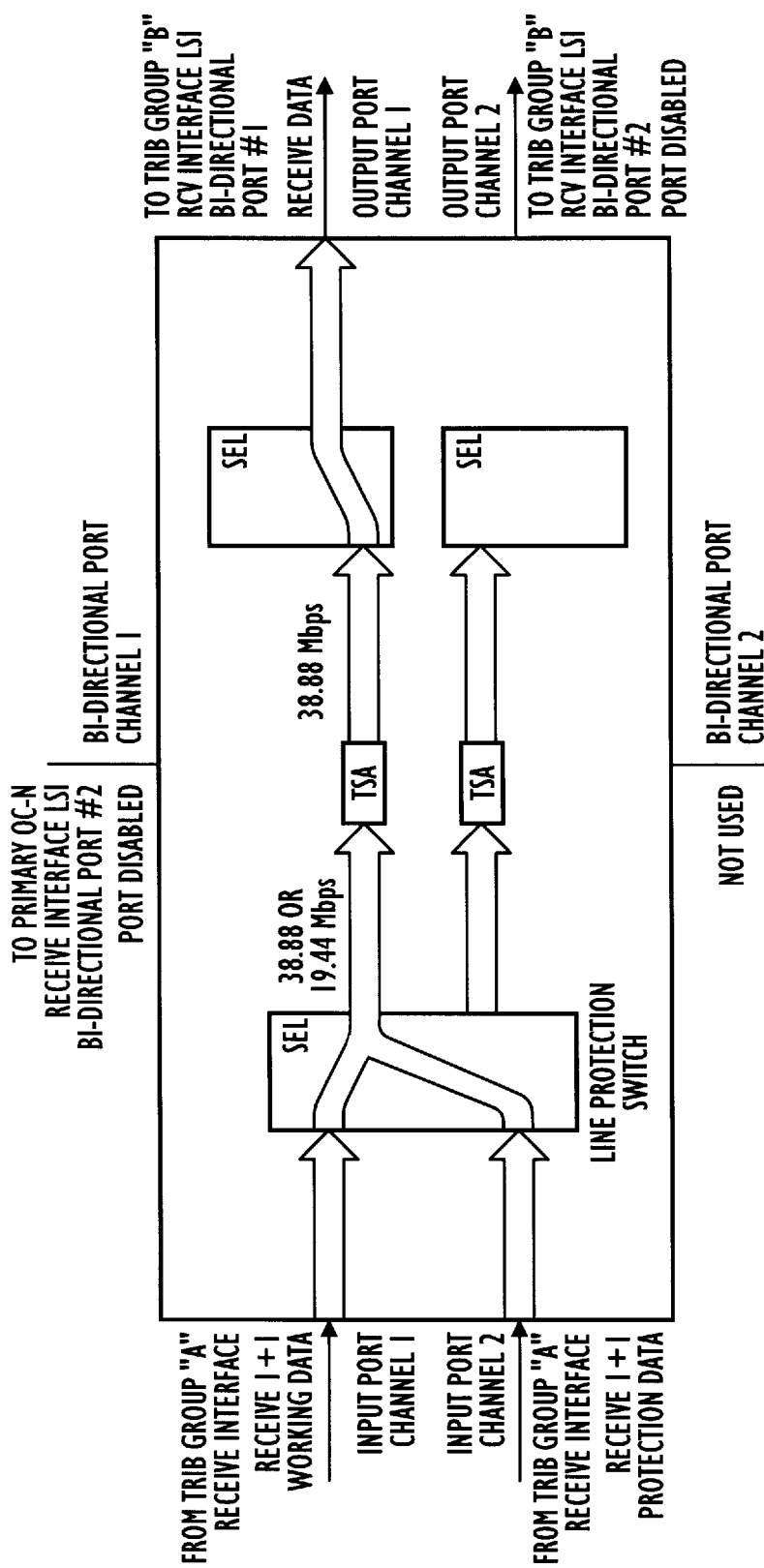
FIG. 6 shows a signal flow diagram of an interfacing circuit operating according to a configuration which supports the receive path for a tributary group "A" 1+1 data payload.
Figure 8:
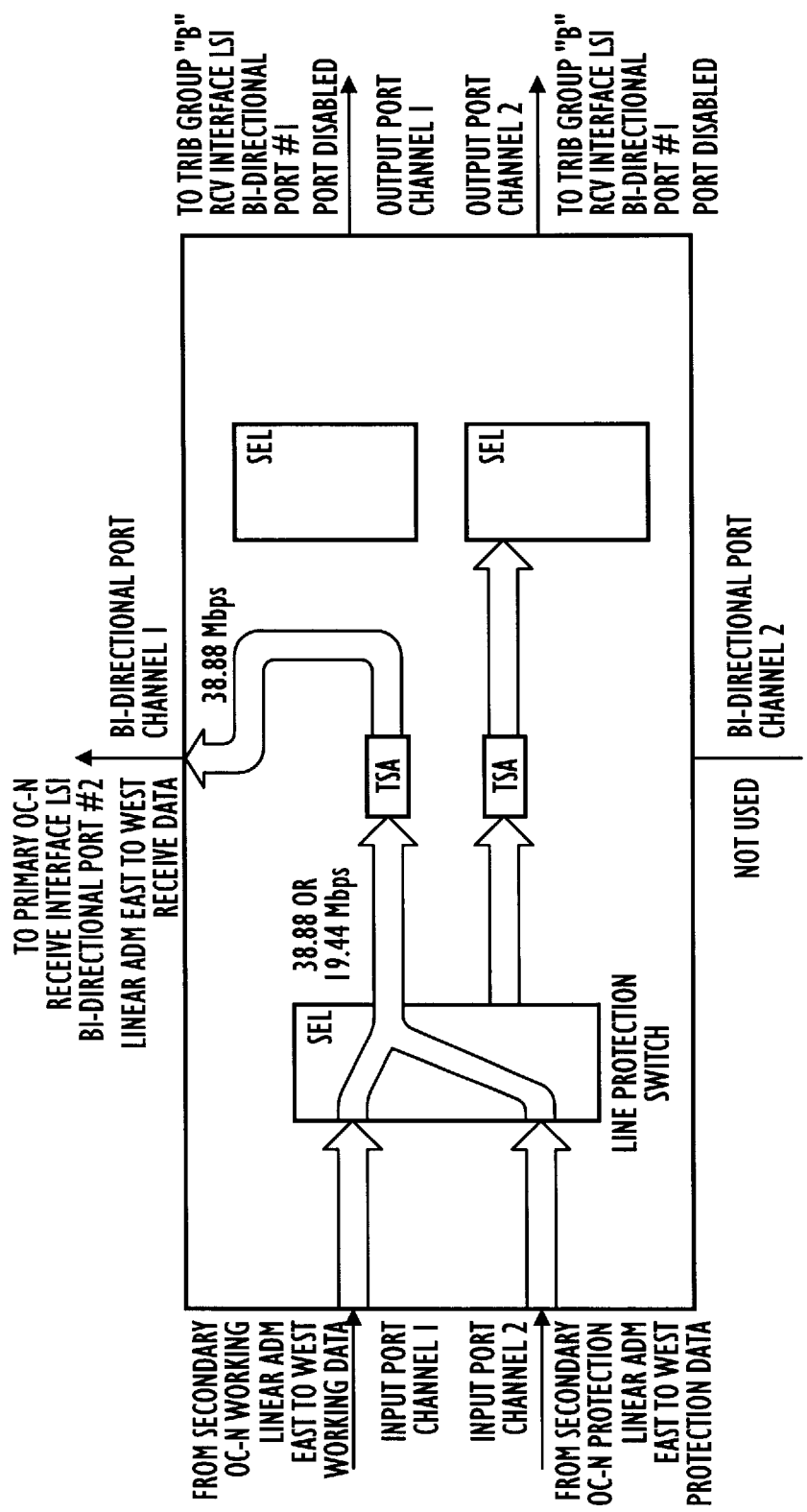
FIG. 8 shows a signal flow diagram of an interfacing circuit operating according to a configuration which supports the receive path for a linear Add/Drop Multiplexed data payload at a secondary OC-N rate.
Figure 9:
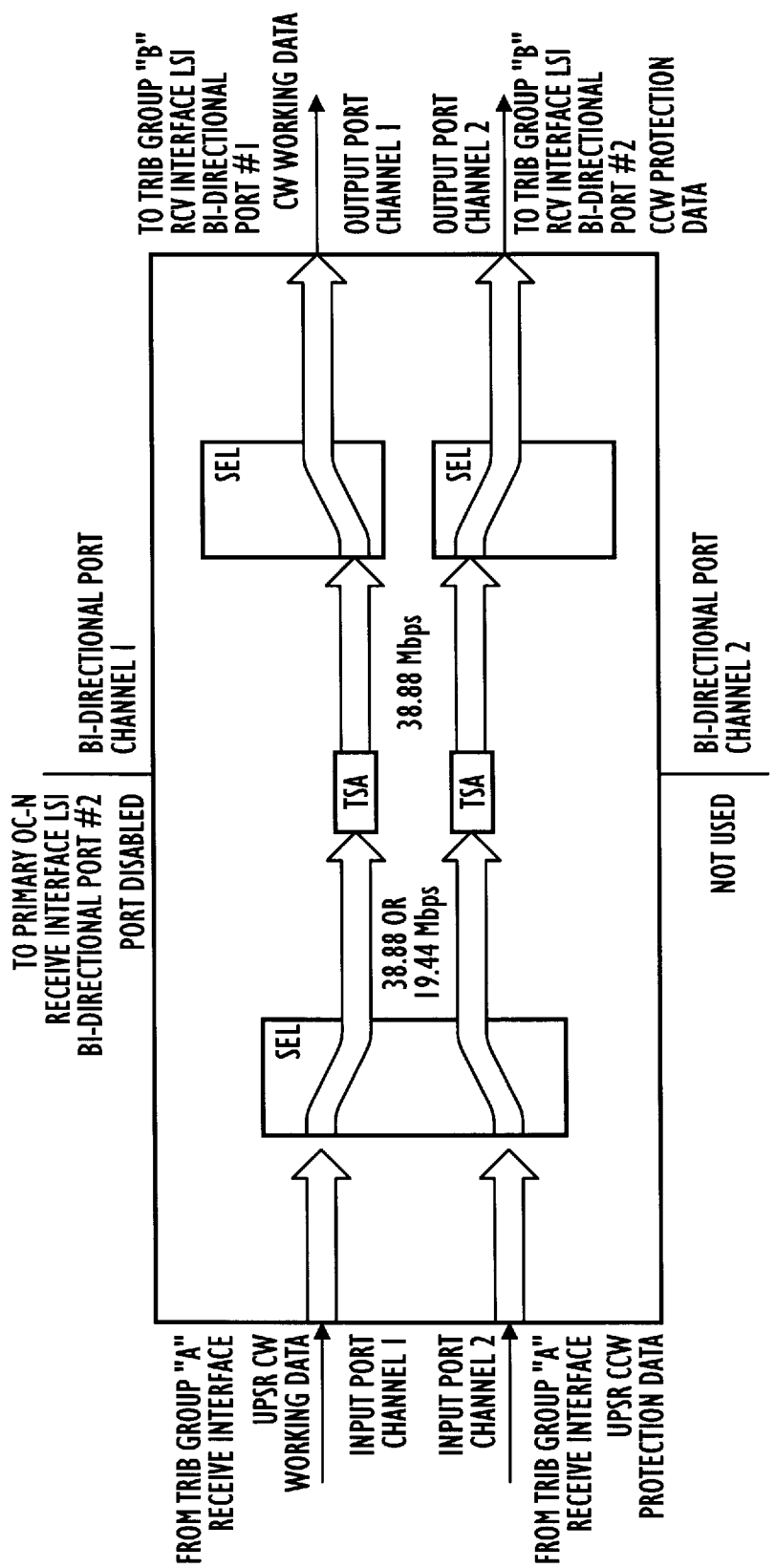
FIG. 9 shows a signal flow diagram of an interfacing circuit operating according to a configuration which supports a receive path for a tributary group "A" Uni-Directional Path Switched Ring data payload.

Example 1 is illustrated in FIG. 2 which shows a data flow schematic for support of the receive path for a primary OC-N data payloads. This includes support of interfacing a Uni-Directional Path Switched Ring (UPSR) and two fiber BLSR receive modes. Example 2, illustrated in FIG. 3, shows a data flow schematic for support of the receive path for a linear Add/Drop Multiplexing (ADM) data payload at a primary OC-N rate. Example 5, illustrated in FIG. 6, shows a data flow schematic for support of the receive path for a tributary group "A" 1+1 data payload. Example 7, illustrated in FIG. 8, shows a data flow schematic in support of the receive path for a linear Add/Drop Multiplexed data payload at a secondary OC-N rate. Example 8, illustrated in FIG. 9, shows a data flow schematic in support of a receive path for a tributary group "A" Uni-Directional Path Switched Ring data payload. Each of these generalized Examples may be configured to include level OC-12 operation.

Figure 22:
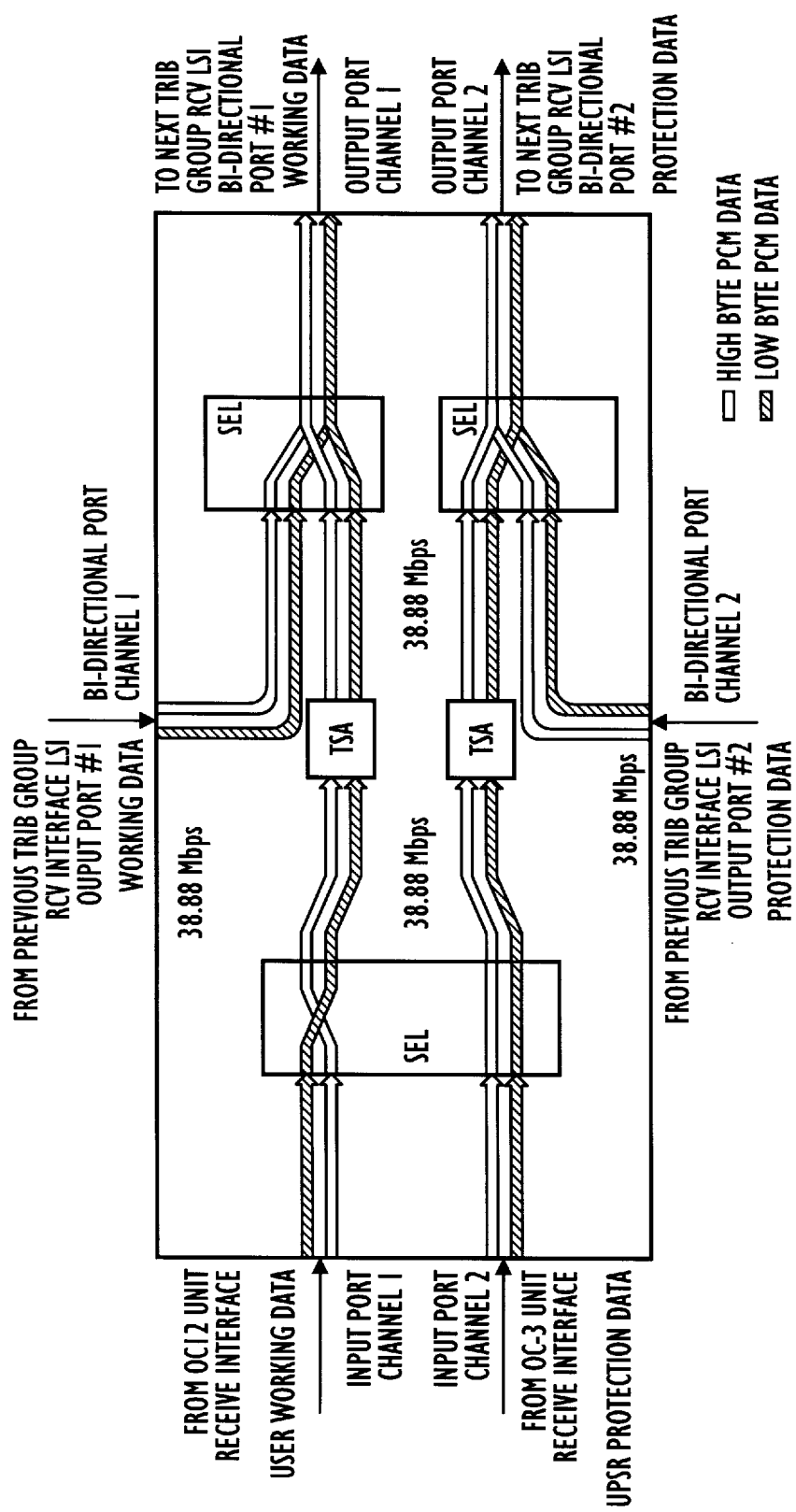
FIG. 22 shows a signal flow diagram of an interfacing circuit operating according to a configuration which supports receive paths for OC-12 rate data.
Figure 25:
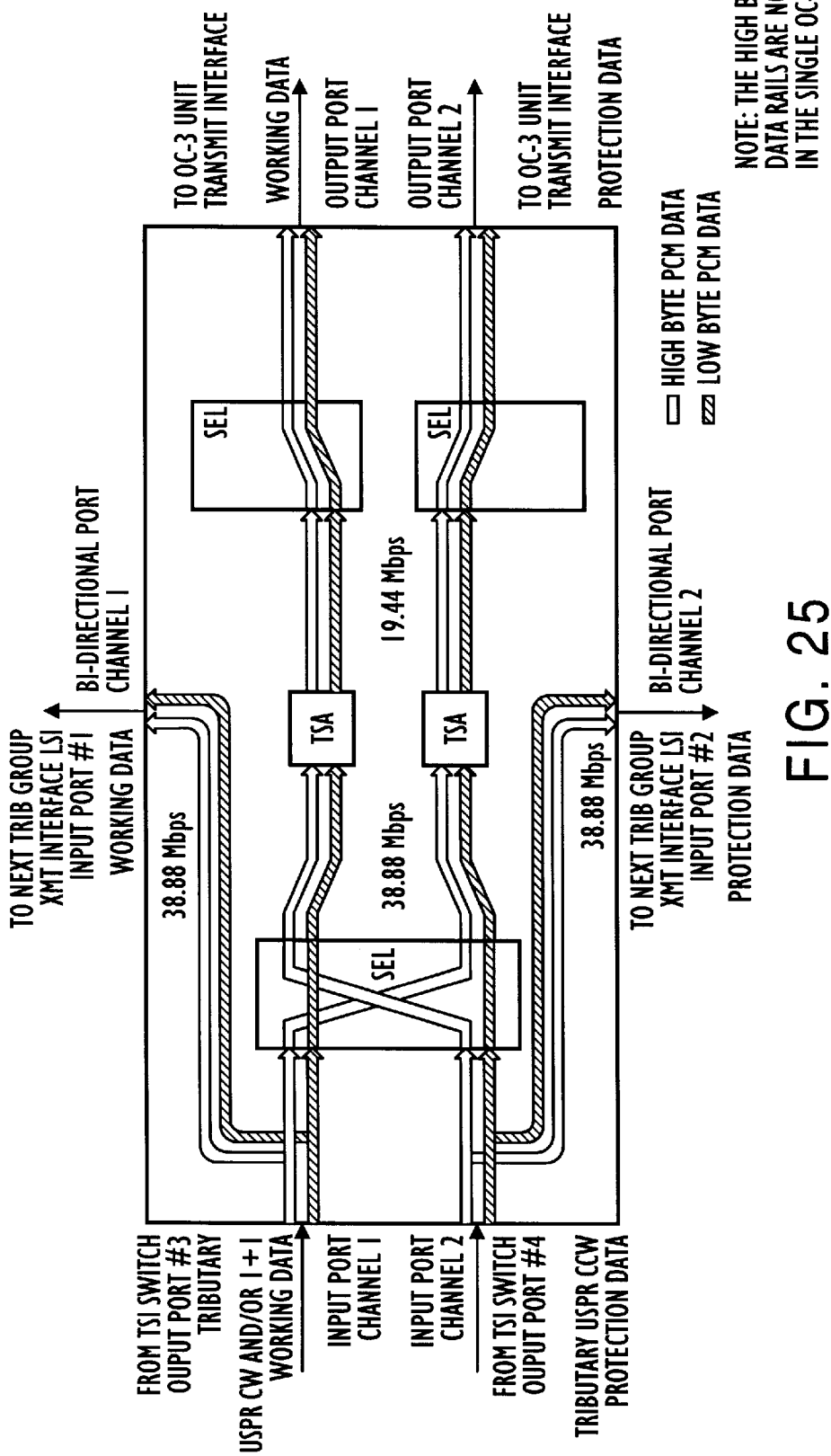
FIG. 25 shows a signal flow diagram of an interfacing circuit operating according to a configuration which supports transmit paths for double OC-3 rate data.
Figure 26:
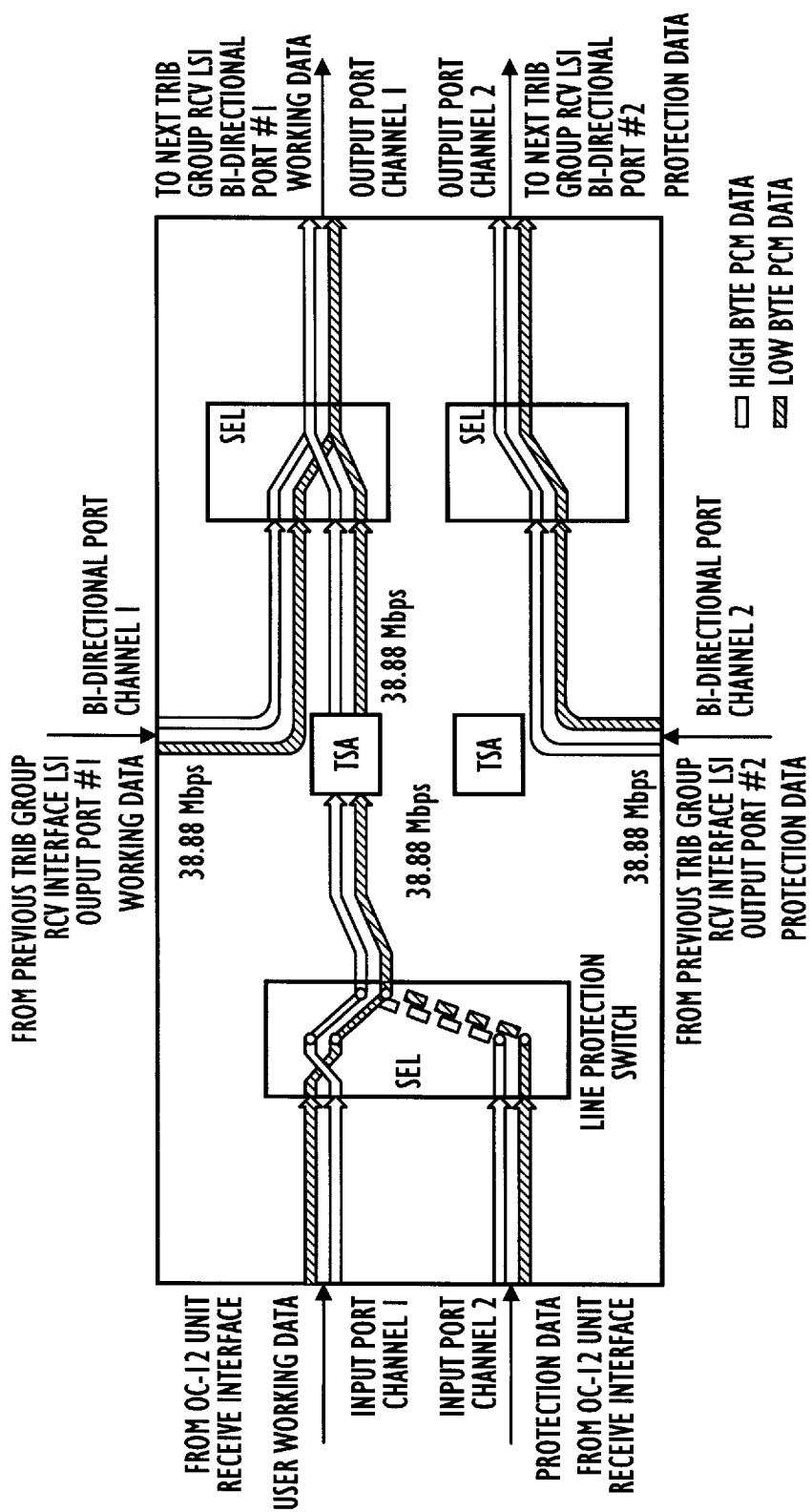
FIG. 26 shows a signal flow diagram of an interfacing circuit operating according to a configuration which supports receive paths for OC-12 rate data using a 1+1 payload.

More specific operational data flow schematics are shown in Examples 21 and 25 which are illustrated in FIGS. 22 and 25, respectively. Example 21, as illustrated in FIG. 22, shows a data flow schematic operating according to a configuration which supports receive paths for a Uni-Directional Path Switched Ring for a tributary group OC-12 rate data payload. Example 25, as illustrated in FIG. 26, shows a data flow schematic of an interfacing circuit operating according to a configuration which supports receive paths for tributary group 1+1 operation for OC-12 rate data payload. In each of these two examples, the interface circuit is shown cascading together for routing data to and from other interfacing circuits.

B.1.b. OC-12 Unit Support—Transmit Data Path

In this mode, the timing generator 70 operates essentially at 38.88 MHz. The 38.88 MHz Primary Clock is passed through to the REF-CLK output without being divided down. A secondary Frame Pulse is required to synchronize the timing generator to the incoming data that is output from the TSI switching matrix and the STS Path Overhead (POH) Generator. This secondary frame pulse preserves the location of the SONET frame boundary after the various signal processing elements of the TSI unit have been traversed. The Secondary Frame Pulse must be derived internally from the Primary Frame Pulse and used to synchronize the timing generator. A re-timed version of the secondary frame pulse is output on the REF-FP pin to the OC-12 interface unit in order to synchronize the insertion of the TOH in the outgoing (downstream) OC-12 data.

In the OC-12 rate supporting transmit path operation mode, two parallel bytes at the 38.88 Mbps rate (output from the TSI switching matrix) are written sequentially into the data swapping FIRO (six pairs of byte wide buffers per bank) by write enable signals generated by the Programmable Timing Generator. The bytes can then be extracted in the same order as written (when supporting the protection OC-12 unit) or the position of the high and low bytes can be exchanged (when supporting working OC-12 unit) by read enable signals generated in response to software provisioning (Refer to FIG. 24). The swapping of the high and low byte positions is required due to the hard wired data path connections in the backplane and the different types of interface modules that must interface in different ways to the backplane data busses. Broadcasting into additional time slots is also supported.

Examples of how an interface device may be configured to function in support of the transmit path for the OC-12 level are illustrated generally in FIGS. 4, 5, 10, 11, and 13 which show Examples 3, 4, 9, 10, and 12, respectively. These figures illustrate generalized data flow diagrams for supporting different OC-N levels. The device may be specified to operate in support of a particular level depending upon the manner in which it is programmed.

Figure 4:
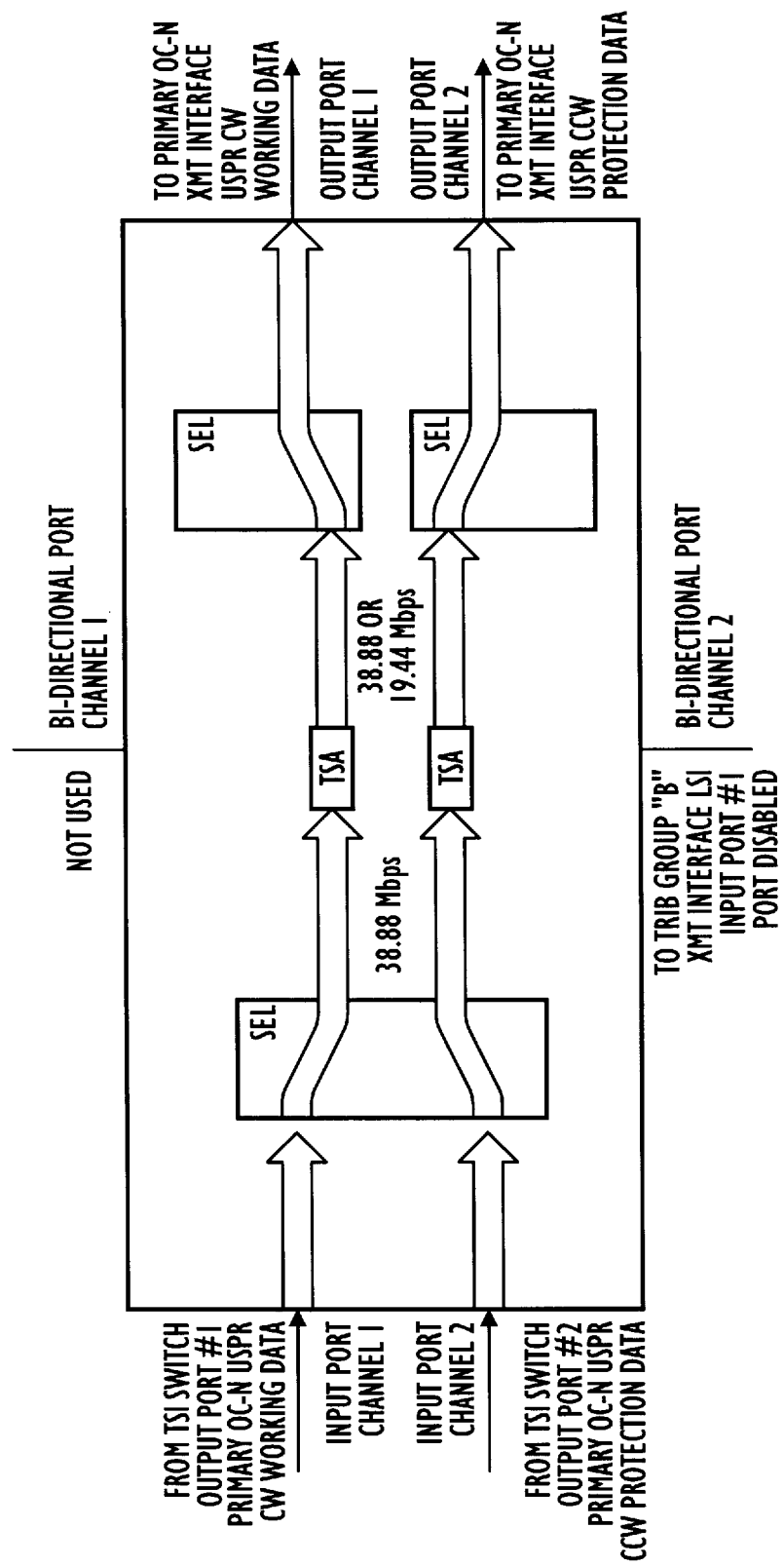
FIG. 4 shows a signal flow diagram of an interfacing circuit operating according to a configuration which supports the transmit path for a primary OC-N data payload, including support of interfacing for Uni-Directional Path Switched Ring (UPSR) and two fiber BLSR transmit modes.
Figure 5:
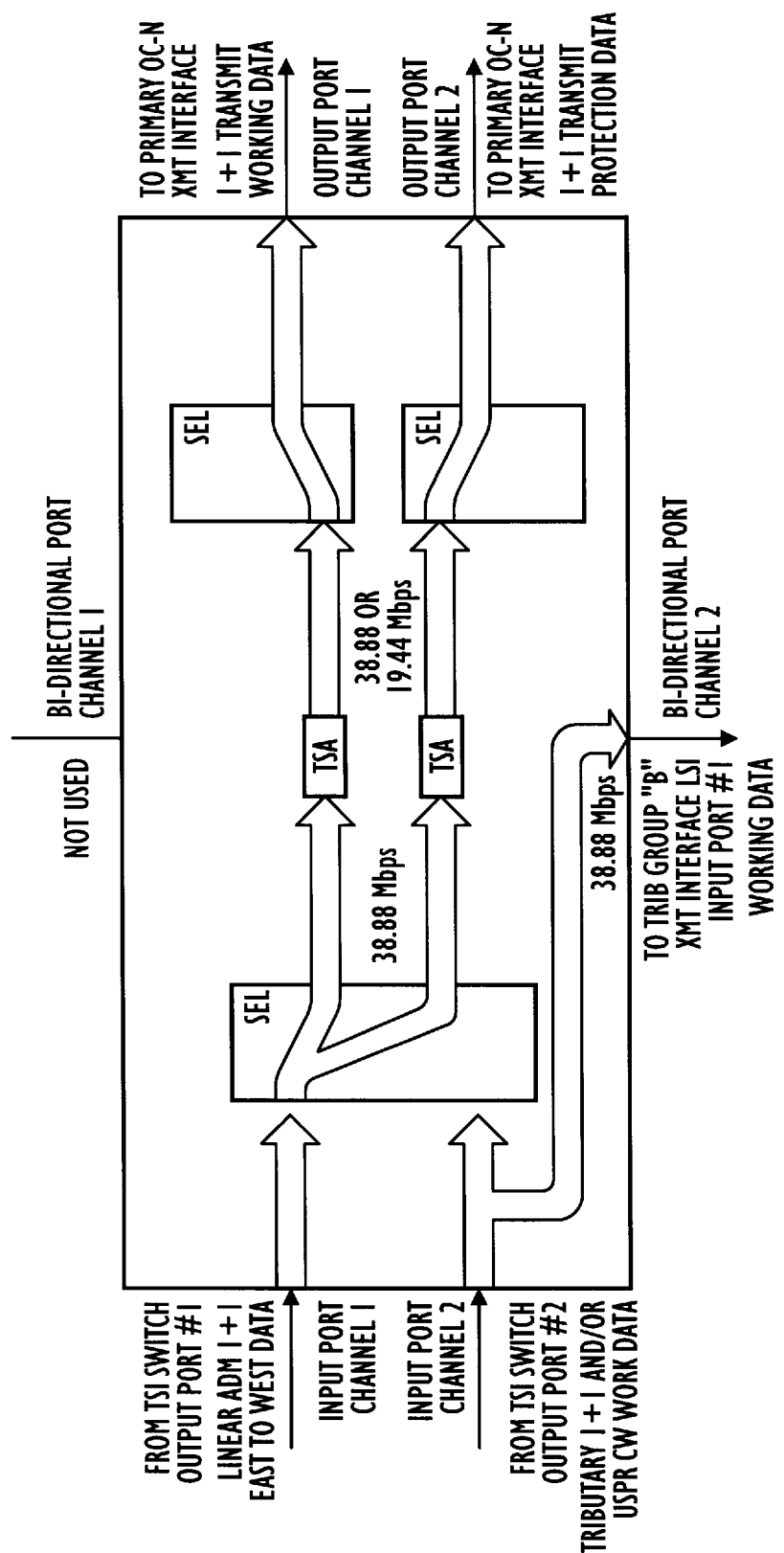
FIG. 5 shows a signal flow diagram of an interfacing circuit operating according to a configuration which supports the transmit path for a linear Add/Drop Multiplexed (ADM) data payload at a primary OC-N rate.
Figure 10:
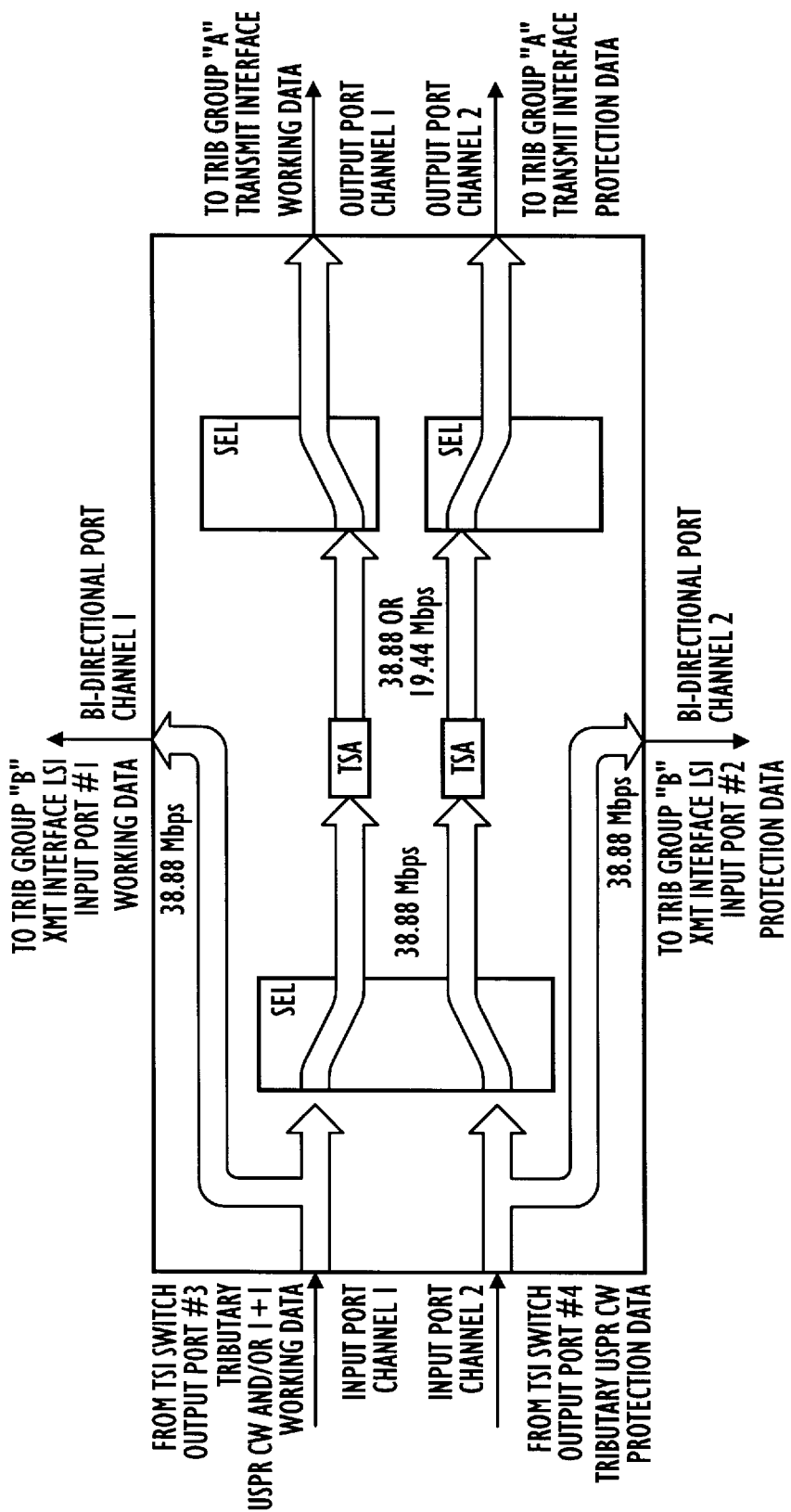
FIG. 10 shows a signal flow diagram of an interfacing circuit operating according to a configuration which supports a transmit path for a tributary group "A" Uni-Directional Path Switched Ring data payload.
Figure 11:
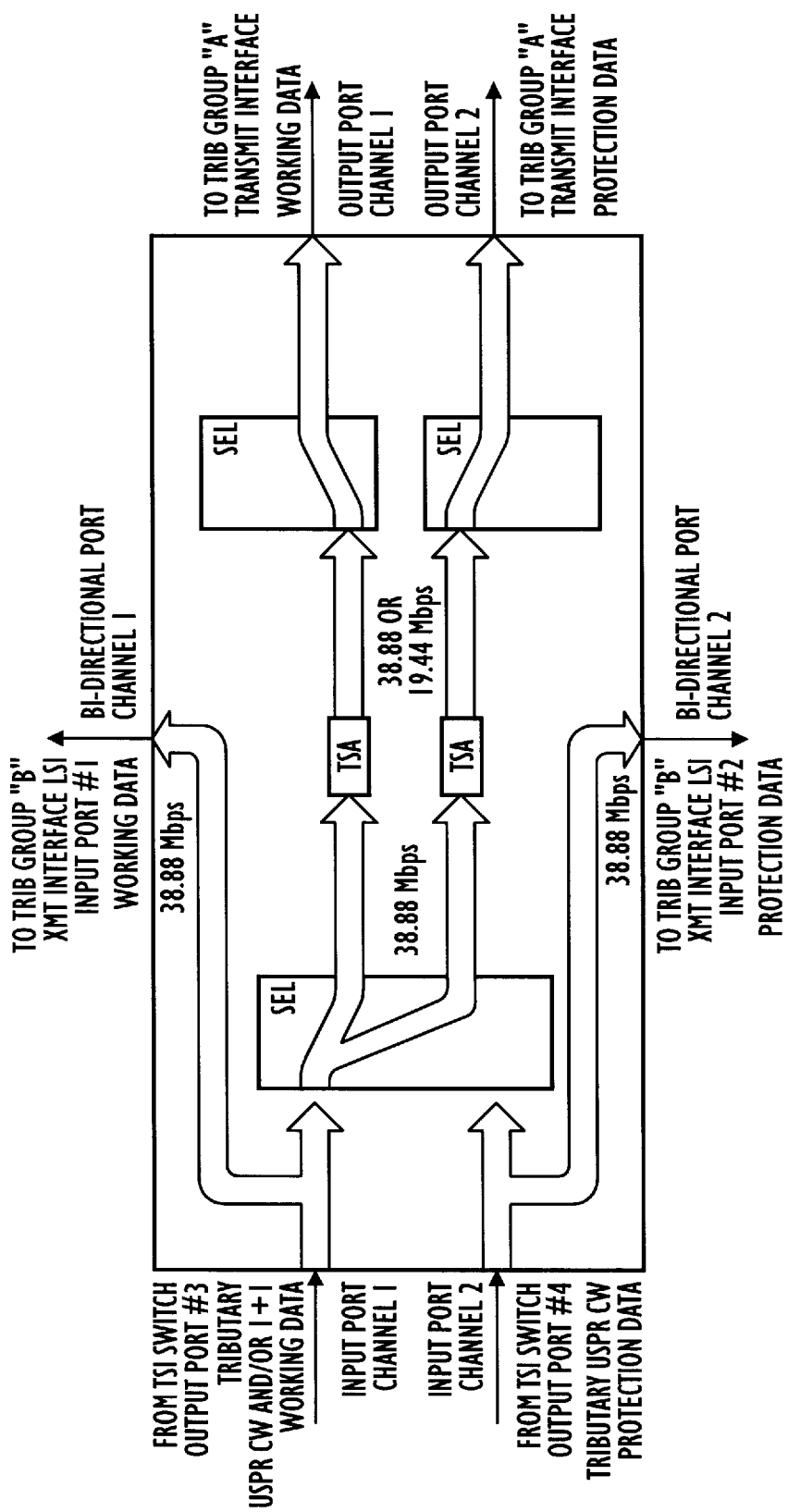
FIG. 11 shows a signal flow diagram of an interfacing circuit operating according to a configuration which supports a transmit path for a tributary group "A" 1+1 data payload.
Figure 13:
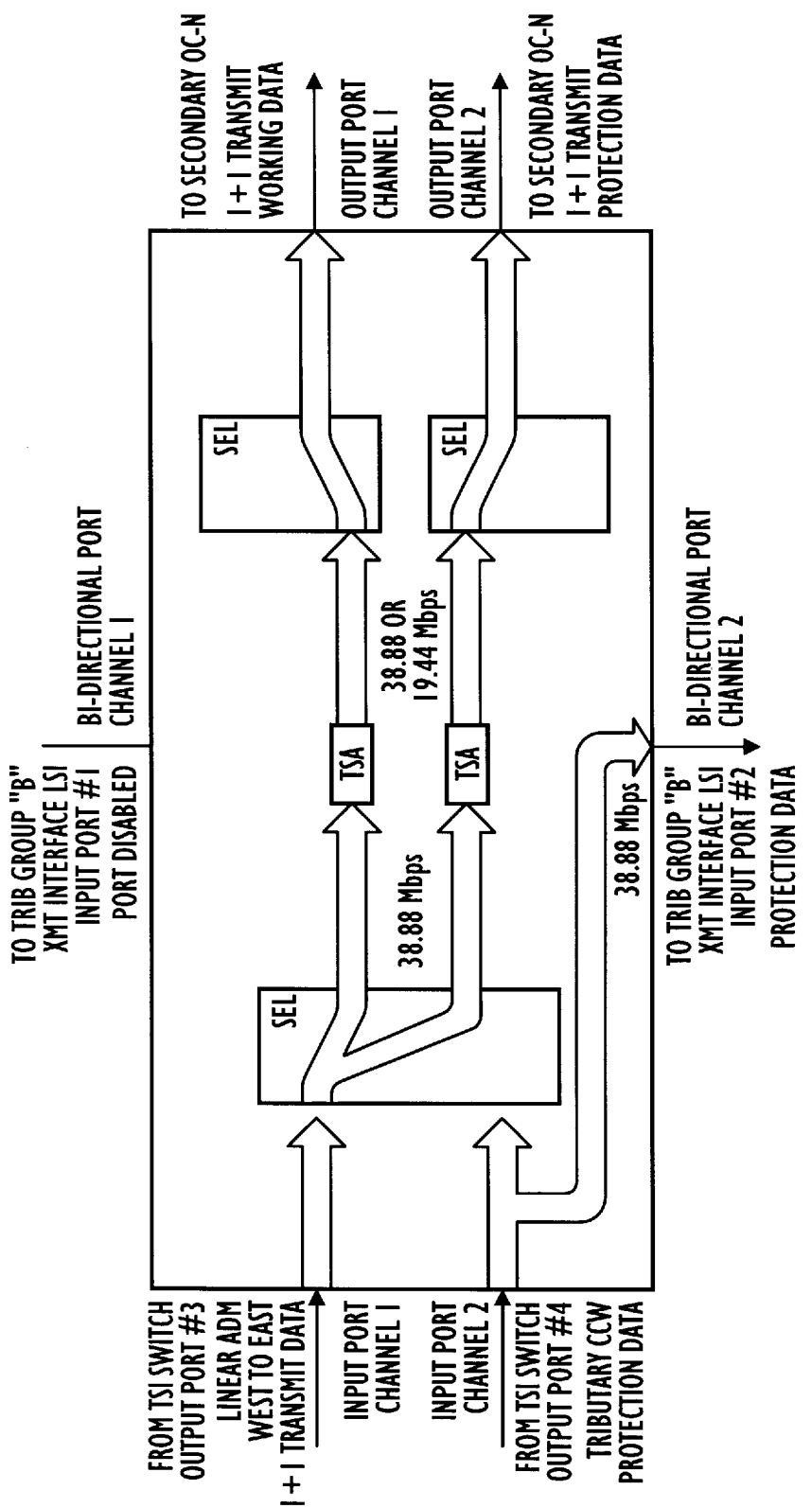
FIG. 13 shows a signal flow diagram of an interfacing circuit operating according to a configuration which supports a transmit path for a secondary OC-N linear Add/Drop Multiplexed data payload.

Example 3, illustrated in FIG. 4, shows a data flow schematic of an interface circuit operating according to a configuration which supports the transmit path for a primary OC-N data payload for a Uni-Directional Path Switched Ring or a Two Fiber BLSR transmit mode. Example 4, illustrated in FIG. 5, shows a data flow schematic of an interfacing circuit operating according to a configuration which supports the transmit path for a linear Add/Drop Multiplexed (ADM) data payload at a primary OC-N rate. Example 9, illustrated in FIG. 10, shows a signal flow diagram of an interfacing circuit operating according to a configuration which supports a transmit path for a tributary group "A" Uni-Directional Path Switched Ring data payload. Example 10, illustrated in FIG. 11, shows a signal flow diagram of an interfacing circuit operating according to a configuration which supports a transmit path for a tributary group "A" 1+1 data payload. Example 12, illustrated in FIG. 13, shows a signal flow diagram of an interfacing circuit operating according to a configuration which supports a transmit path for a secondary OC-N linear Add/Drop Multiplexed data payload.

Figure 24:
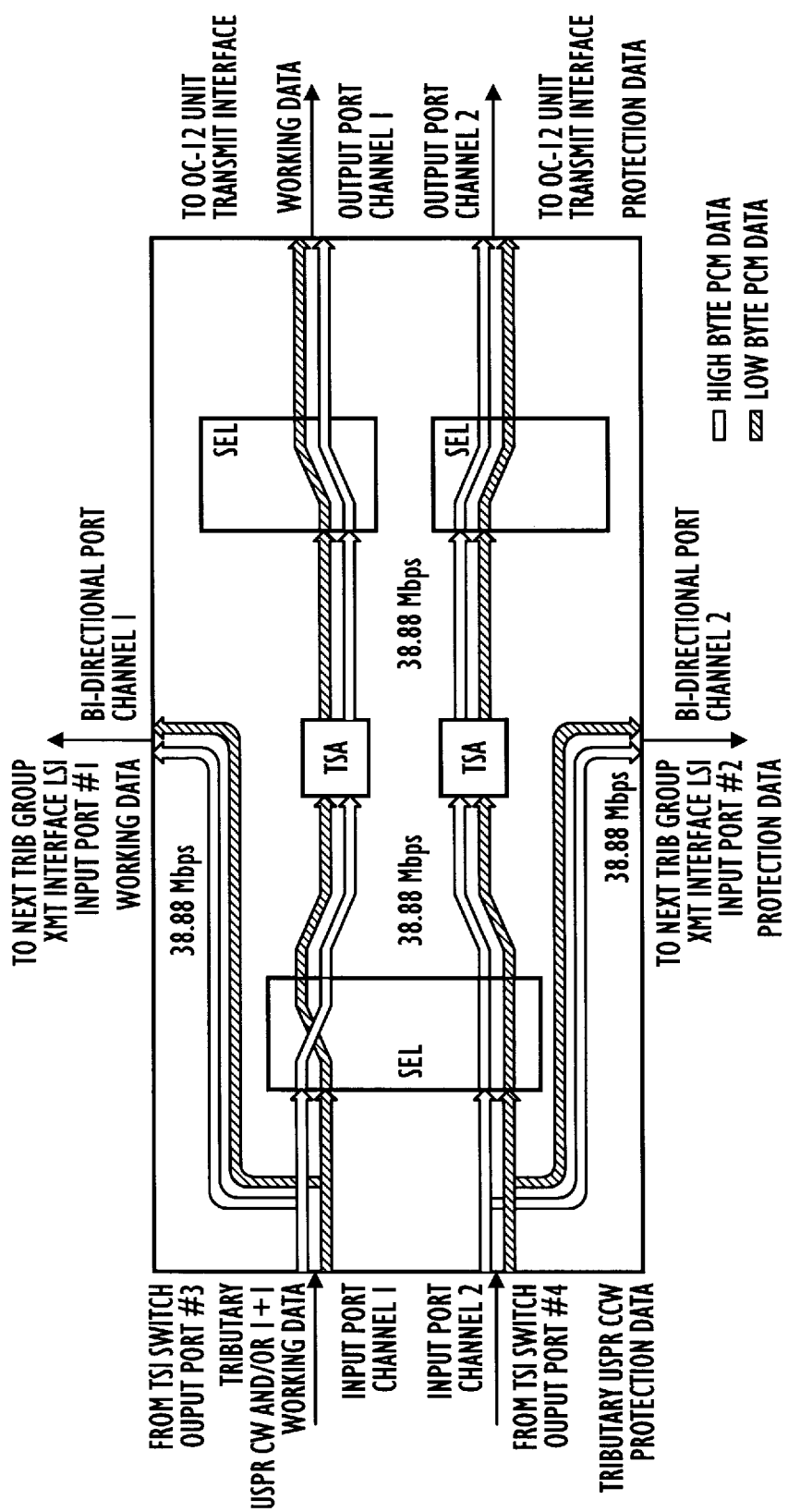
FIG. 24 shows a signal flow diagram of an interfacing circuit operating according to a configuration which supports transmit paths for OC-12 rate data.
Figure 28:
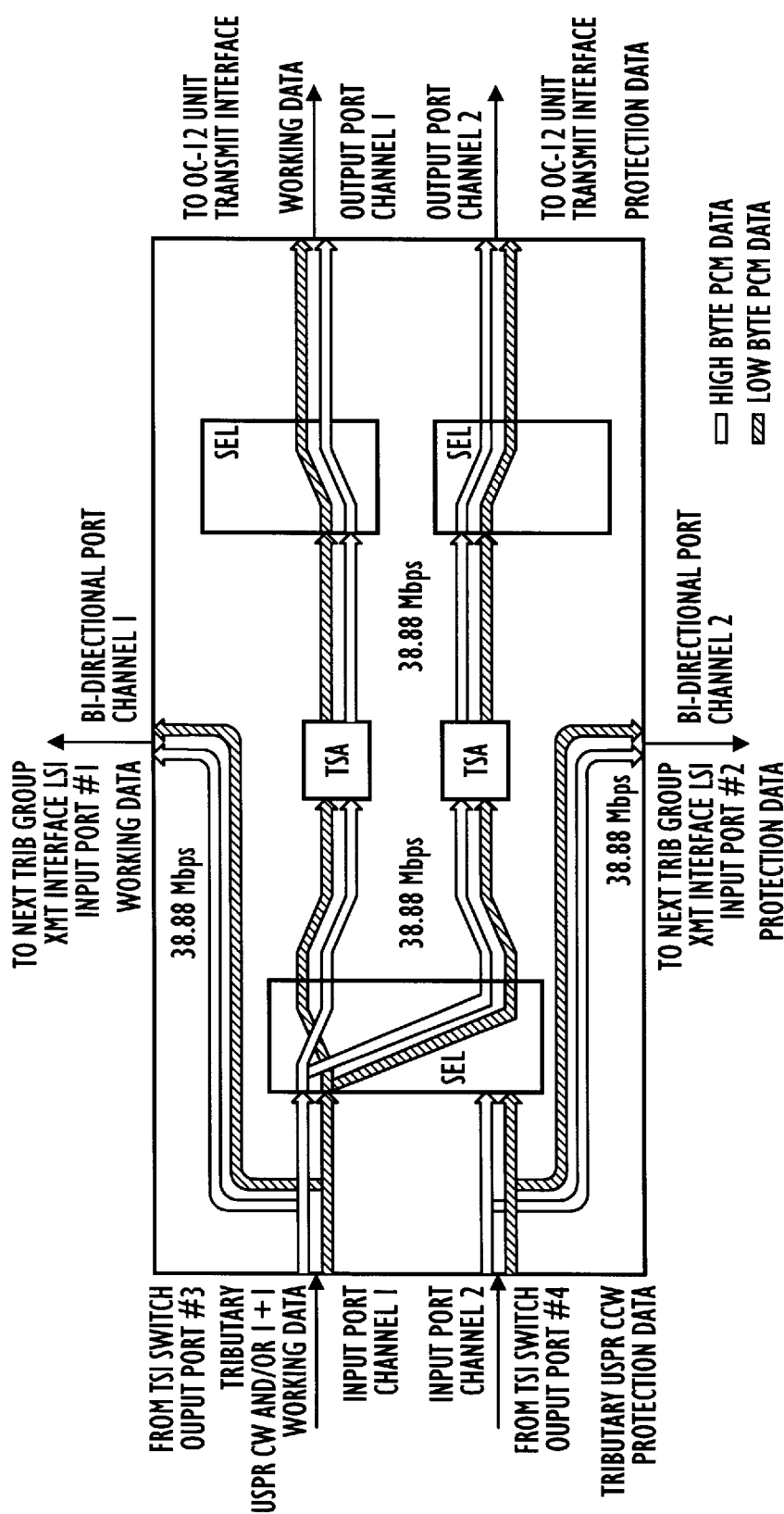
FIG. 28 shows a signal flow diagram of an interfacing circuit operating according to a configuration which supports transmit paths for OC-12 rate data using a 1+1 payload.

More specific operational data flow schematics are shown in Examples 23 and 27 which are illustrated in FIGS. 24 and 28, respectively. Example 23, illustrated in FIG. 24, shows a data flow schematic of an interfacing circuit operating according to a configuration which supports a tributary group OC-12 UPSR transmit paths for OC-12 rate data. Example 27, illustrated in FIG. 28, shows a data flow schematic of an interfacing circuit operating according to a configuration which supports transmit paths for OC-12 rate data using a 1+1 payload. In these two examples, the interface circuit is shown cascading together for routing data to and from other interfacing circuits.

B.2.a. OC-3, OC-1, and DS3 Unit Support—Receive Data Path

In this mode, the 38.88 MHz Primary Clock is divided by two (for 19.44 MHz rate) and passed to the REF-CLK output along with the re-timed Primary Frame Pulse. The phasing of the divide by two circuit will be determined by the interface group that the particular interface device is supporting in order that the resulting 19.44 MHz clock will be aligned with the output Reference Frame Pulse. An internal 38.88 MHz clock is used to process the data latched (at 30 and 32) from the interface units. This will result in a 2× oversampling of the 19.44 Mbyte/s data.

Figure 23:
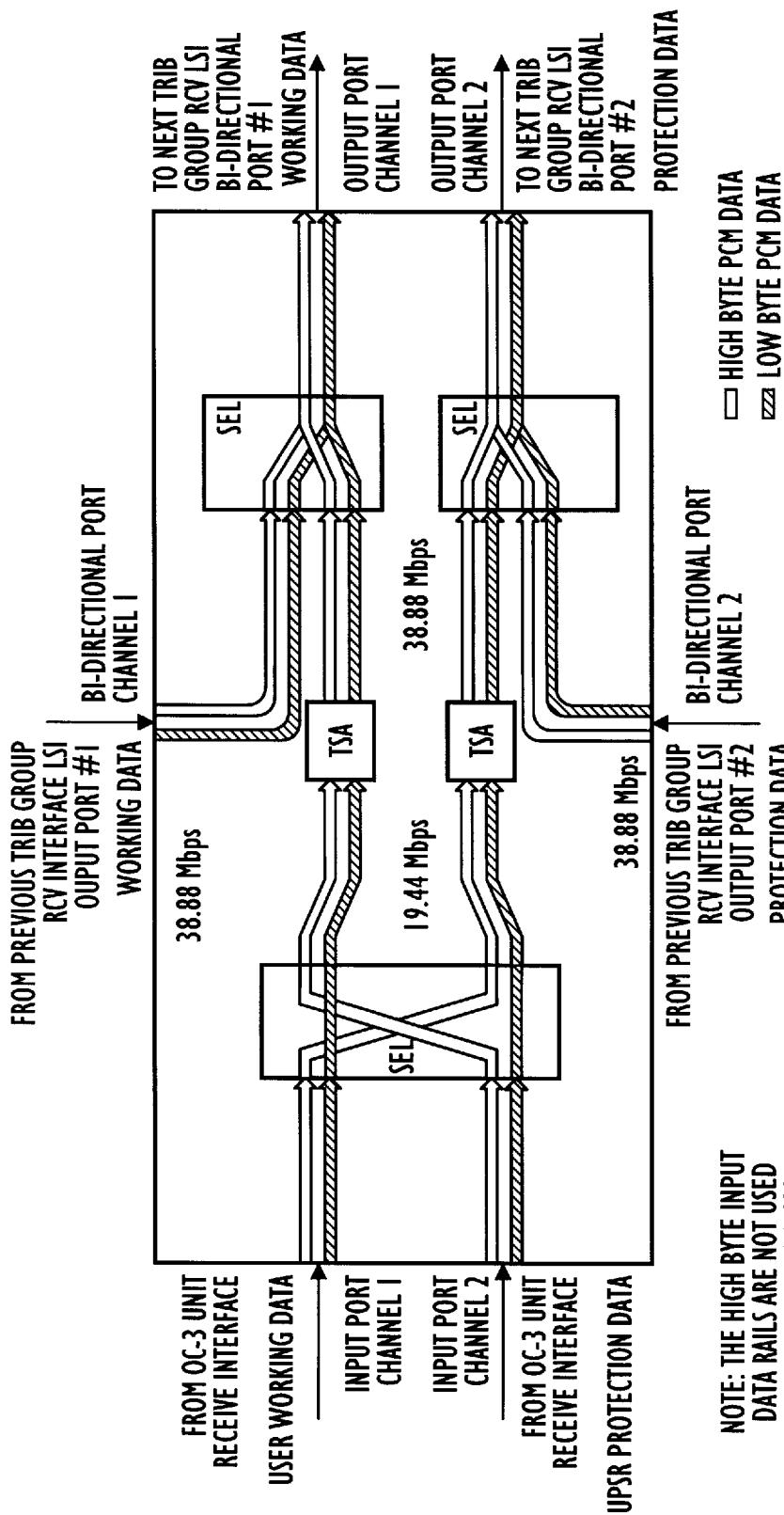
FIG. 23 shows a signal flow diagram of an interfacing circuit operating according to a configuration which supports receive paths for double OC-3 rate data.

In this mode, single bytes (occupying the low byte data rail only) at the 19.44 Mbps rate are written into the FIRO (Refer to FIG. 23). Since the FIRO includes six pairs of byte wide buffers (to support the OC-12 interface), it is not necessary to involve the high byte buffers to support this operational mode (there is an exception to this configuration; see the double OC-3 case detailed in the following paragraph). The data entering the FIRO is still clocked at the 38.88 MHz rate (a 2× oversampling) and, therefore, each 19.44 Mbps data byte gets written into two consecutive buffer locations by the write enable signals generated by the programmable timing generator 70. In this mode, only a three byte group (at the 19.44 Mbps rate) is written before the incoming data swaps to the other bank.

Once the three byte group is written and the swap-over is complete, the bytes are extracted in any desired order by read enable signals generated in response to software provisioning controlling a dual 12:1 selector circuit (in essence, the rate conversion from 19.44 Mbps to 38.88 Mbps is accomplished here). Note that the read data is extracted at the 38.88 Mbps rate and can be relocated anywhere in the outgoing STS-12 bandwidth. Broadcasting into additional time slots is also supported.

Examples of generalized data flow schematics for support of receive data paths are illustrated in FIGS. 6, 8, 14, 15, and 17. These Figures. show generalized data flow diagrams for supporting different tributary units, and may be specified to operate in support of a particular tributary level depending upon programming.

Figure 14:
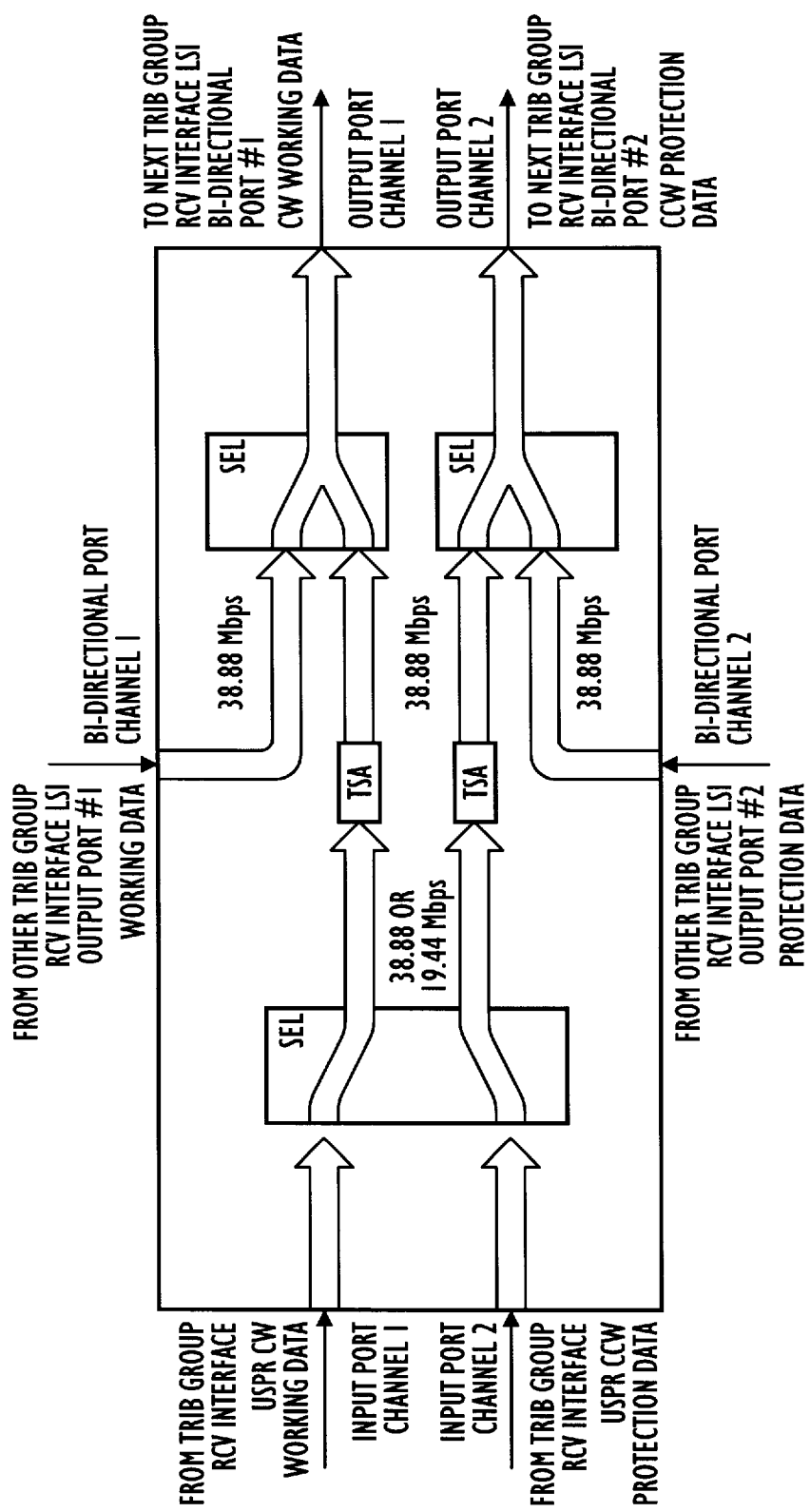
FIG. 14 shows a signal flow diagram of an interfacing circuit operating according to a configuration which supports a receive path for a generalized tributary group Uni-Directional Path Switched Ring data payload.
Figure 15:
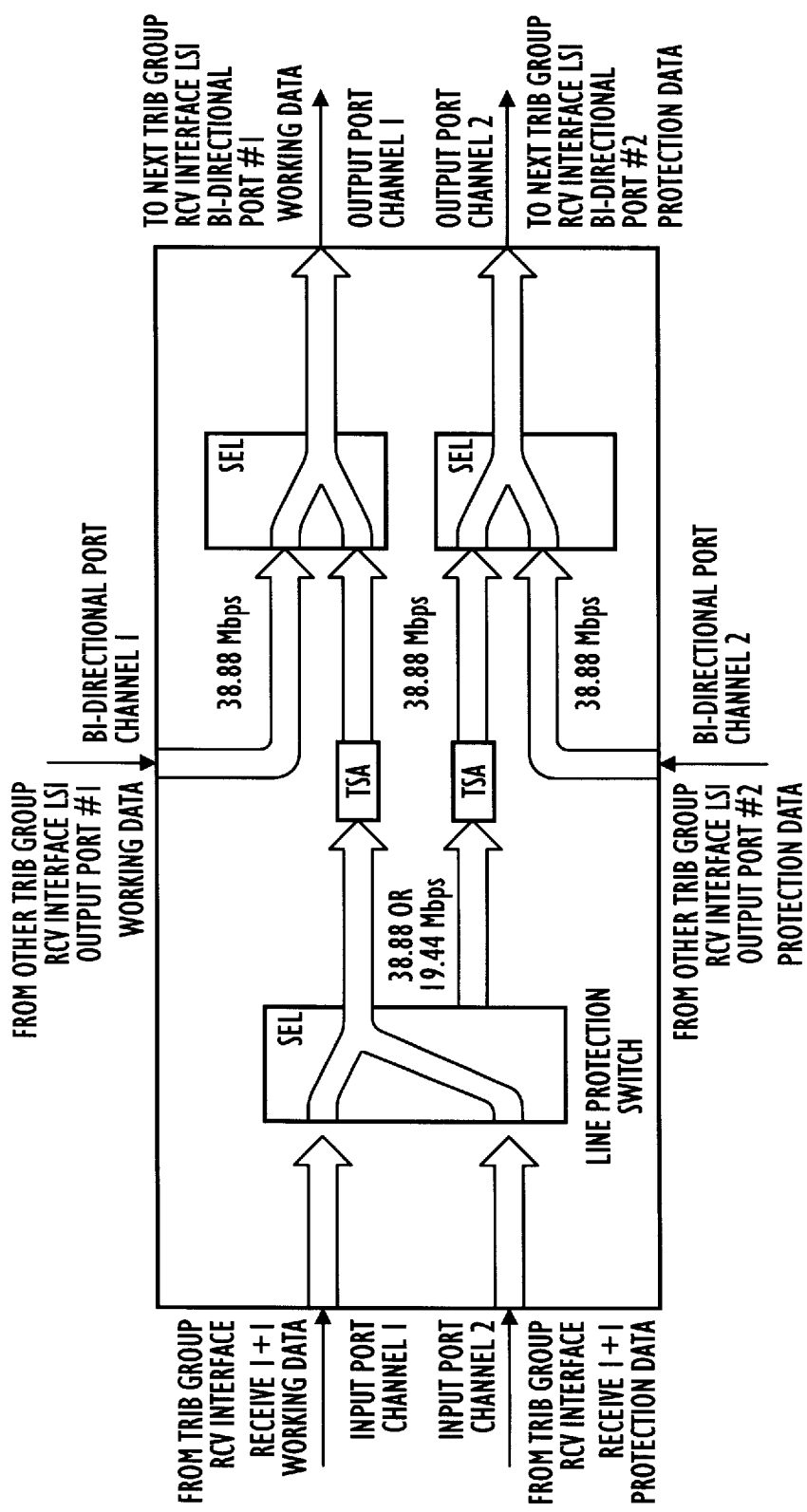
FIG. 15 shows a signal flow diagram of an interfacing circuit operating according to a configuration which supports a receive path for a generalized tributary group 1+1 data payload.
Figure 17:
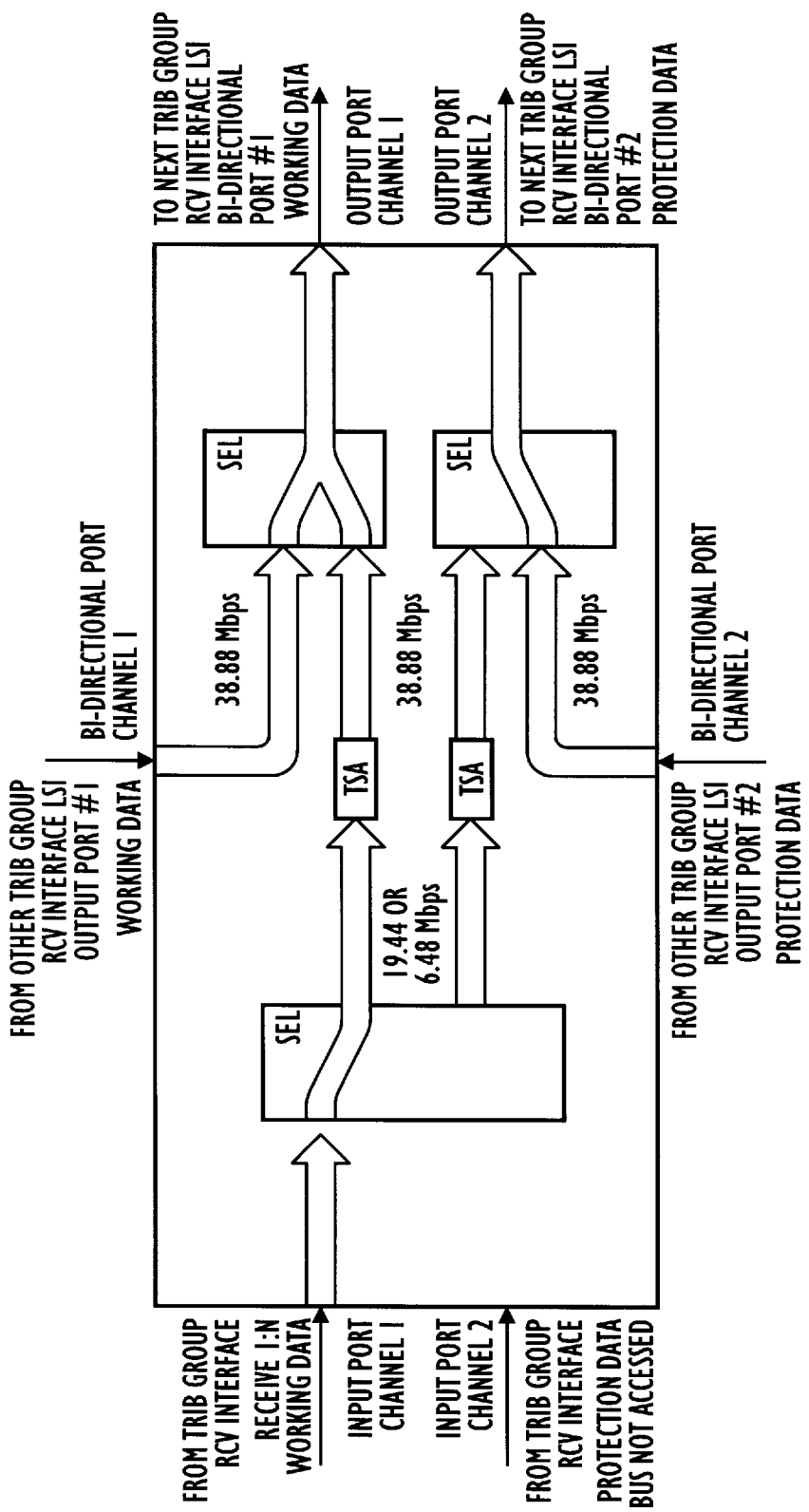
FIG. 17 shows a signal flow diagram of an interfacing circuit operating according to a configuration which supports a receive path for a generalized tributary group DS-N data payload.

Example 5, illustrated in FIG. 6, shows a tributary group "A" 1+1 receive mode configuration. Example 7, illustrated in FIG. 8, shows an operational configuration which may be used to support an OC-3 or OC-1 Linear Add/Drop Multiplexed receive mode. Example 13, illustrated in FIG. 14, shows a tributary group USPR receive mode. Example 14, illustrated in FIG. 15, shows a tributary group 1+1 receive mode. Example 16, illustrated in FIG. 17, shows an operational configuration which may be used to support a DS-3 tributary unit receive mode.

Figure 30:
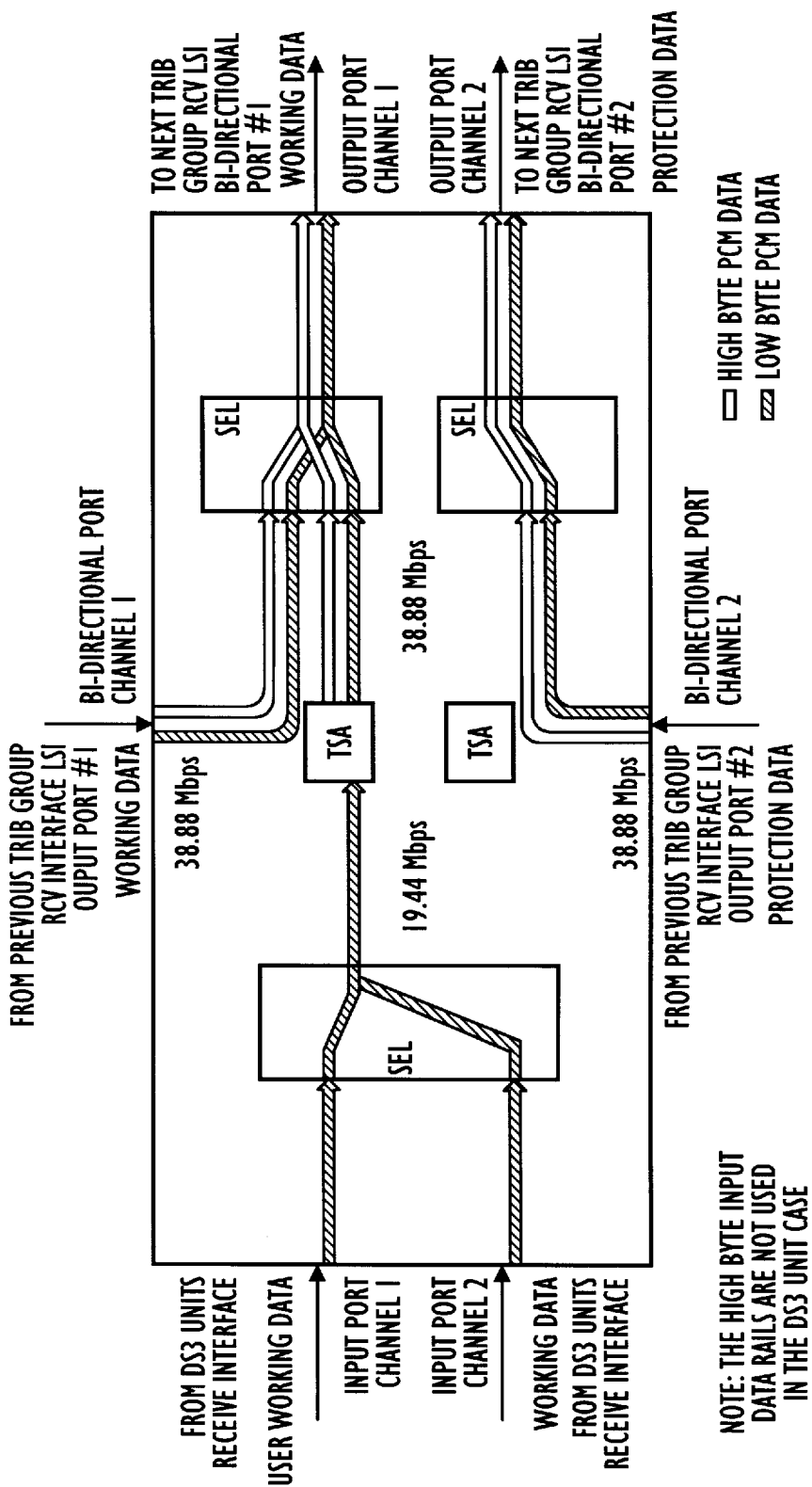
FIG. 30 shows a signal flow diagram of an interfacing circuit operating according to a configuration which supports receive paths for data payloads from DS-3 tributary units.

A more specifically delineated operational, example 29; namely, FIG. 30 shows the data rail handling for a tributary group DS-3 receive mode.

In the double OC-3 tributary case, the high byte data rail is enabled. The same process detailed above applies to the high byte data rail and associated data buffer locations.

Therefore, the data bandwidth which must be placed into the outgoing STS-12 bandwidth has been doubled (6 of the possible 12 bytes instead of just 3 of the possible 12).

Figure 27:
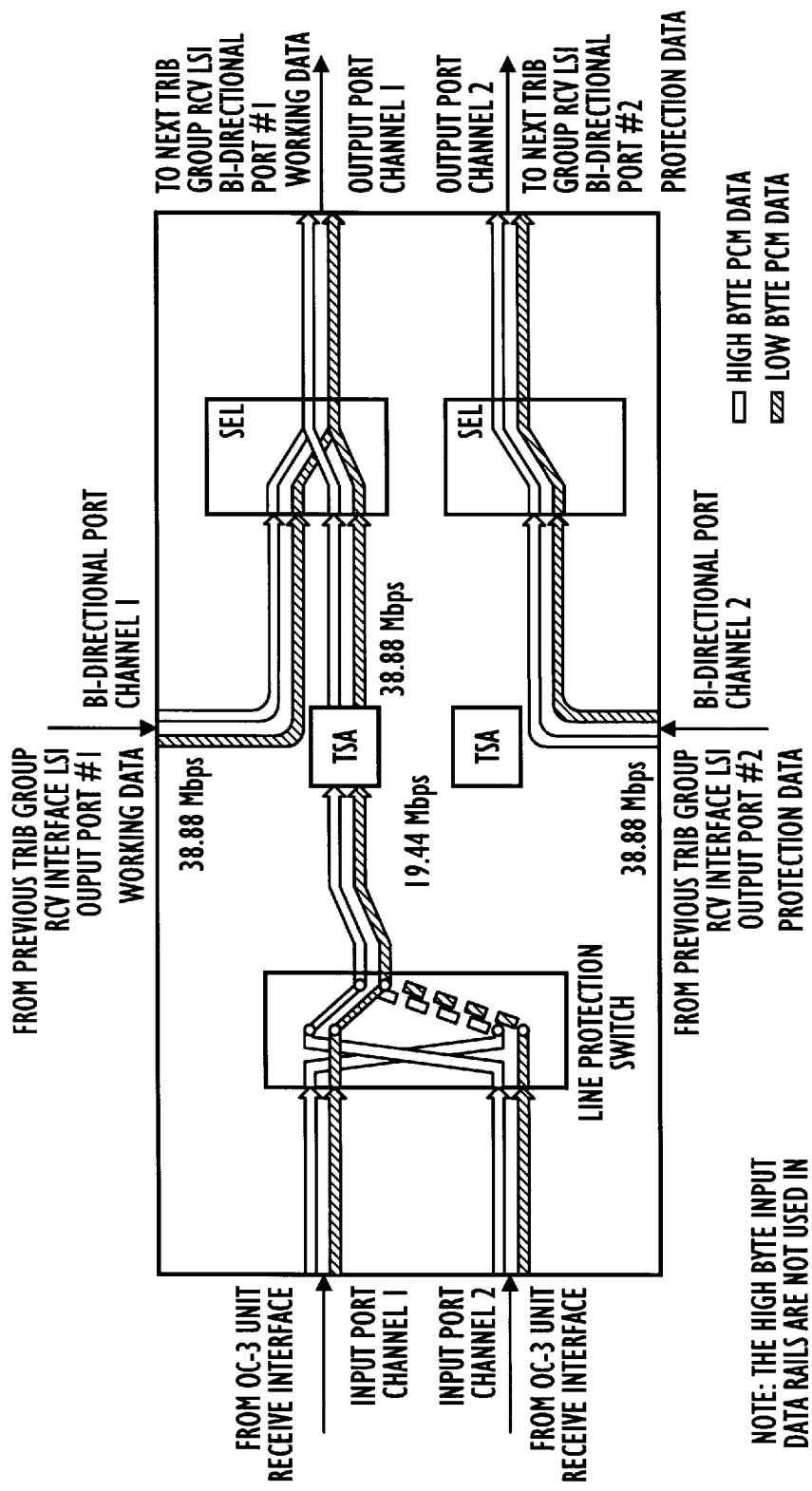
FIG. 27 shows a signal flow diagram of an interfacing circuit operating according to a configuration which supports receive paths for double OC-3 rate data using a 1+1 payload.

Examples 22 and 26, illustrated in FIGS. 23 and 27, respectively, show data flow schematics for the double OC-3 receive mode. Example 22 shows the data flow handling for the double OC-3 receive mode operating according to UPSR. Example 26 shows the data flow handling for the double OC-3 receive mode operating according to a 1+1 protocol. Both of these Examples illustrate data being cascaded into the interface circuit from other interfacing circuits.

B.2.b. OC-3, OC-1, and DS3 Unit Support—Transmit Data Path

In this mode, the 38.88 MHz Primary Clock is divided by two (for 19.44 MHz rate) and passed to the REF-CLK output. The phasing of the divide by two circuit will be synchronized by the internally generated Secondary Frame Pulse in order that the resulting 19.44 MHz clock will be aligned with the output reference frame pulse. A re-timed version of the secondary frame pulse is output on the REF-FP pin to the interface units in order to synchronize the insertion of the TOH in the outgoing OC-N data (for the OC-N units; N=3 or 1) or to synchronize the demapping of the DS3 tributary signal (for the DS3 units).

In this mode, two parallel bytes at the 38.88 Mbps rate (output from the TSI switching matrix) are written sequentially into the FIRO by write enable signals generated by the programmable timing generator 70 (Refer to FIG. 25). After a 12 byte group has been written and the data swap-over is complete, three of the 12 bytes are then selected for output on the low byte data rail only by read enable signals generated in response to software provisioning which control the low byte 12:1 selector circuit (the other 12:1 selector circuit for the high byte data rail is not used; see the following paragraph regarding the double OC-3 configuration). The first byte is selected for two consecutive 38.88 MHz clock periods, the second byte is then selected for two more consecutive clock periods, and the third byte likewise. The bytes are extracted at the 38.88 MHz rate, but are deliberately oversampled by two times (2×) to implement the 19.44 MHz rate conversion. Broadcasting into additional time slots is also supported.

Examples of generalized data flow schematics for support of transmit data paths are illustrated in FIGS. 10, 11, 12, 13, 18, 19, 21, and 32. These figures show generalized data flow diagrams for supporting tributary units, and may be specified to operate in support of a particular tributary unit operating at a specific data rate level (e.g., DS-3, OC-1) depending upon how the unit is programmed.

Figure 12:
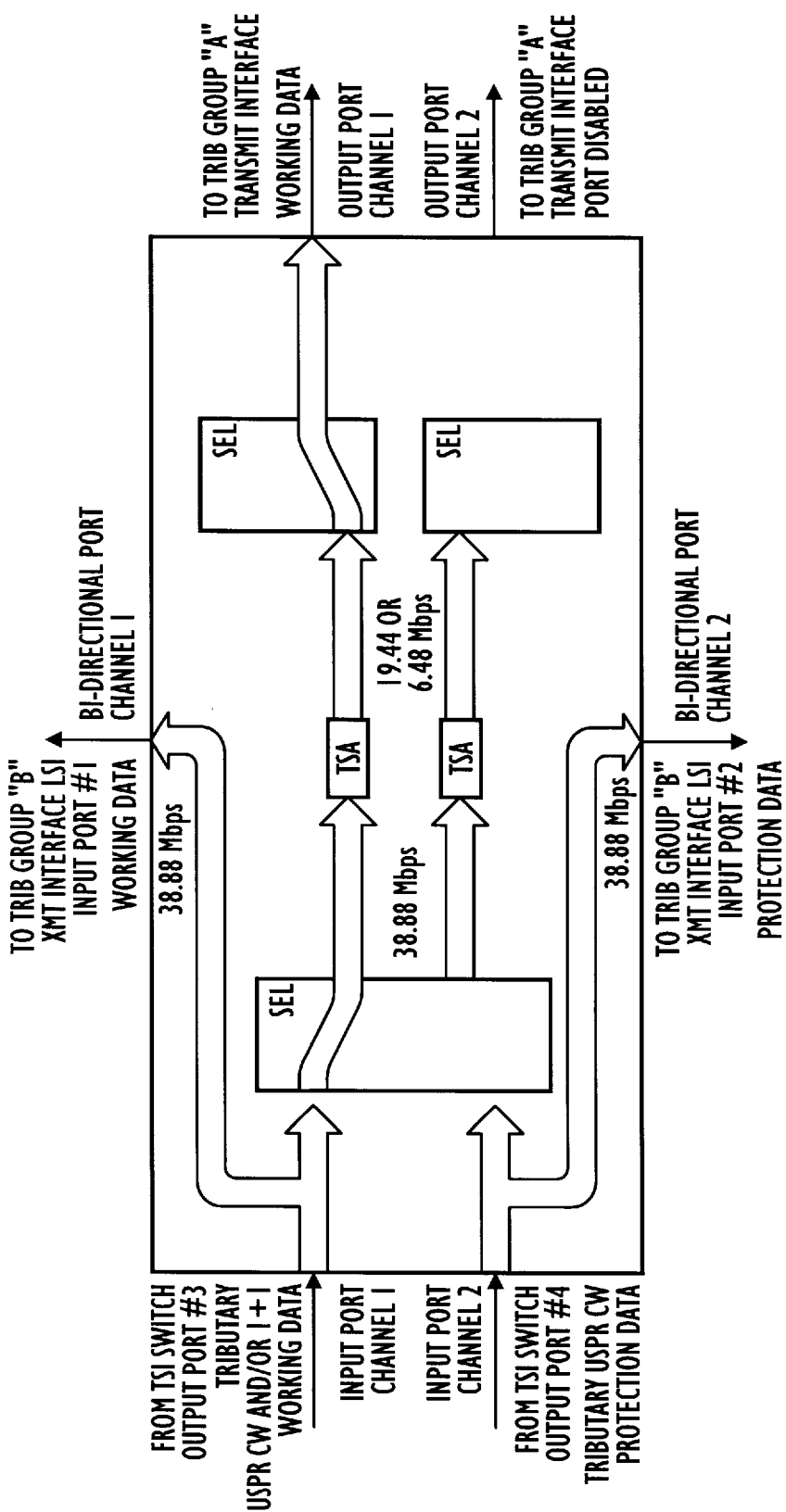
FIG. 12 shows a signal flow diagram of an interfacing circuit operating according to a configuration which supports a transmit path for a tributary group "A" DS-N data payload.
Figure 18:
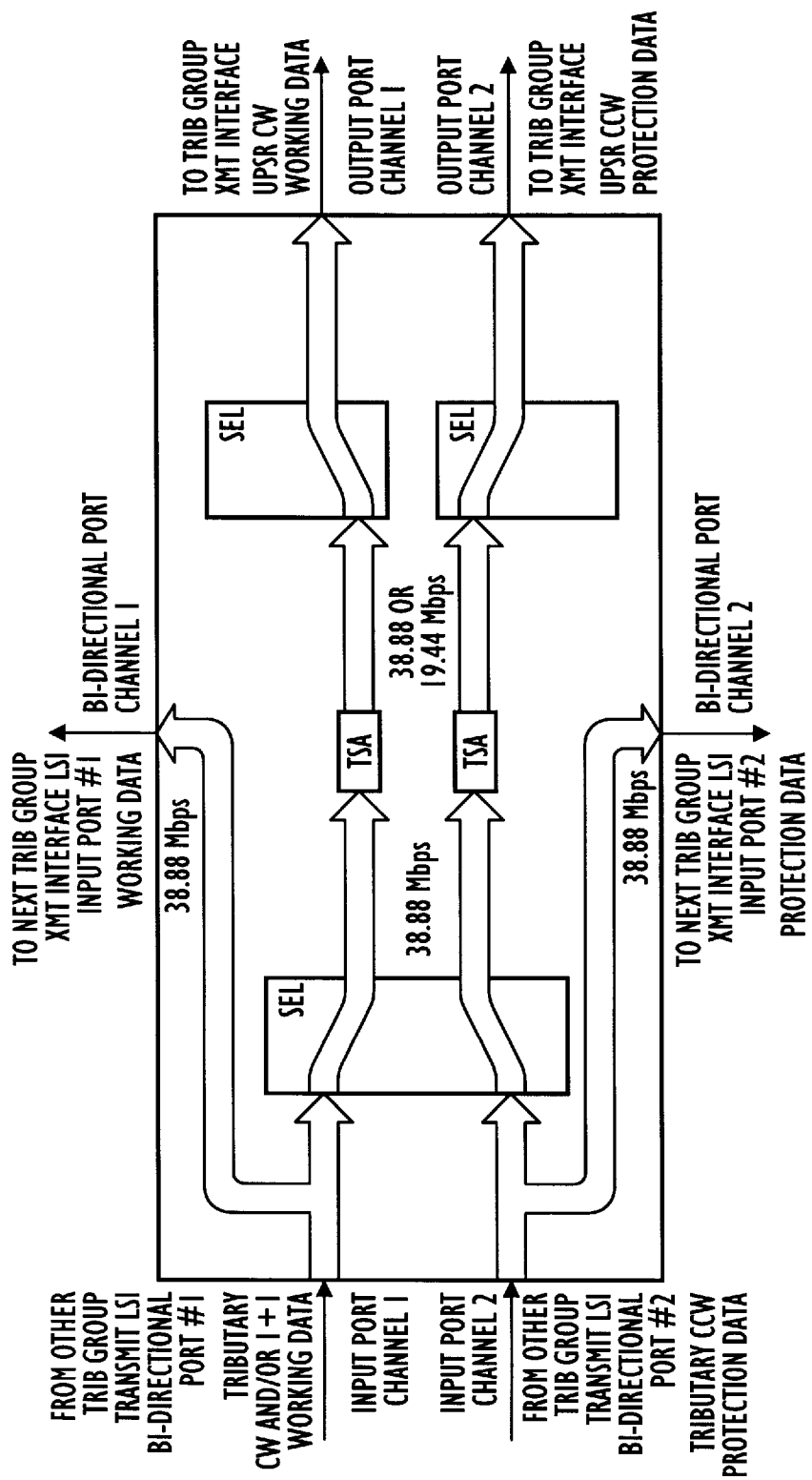
FIG. 18 shows a signal flow diagram of an interfacing circuit operating according to a configuration which supports a transmit path for cascading interfacing circuits together for different tributary groups.
Figure 19:
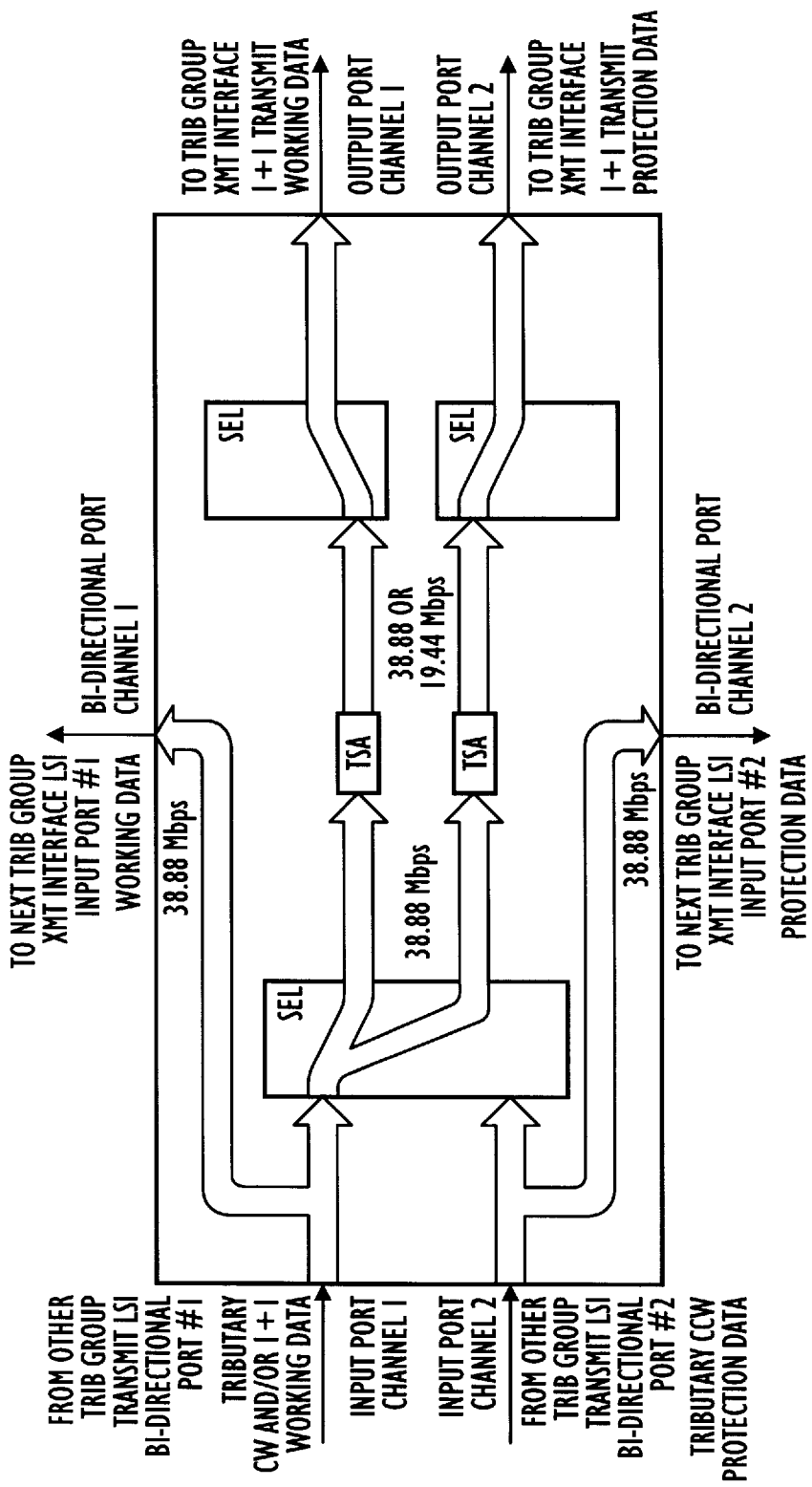
FIG. 19 shows a signal flow diagram of an interfacing circuit operating according to a configuration which supports a transmit path for cascading interfacing circuits together when a tributary group is in a 1+1 data payload configuration.
Figure 21:
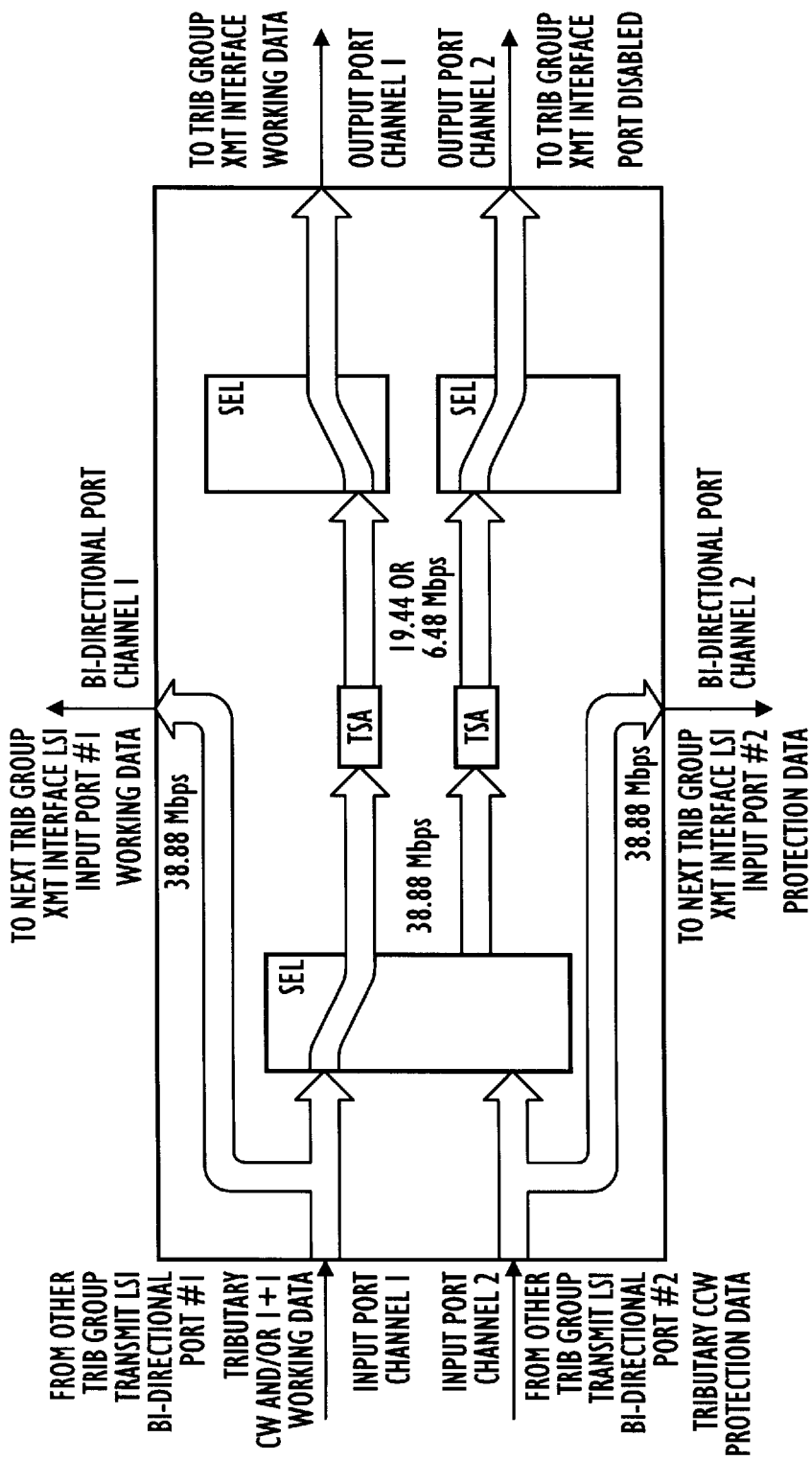
FIG. 21 shows a signal flow diagram of an interfacing circuit operating according to a configuration which supports a transmit path for a generalized tributary group DS-N data payload when cascaded.

Example 9, illustrated in FIG. 10, shows a tributary group "A" USPR transmit mode configuration. Example 10, illustrated in FIG. 11, shows a tributary group "A" 1+1 transmit mode configuration. Example 11, illustrated in FIG. 12, shows an operational configuration which may be used to support a DS-3 tributary unit transmit mode. Example 12, illustrated in FIG. 13, shows an operational configuration which may be used to support an OC-3 or OC-1 Linear Add/Drop Multiplexed transmit mode. Example 17, illustrated in FIG. 18, shows a tributary group USPR transit mode configuration. Example 18, illustrated in FIG. 19, shows a tributary group 1+1 transmit mode configuration. Example 20, illustrated in FIG. 21, shows an operational configuration which may be used to support a DS-3 tributary unit transmit mode.

Figure 32:
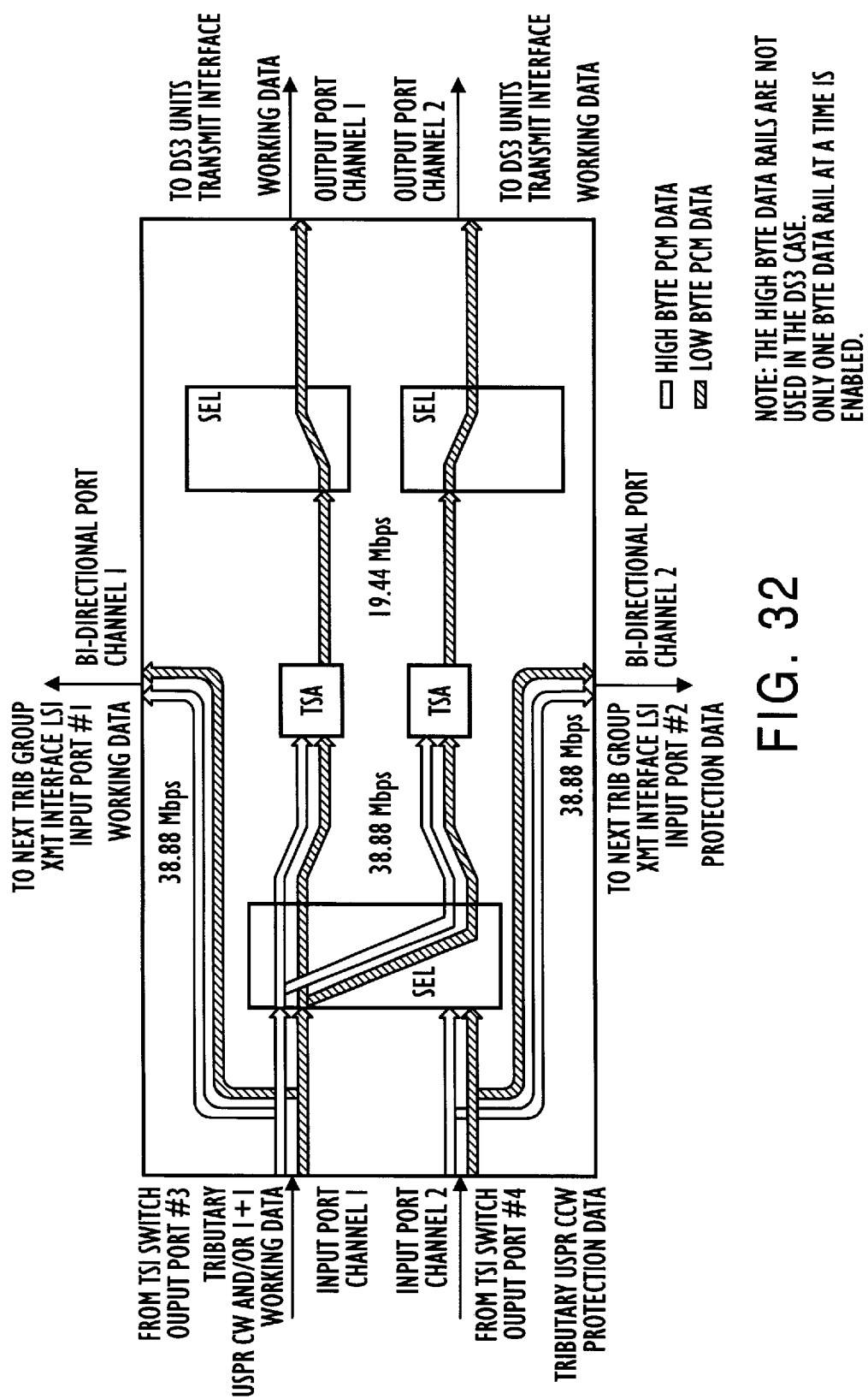
FIG. 32 shows a signal flow diagram of an interfacing circuit operating according to a configuration which supports transmit mode demultiplexing of DS-3 data payloads for routing to DS-3 tributary units.

A more specifically delineated operational embodiment is shown in Example 31, which shows the data rail handling for a tributary group DS-3 transmit mode, as illustrated in FIG. 32.

In the double OC-3 tributary case, the high byte data rail is enabled. The same process detailed above applies to the high byte data rail and associated data buffer locations as well as the high byte 12:1 selector circuit. Therefore, the high byte data path now carries the additional OC-3 data to the respective OC-3 tributary unit. However, due to the hardwired data path connections in the backplane and the different types of interface modules that must interface in different ways to the backplane data busses, the data carried on the high byte must be opposite direction data destined for the other pair of OC-3 units. For example, if the low byte is transporting OC-3 #1 working data, the high byte must transport OC-3 #2 protection data instead of OC-3 #2 working data, and vice versa. This mixed data placement can be accomplished by exchanging the high byte rail positions from both data channels prior to writing the data into the FIROs.

Figure 29:
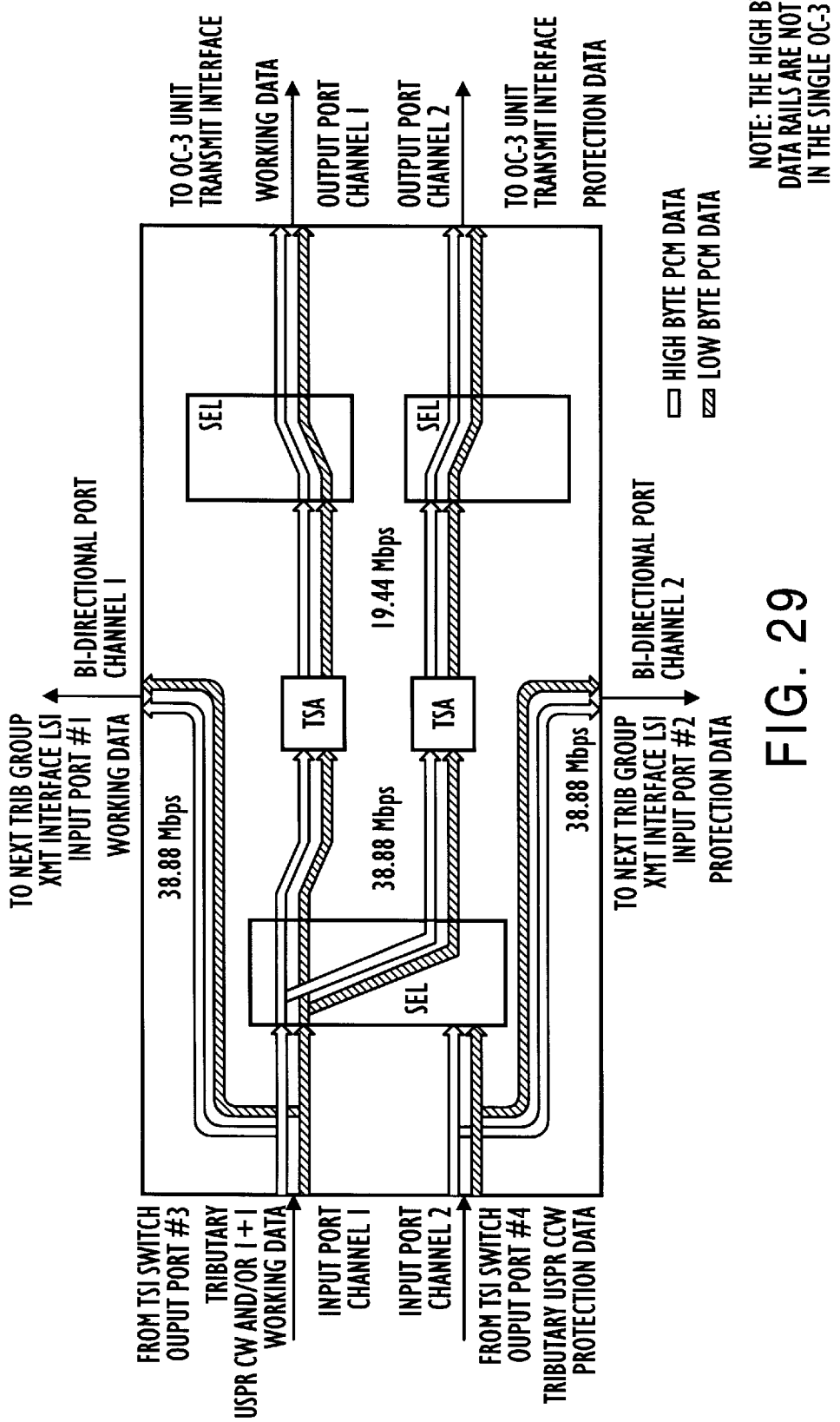
FIG. 29 shows a signal flow diagram of an interfacing circuit operating according to a configuration which supports transmit paths for double OC-3 rate data using a 1+1 payload.

Examples 24 and 28, illustrated in FIGS. 25 and 29, respectively, show data flow schematics for the double OC-3 transmit mode. Example 24 shows the data flow handling for the double OC-3 transmit mode operating according to UPSR. Example 28 shows the data flow handling for the double OC-3 transmit mode operating according to a 1+1 protocol. Both of these Examples illustrate data being cascaded out of the interface circuit to other interfacing circuits.

B.3.a DS1 Unit Support—Receive Data Path

In this mode, the 38.88 MHz Primary Clock is divided by six to achieve a data rate of 6.48 MHz, and passed to the REF-CLK output along with the re-timed Primary FP. The phasing of the divide by six counter is determined by the interface group that the particular interface device is supporting in order that the resulting 6.48 MHz clock will be aligned with the output Reference Frame Pulse. An internal 38.88 MHz clock is provided to process the data latched (at 30 and 32) from the DS1 interface units. This results in a six times (6×) oversampling of the 6.48 Mbyte/s data.

In this mode, two bytes occupying the both the high and low byte data rails at the 6.48 Mbps rate are written into the FIRO. Only one of these bytes at a time is valid, the other byte is not valid (Refer to FIG. 31). This is due to the hardwired data path connections in the backplane and the different types of interface modules that must interface in different ways to the backplane data busses. The total, usable data bandwidth entering the FIRO on both the high and low byte data rails is only a single STS-1 and is clocked at the 38.88 MHz rate (a 6× oversampling) and gets written by the write enable signals generated by the Programmable Timing Generator into every high or low byte buffer location respectively. In this mode, only a single, valid high or low byte (at the 6.48 Mbps rate) can be written before the data swap-over to the other bank is initiated.

Once the valid byte is written, it can be extracted and placed in any desired time slot by read enable signals generated in response to software provisioning controlling a dual 12:1 selector circuit (in essence, the rate conversion from 6.48 Mbps to 38.88 Mbps is accomplished here). Note that the read data is extracted at the 38.88 Mbps rate from both the high and low byte positions in the FIRO and can be relocated anywhere in the outgoing STS-12 bandwidth. The timing generator 70 generates the read control signals required to reassemble the STS-1 signal transporting the 28 VT1.5 time slots from the two byte wide data streams appearing at the input to the FIRO. This requires that the data placement sequence of the DS1 units placing the receive data onto the four byte wide input data rails must be emulated by the read enable signals generated by the timing generator in order to properly recover the entire STS-1 signal. Broadcasting into additional time slots is also supported.

The dedicated DS1 tributary group does not require selection of certain data prior to the receive data being written into the FIRO due to the fact that there is a single, common byte-wide receive bus to transport the receive data from the DS1 units toward the TSI unit. The receive data from this interface is connected to a single data channel input port and can be written directly into the low byte side of the FIRO and extracted by the dual 12:1 selector circuit and placed in any desired time slot.

Figure 7:
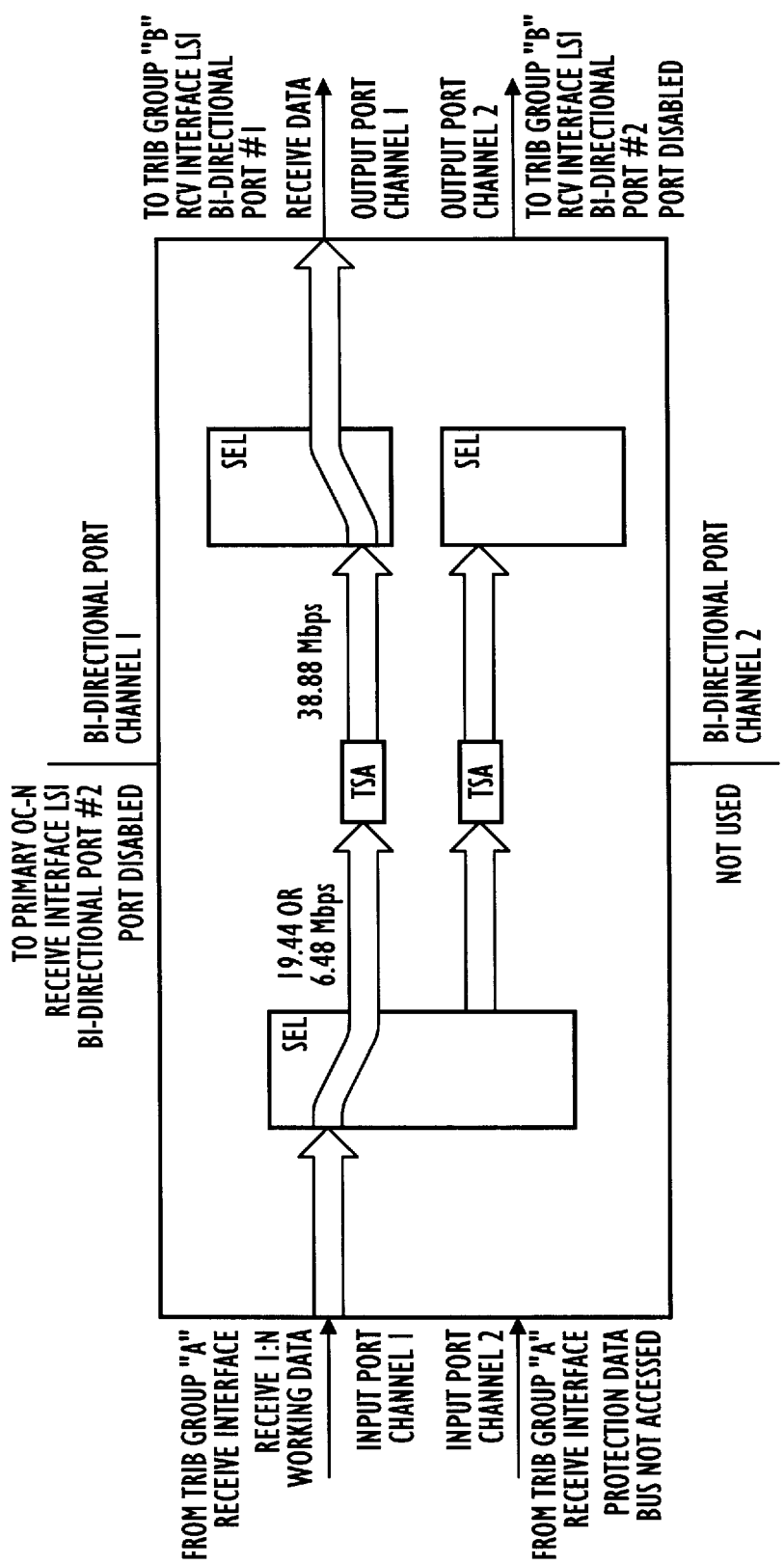
FIG. 7 shows a signal flow diagram of an interfacing circuit operating according to a configuration which supports the receive path for a tributary group "A" DS-N data payload.
Figure 16:
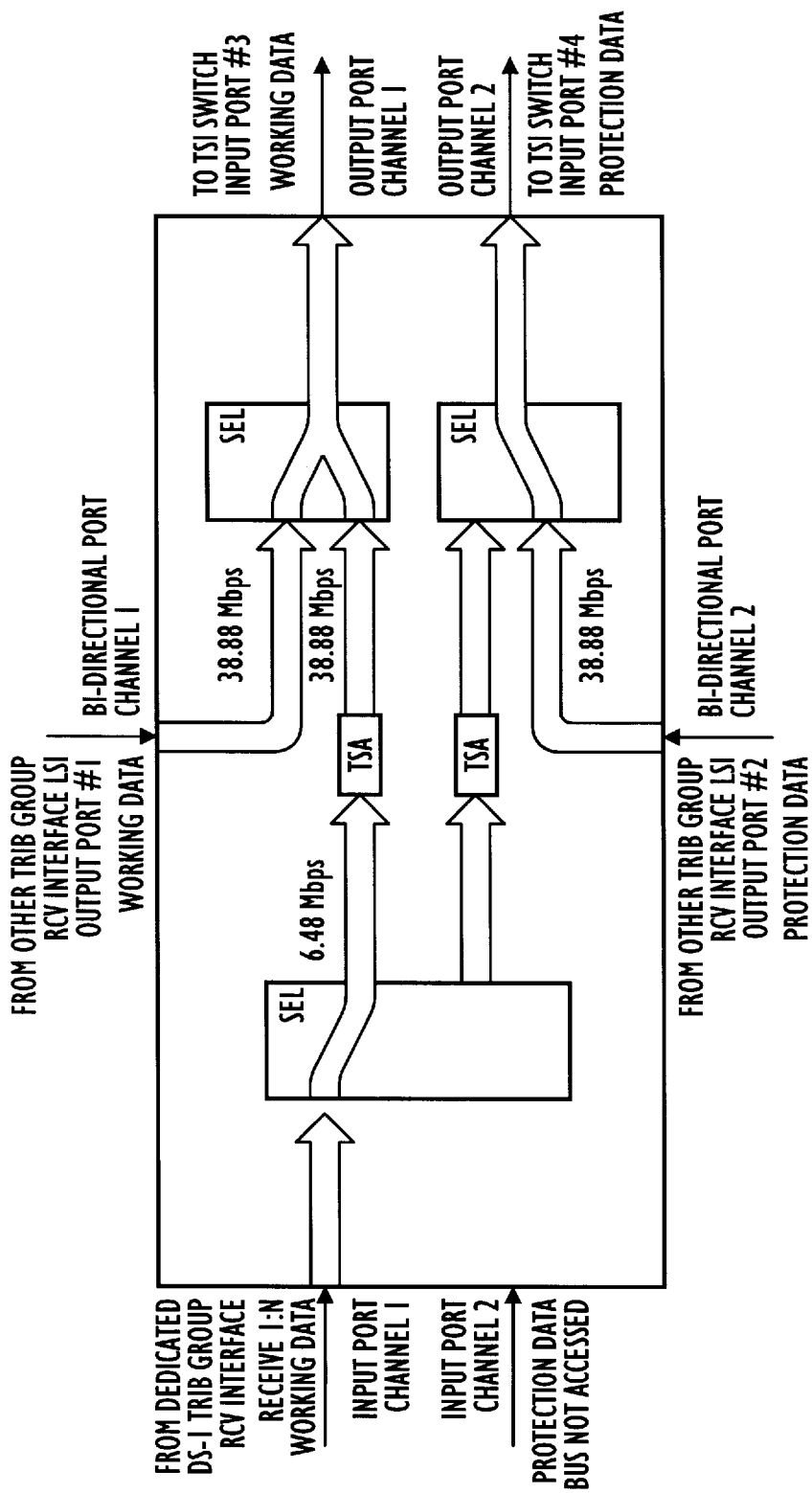
FIG. 16 shows a signal flow diagram of an interfacing circuit operating according to a configuration which supports a receive path for a dedicated DS-1 (or T-1) tributary group data payload.
Figure 31:
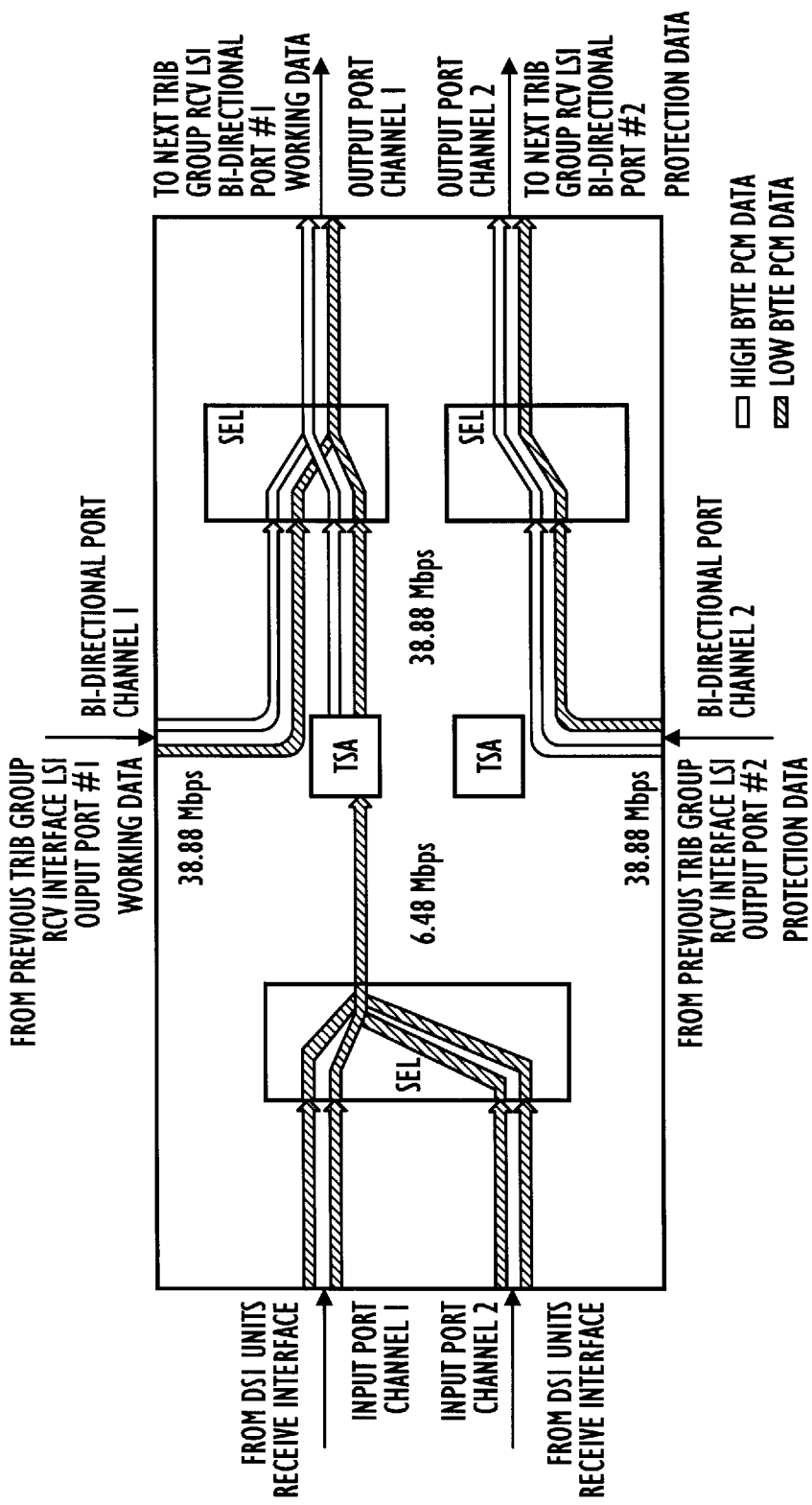
FIG. 31 shows a signal flow diagram of an interfacing circuit operating according to a configuration which supports receive paths for data payloads from DS-1 (T-1) tributary units.

A specifically drawn operational embodiment of a DS-1 receive path interface is shown by in Example 30 in FIG. 31. Example 15, illustrated in FIG. 16, shows a dedicated DS-1 tributary group receive mode configuration. A more generalized receive mode configuration is shown in Example 6, which is illustrated in FIG. 7; this configuration may be specified to operate at a DS-1 rate for the receive mode.

B.3.b. DS1 Unit Support—Transmit Data Path

In this mode, the 38.88 MHz Clock is divided by six (for 6.48 MHz rate) and passed to the REF-CLK output. The phasing of the divide-by-six circuit will be synchronized by the internally generated Secondary Frame Pulse in order that the resulting 6.48 MHz clock will be aligned with the output reference frame pulse. A re-timed version of the secondary frame pulse is output on the REF-FP pin to the DS1 interface units in order to synchronize the demapping of the DS1 tributary signals.

In this mode, two parallel bytes at the 38.88 Mbps rate (Output from the TSI switching matrix) are written sequentially into the FIRO by write enable signals generated by the programmable timing generator 70. After a 12 byte group has been written and the data swap-over is complete, one of the 12 bytes is then selected for output on either the low byte data rail or the high data byte rail by read enable signals generated in response to software provisioning which control the dual 12:1 selector circuits (Refer to FIG. 33). This is due to the hardwired data path connections in the backplane and the different types of interface modules that must interface in different ways to the backplane data busses. The byte is selected for six consecutive 38.88 MHz clock periods. The byte is still being extracted at the 38.88 MHz rate, but is deliberately oversampled by six time (6×) to implement the rate conversion to 6.48 MHz.

The placement of the outgoing byte onto the appropriate data rail is determined by the transmitting sequence used by the DS1 units (the DS1 units are connected in pairs to the four transmit data busses) and the timing generator must generate output enable signals that emulate the same transmit sequence used by the DS-1 units. Broadcasting in this mode is meaningless because, in essence, this byte is already being broadcast to the six available time slots on the selected, outgoing data rail.

The dedicated DS1 group does not require any dynamic control of the output data among four output data busses due to the fact that there is a single, common byte-wide transmit bus to transport the transmit data from the TSI unit toward the DS1 units. Once the appropriate byte has been selected from the FIRO, the output data can be transmitted continuously from a single low byte output port.

Figure 20:
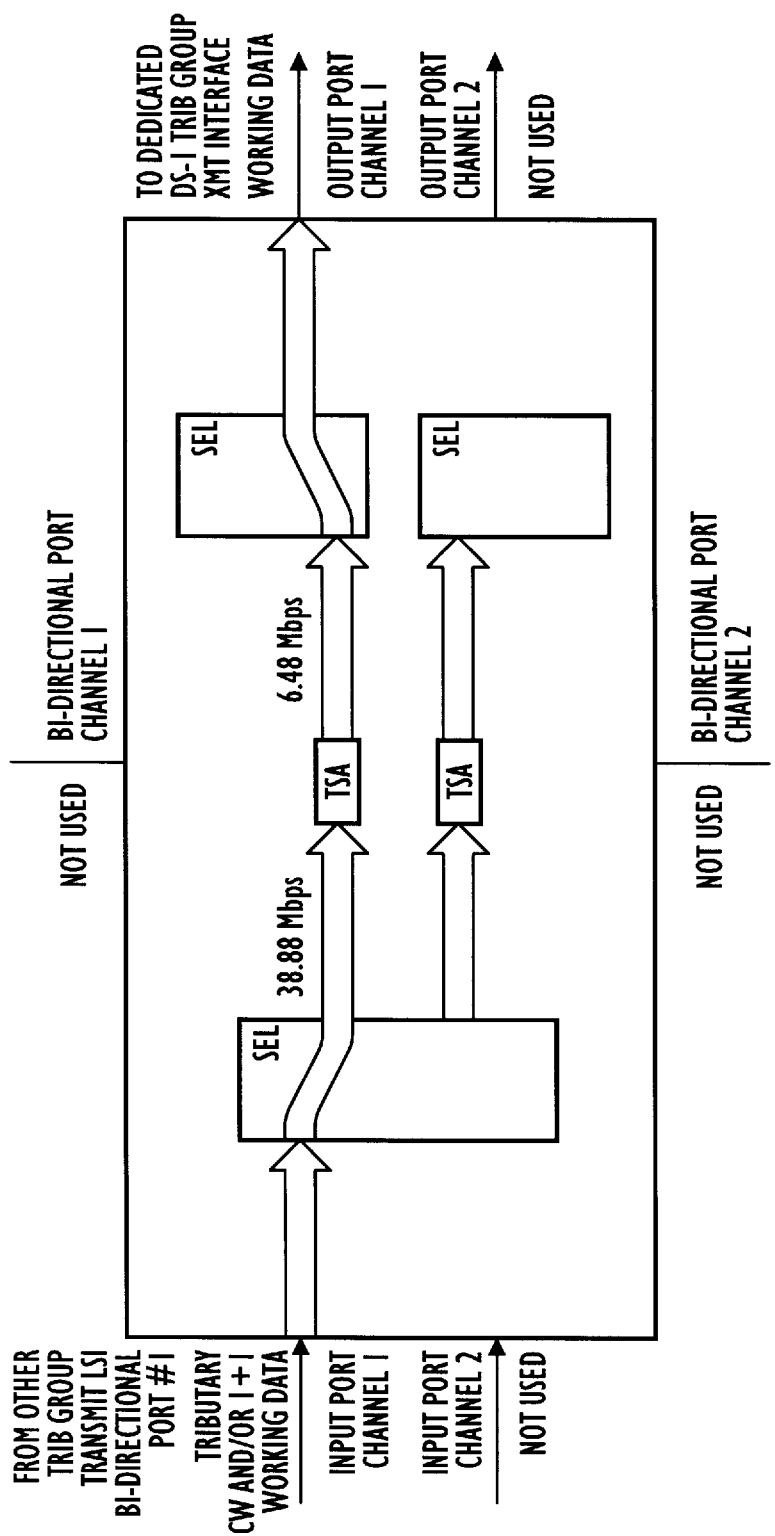
FIG. 20 shows a signal flow diagram of an interfacing circuit operating according to a configuration which supports a transmit path for a dedicated DS-1 (or T-1) tributary group data payload.
Figure 33:
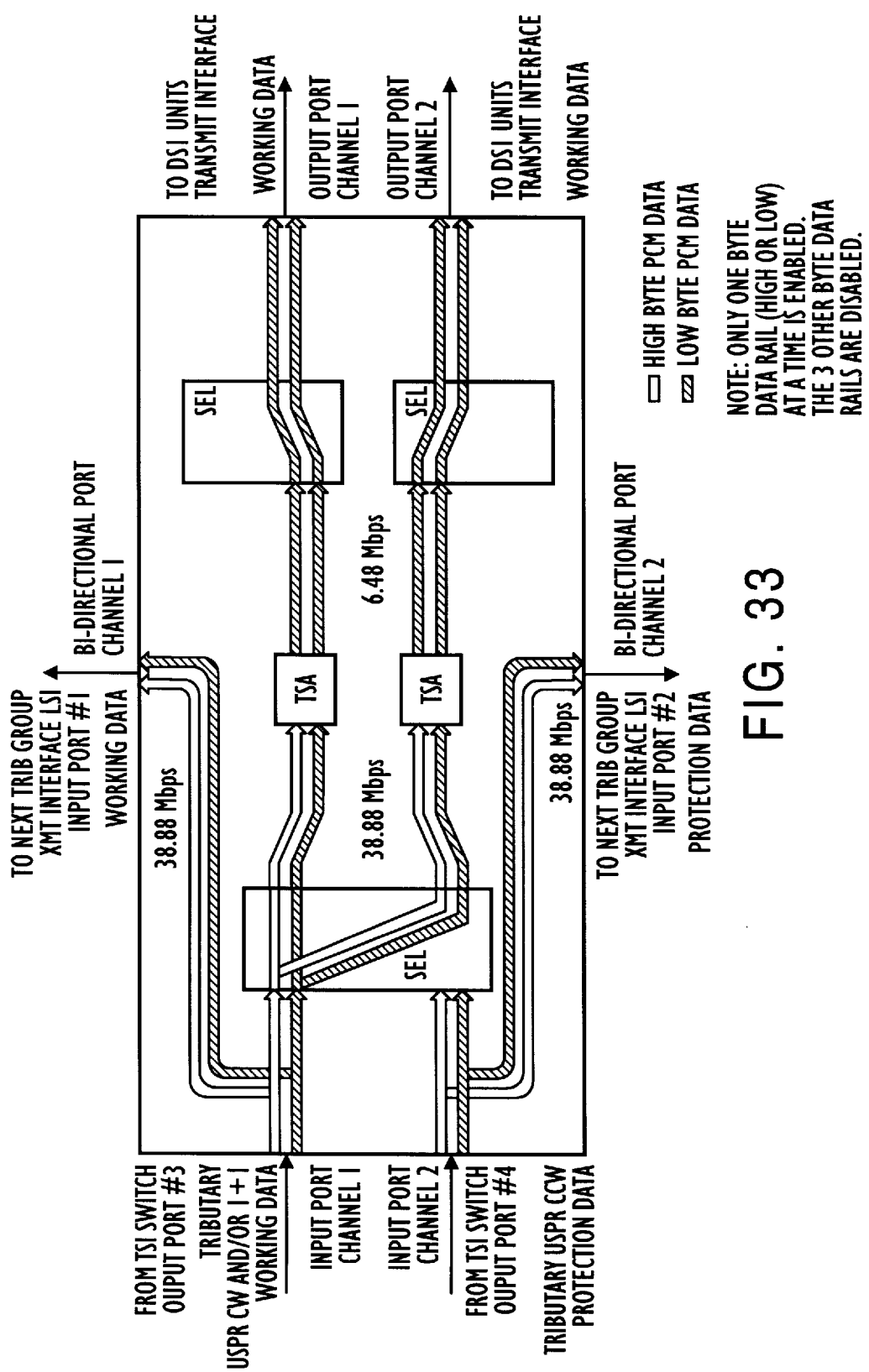
FIG. 33 shows a signal flow diagram of an interfacing circuit operating according to a configuration which supports transmit mode demultiplexing of DS-1 (T-1) data payloads for routing to DS-1 tributary units.

A specifically drawn operational embodiment of a DS-1 transmit path interface is shown by Example 32 in FIG. 33. Example 19, illustrated in FIG. 20, shows a dedicated DS-1 tributary group transmit mode configuration.

B.4. Cascaded Operation of Interface Units

Figure 37:
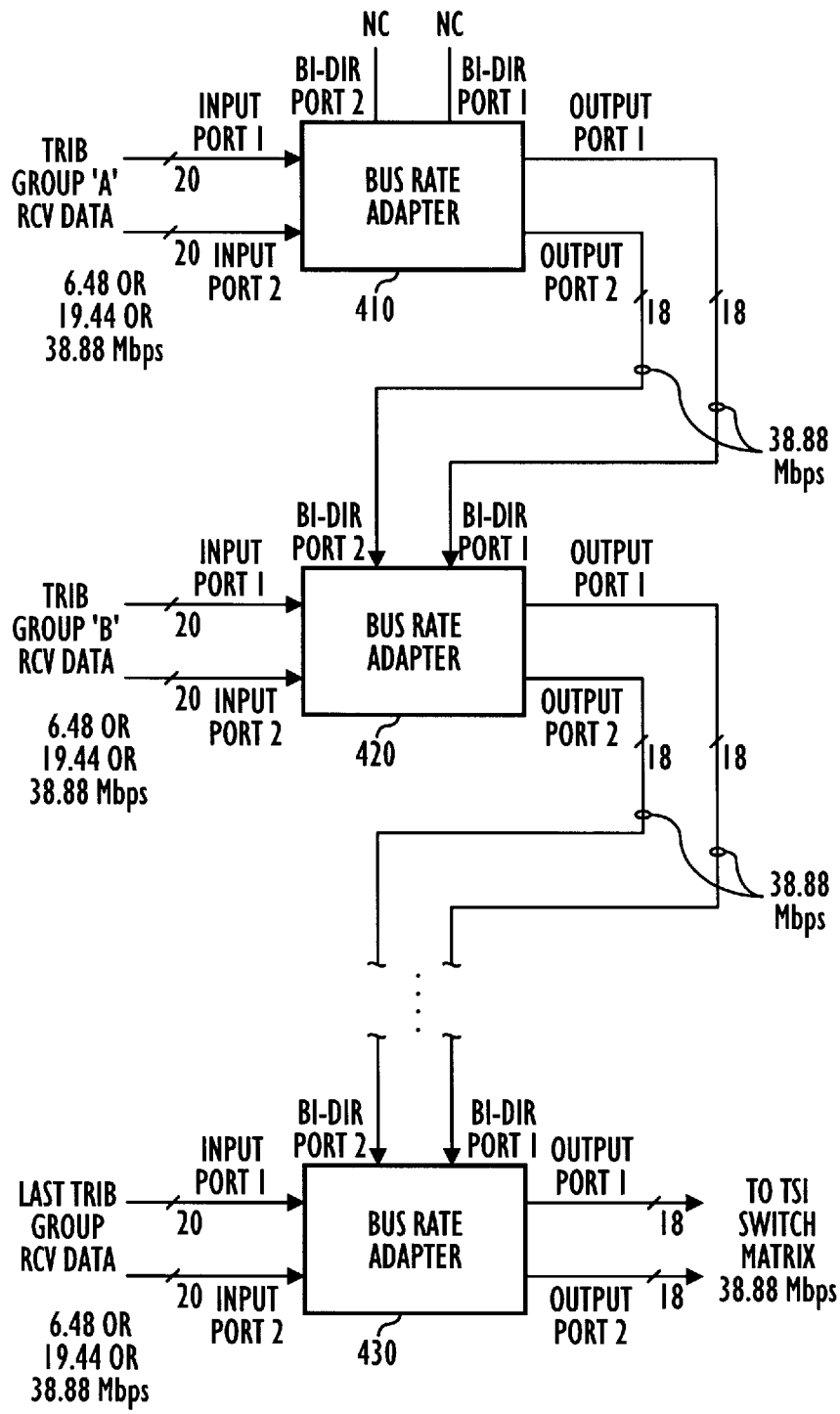
FIG. 37 shows a block diagram of plural interfacing circuits cascade connected together in the receive direction, for the general case.
Figure 38:
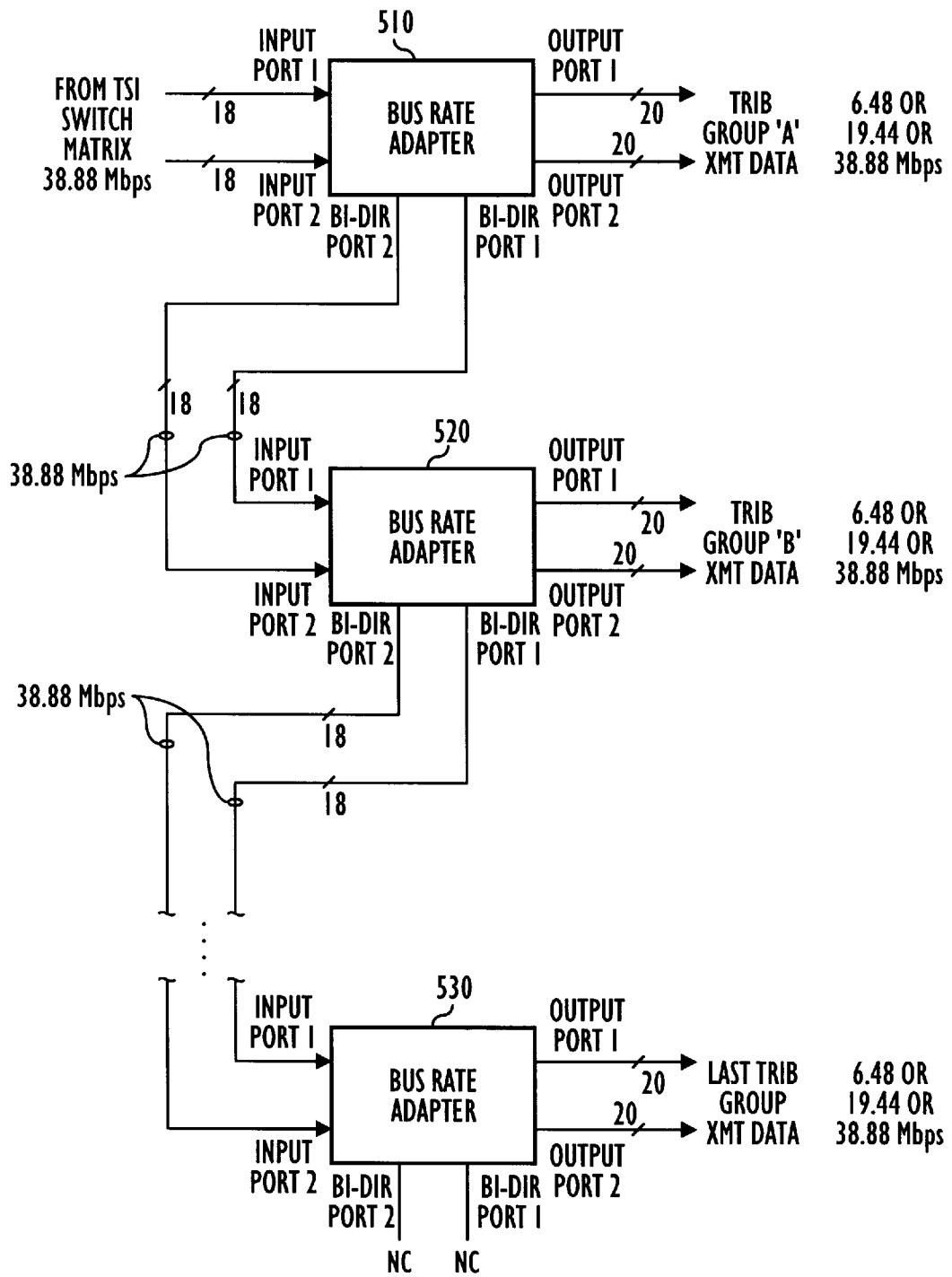
FIG. 38 shows a block diagram of plural interfacing circuits cascade connected together in the transmit direction, for the general case.

A set of generalized interface units according to the present invention may provide time slot interfacing between a high rate data payload and a plurality of different types of slower rate data payloads. FIGS. 37 and 38 show generalized cascade configurations. This is accomplished by cascading together interface units which each handle data interface for different rates, each according to their respective software provisioning.

FIG. 37 shows a generalized receive direction cascade connection. The first interface device (or bus rate adapter) 410 in the cascade receives data from a tributary group designated as "A", at a rate appropriate to that tributary group, and as has been programmed into the control system of the device 410 by software provisioning. The output ports of the first interface device 410 are coupled to the bi-directional ports of the second interface device 420. The second interface device 420 in the cascade receives data from a tributary group designated as "B", at a rate appropriate to that tributary group, and as has been programmed into the control system of the device 420 by software provisioning. The output ports of the second interface device 420 are coupled to the bi-directional ports of the next succeeding interface device. The cascaded data is passed from each stage of the cascade to the next at a rate of 38.88 Mbps. At the last stage, the last interface device 430 outputs the assembled aggregation of the received data payloads of the various tributary groups to the TSI switch matrix at a rate of 38.88 Mbps.

FIG. 38 shows a generalized transmit direction cascade connection. At the first cascade stage, the first interface device 510 receives at its input ports the transmitted data payload from TSI switch matrix at a rate of 38.88 Mbps. The first interface device (or bus rate adapter) 510 in the cascade outputs data (through its output ports) to a tributary group designated as "A", at a rate appropriate to that tributary group, and as has been programmed into the control system of the device 510 by software provisioning. The bi-directional ports (functioning here as output ports) of the first interface device 510 are coupled to the input ports of the second interface device 520. The second interface device 520 in the cascade outputs data (through its output ports) to a tributary group designated as "B", at a rate appropriate to that tributary group, and as has been programmed into the control system of the device 520 by software provisioning. The bi-directional ports (functioning here as output ports) of the second interface device 520 are coupled to the input ports of the next succeeding interface device. The cascaded data is passed from each stage of the cascade to the next at a rate of 38.88 Mbps.

Figure 39B:
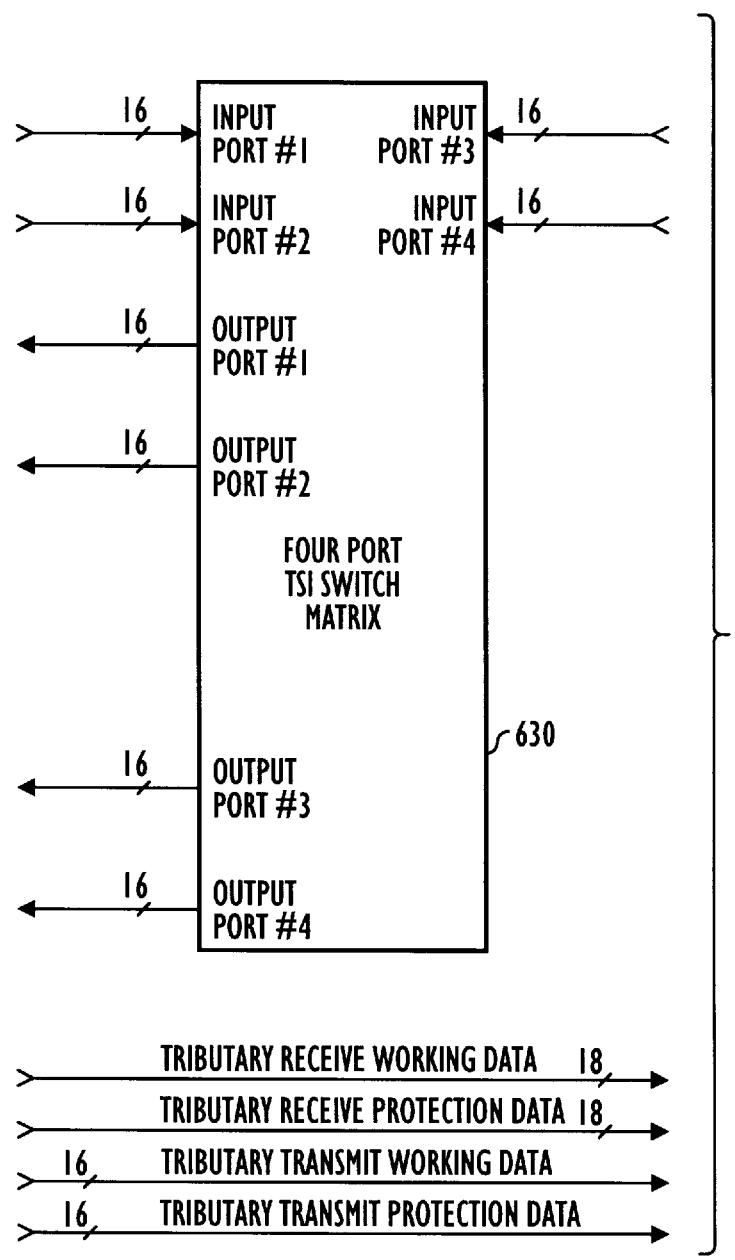
FIGS. 39A, 39B and 39C show a block diagram of an example of how interface circuits (or bus rate adapters) according to the present invention may be connected together to operate with a four port TSI switch matrix.
Figure 39:
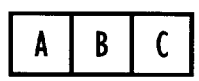
FIG. 39 shows the relative arrangement of FIGS. 39A, 39B and 39C.
Figure 39A:
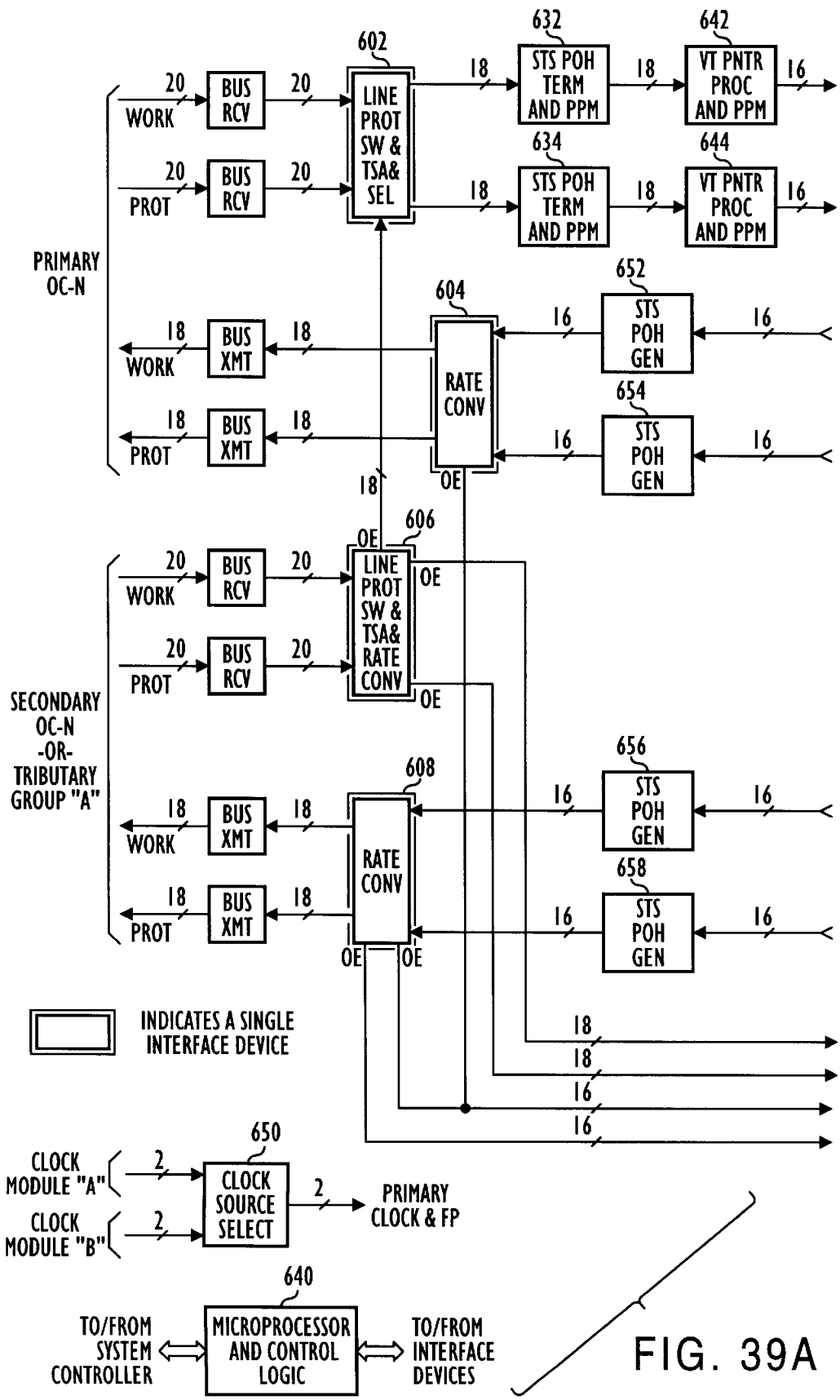
Figure 39C:
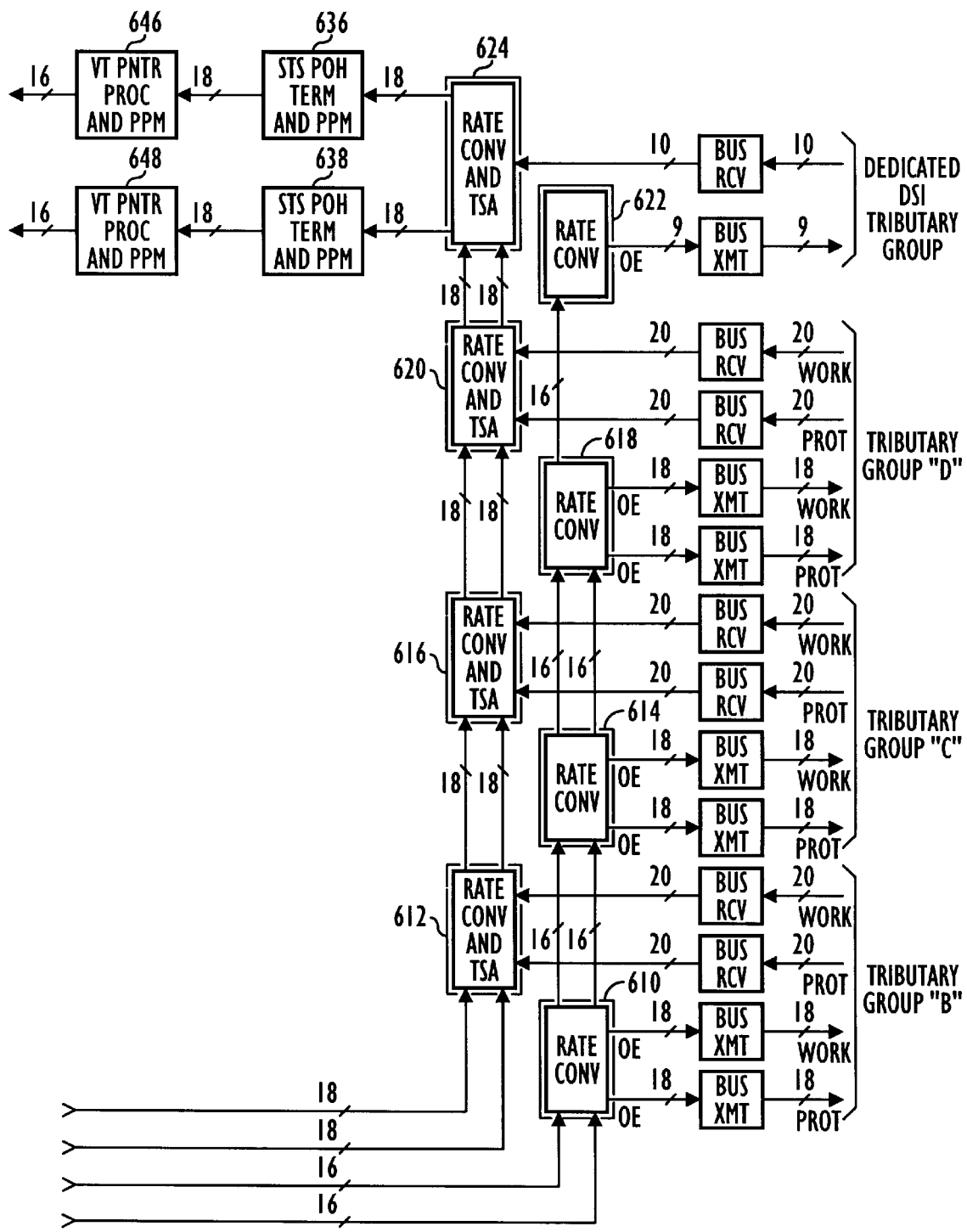

FIGS. 39A, 39B and 39C show a block diagram of an example of how interface circuits (or bus rate adapters) according to the present invention may be connected together to operate with a four port TSI switch matrix 630. Interface devices 602, 606, 612, 616, 620, and 624 operate in the receive data path, receiving data from their respective bus receivers. Interface devices 604, 608, 610, 614, 618, and 622 operate in the transmit data path, provide data to their respective bus transmitters. In FIGS. 39A and 39C, each of the individual interface devices 602 through 624 are symbolized by the rectangular boxes having a double outline. The labels on each of the interface devices 602 through 624 indicate what mode(s) each particular device is provisioned to operate in.

In the receive path, the working and protection paths are each presented by interface devices 602 and 624 to functional blocks 632, 634, 636 and 638, respectively, for Synchronous Transfer Signal Path Overhead termination (STS POH TERM) and Path Performance Monitoring (PPM). Subsequently, the receive path data are passed on to functional blocks 642, 644, 646 and 648 for Virtual Tributary Pointer processing (VT PNTR PROC) and subsequent VT Performance Monitoring (VT PPM) before being input to the TSI switch matrix at the input ports.

In the transmit path, the working and protection paths emerging from the output ports of the TSI switch matrix are input to functional blocks 652, 654, 656 and 658 for generation and insertion of Synchronous Transfer Signal Path Overhead signals (STS POH GEN). After the POH is inserted, the transmit path data is passed on to bus rate adapters 604 and 608.

The microprocessor and control logic block 640 receives control commands from a system controller (not shown), and in turn, provides control signals for setting the operational configuration of the interface devices (bus rate adapters). Control block 640 also passes status signals back to the system controller from the interface devices. The clock source select block 650 provides for a redundancy of clock signals (from clock source modules "A" and "B") so as to ensure that a back-up clock source may be selected to provide the Primary Clock and Primary FP signals in the event of failure of one of the clock sources. Clock source selection is controlled by the system controller.

While a preferred embodiment of the present invention has been shown and described, it will be understood by those skilled in the art that the foregoing and other changes in form and detail may be made therein without departing from the spirit and scope of the invention which is limited only by the terms of the appended claims.

What is claimed is:

1. An interfacing device having one or more input ports for passing data at a first rate, and one or more output ports for passing data at a second rate, said interfacing device comprising:

one or more input port data latches which receive data at the first rate through the input ports and which produce first latch outputs;

a first-type selection data latch coupled to said one or more input port data latches to receive said first latch outputs, and producing second latch outputs selected from at least one of said one or more input port data latches;

a swap buffer coupled to an output of said first-type selection data latch to receive said second latch outputs in response to write enable signals and producing swap buffer outputs in response to read enable signals, said swap buffer outputs being output to at least one of the one or more output ports; and a programmable timing generator which receives a primary clock and a primary framing pulse as inputs, which produces a reference clock and a reference framing pulse as outputs, and which produces said read and write enable signals such that said swap buffer receives data at the first rate and outputs data as swap buffer outputs at the second rate.

2. An interfacing device according to claim 1 having one or more bi-directional ports, said interfacing device further comprising:

one or more bi-directional buffers, coupled to the bi-directional ports and coupled to outputs of said first-type selection data latch and said swap buffer and to inputs of one or more second-type selection data latches, said bi-directional buffers producing bi-directional buffer outputs to said second-type selection data latches;

said one or more second-type selection data latches receiving said swap buffer outputs as inputs and coupled to an output of said bi-directional buffer, and selectively producing one of said swap buffer outputs and bi-directional buffer outputs as third latch outputs which are output to at least one of the one or more output ports;

whereby said first latch outputs and said swap buffer outputs may be alternatively coupled out of the interface device via at least one of the one or more bi-directional output ports.

3. An interfacing device according to claim 2 further comprising:

at least one output port driver which receives inputs from said third latch outputs and which has outputs corresponding to the at least one output port.

4. An interfacing device according to claim 2 further comprising:

a 2:1 selector which has as inputs said first latch outputs and said swap buffer outputs, and which produces a selector output which is coupled as a bi-directional buffer input signal into one of said one or more bi-directional buffers;

whereby first data latch outputs or swap buffer outputs are alternatively provided as inputs to one of said one or more bi-directional buffers.

5. An interfacing device according to claim 2 wherein:

each of said one or more second-type selection data latches is a 2:1 selection data latch which alternatively selects, as an output coupled to one of the one or more output ports, signals received at said bi-directional output ports and said swap buffer outputs.

6. An interfacing device according to claim 2 wherein:

there are two input ports nominated as input channel one and input channel two, each input port having a high byte and a low byte;

there are two input port data latches nominated as channel one input data latch and channel two input data latch which receive inputs from input channel one and input channel two, respectively, such that the high byte and low byte of each input port are coupled in parallel to their respective input port data latches;

said first latch outputs comprise a high byte and a low byte which are coupled in parallel to each of said at least one first-type selection data latches; and said first-type data latch comprises one or more 4:1 selection data latches which function to select, as a second latch output coupled to the swap buffer, one of the group consisting of: the high byte of the first latch output from the channel one input data latch, the low byte of the first latch output from the channel one input data latch, the high byte of the first latch output from the channel two input data latch, and the low byte of the first latch output from the channel two input data latch.

7. An interfacing device according to claim 1 further comprising:

a control logic circuit connected by control lines to said one or more input port data latches, said first-type selection data latch, and said swap buffer;

whereby operation of the interfacing device may be controlled.

8. An interfacing device according to claim 1 wherein:

each of said one or more input port data latches contains a parity check circuit for checking the parity of each byte received by said input port data latch and for generating a parity error signal indicative of parity errors.

9. An interfacing device according to claim 1 wherein:

each of the one or more input ports comprises a high byte and a low byte which are coupled in parallel to one of said one or more input port data latches.

10. An interfacing device according to claim 1 wherein:

said swap buffer comprises one or more first-in-random-out (FIRO) swap buffers.

11. An interfacing device according to claim 8 wherein:

said first-type selection data latch comprises one or more 4:1 selection data latches, each of said one or more 4:1 selection data latches coupled to each of said one or more input port data latches, each of said one or more 4:1 selection data latches coupled to one of said one or more FIRO swap buffers;

whereby bytes of data from said first latch outputs are selectively coupled to said FIRO swap buffers.

12. An interfacing device according to claim 1 wherein:

said programmable timing generator produces the reference clock to be at a frequency which is equal to the primary clock frequency divided by n, where n is a number selected from the group consisting of: 1, 2 and 6; and the programmable timing generator produces the reference frame pulse to be phase shifted from the primary frame pulse.

13. An interface device according to claim 1, further comprising:

at least one bi-directional port selectably connected to one or more of said input port data latches or to output ports of the interface device for transferring data into or out of the interface device;

wherein the interface device is connectable, via said at least one bi-directional port, to one or more other interface devices in a cascade formation.

14. An interfacing device for rate matching a SONET multiplexed data payload having a nominal payload data rate with one or more tributary data payloads having a tributary payload data rate which is different from the nominal payload data rate, said interfacing device comprising:

an input port means for accepting at a first data rate incoming bytes of data into the device;

an output port means for emitting at a second data rate outgoing bytes of data from the device;

an assigning means, which receives incoming bytes of data from said input port means at said first rate, for assigning time slot placements of said incoming bytes of data as outgoing bytes of data at said second rate routed to said output port means; and an input routing means for selecting a path for said incoming bytes of data to route said incoming bytes of data from said input port means to said assigning means;

whereby bytes of data from one data payload, accepted as said incoming bytes of data, are rate matched into another data payload as said outgoing bytes of data.

15. An interfacing device according to claim 14, wherein said first rate corresponds to said nominal payload data rate and said incoming bytes of data are drawn from the SONET multiplexed data payload, and said second rate corresponds to said tributary payload data rate and said outgoing bytes of data are provided to one or more of the tributary data payloads.

16. An interfacing device according to claim 14, wherein said first rate corresponds to said tributary payload data rate and said incoming bytes of data are drawn from one or more of the tributary data payloads, and said second rate corresponds to said nominal payload data rate and said outgoing bytes of data are provided to the SONET multiplexed data payload.

17. An interfacing device according to claim 14, further comprising:

a bi-directional routing means for routing bytes of data out of the device to other interfacing devices cascaded to said interfacing device, and for routing bytes of data received from other interfacing devices cascaded to the interfacing device; and an output routing means for selecting one or more paths for outgoing bytes of data to be routed from the group consisting of: said bi-directional routing means, and said assigning means, to said output port means.

18. An interfacing device according to claim 17, wherein:

said bi-directional routing means routes out of said device bytes of data which are selected from one of said input port means and said assigning means.

19. An interfacing device according to claim 18, wherein:

said bi-directional routing means routes into said device bytes of data to flow only to said output routing means.

20. An interfacing device according to claim 17, further comprising:

a timing means for providing clock timing signals to said assigning means, said input routing means, and said output routing means.

21. A rate adaptation system comprising:

a plurality of interfacing devices according to claim 17 which are connected to one another in a cascaded fashion;

wherein a first set of digital communication lines multiplexed according to the SONET standard operating at a nominal payload data rate are operatively interfaced with a second set of digital communication lines multiplexed according to the SONET standard operating at different payload data rates, and said first set of digital communication lines are operatively interfaced with a third set of digital communication lines multiplexed according other digital standards which operate at different payload data rates.

22. An interfacing device according to claim 14, wherein:

said first rate is different from said second rate.

23. An interfacing device according to claim 14, further comprising:

a timing means for providing clock timing signals to said assigning means and to said input routing means.

24. An interfacing device according to claim 14, wherein:

said first rate corresponds to the nominal payload data rate, and said second rate corresponds to one of the tributary payload data rates.

25. An interfacing device according to claim 14, wherein:

said first rate corresponds to the tributary payload data rate, and said second rate corresponds to one of the nominal payload data rates.

* * * * *